US007716877B2

(12) United States Patent
Gilstrap et al.

(10) Patent No.: US 7,716,877 B2

(45) Date of Patent: May 18, 2010

(54) GIRDER TIEDOWN

(75) Inventors: Jeremy Gilstrap, McKinney, TX (US); Jin-Jie Lin, Livermore, CA (US); Daniel M. Gray, McKinney, TX (US)

(73) Assignee: Simpson Strong-Tie Co., Inc., Pleasanton, CA (US)

( * ) Notice: Subject to any disclaimer, the term of this patent is extended or adjusted under 35 U.S.C. 154(b) by 1093 days.

(21) Appl. No.: 11/217,572

(22) Filed: Aug. 31, 2005

(65) Prior Publication Data

US 2006/0059794 A1 Mar. 23, 2006

Related U.S. Application Data

(63) Continuation-in-part of application No. 10/912,260, filed on Aug. 4, 2004.

(51) Int. Cl.
*E04B 7/04* (2006.01)

(52) U.S. Cl. .......................... 52/92.2; 52/90.1; 52/92.1; 52/712; 403/DIG. 15; 403/232.1

(58) Field of Classification Search .................. 52/90.1, 52/92.1, 92.2, 92.3, 93.1, 93.3, 640, 641, 52/713, 714, 712; 248/291.1, 324; 403/DIG. 15, 403/232.1
See application file for complete search history.

(56) References Cited

U.S. PATENT DOCUMENTS

| | | | | |
|---|---|---|---|---|
| 506,154 | A * | 10/1893 | Buhman | 16/371 |
| 1,069,503 | A * | 8/1913 | Wagner | 52/92.2 |
| 1,170,188 | A | 2/1916 | Rasmussen | |
| 1,277,766 | A * | 9/1918 | Stadelman | 52/92.2 |
| 1,787,167 | A | 12/1930 | Purdy | |
| 2,369,687 | A * | 2/1945 | Ralston | 403/403 |
| 2,467,115 | A * | 4/1949 | Duggan | 52/699 |
| 2,911,690 | A * | 11/1959 | Sanford | 403/232.1 |
| 3,659,884 | A | 5/1972 | Ohlin | |

(Continued)

FOREIGN PATENT DOCUMENTS

EP 357273 A1 * 3/1990

OTHER PUBLICATIONS

Hughes Manufacturing, Inc. "Uplift Strap Connectors," 1997/1998 catalog, Hughes Manufacturing, Inc. (Largo, Florida), p. 38. (1997).

(Continued)

*Primary Examiner*—Robert J Canfield
*Assistant Examiner*—Matthew J Gitlin
(74) *Attorney, Agent, or Firm*—James R. Cypher; Charles R. Cypher

(57) ABSTRACT

An adjustable connector is provided for connecting an elongate substantially vertical supporting structural member and an elongate generally horizontal supported structural member. The connector is provided with a side attachment member that attaches to an elongate substantially vertical supporting structural member and a cap that attaches to the elongate generally horizontal supported structural member, with a pin connection that enables rotation between the cap and the side attachment member.

An unadjustable connector is also provided for connecting an elongate substantially vertical supporting structural member and an elongate generally horizontal supported structural member. The connector is provided with a side attachment member that can attach directly to an elongate substantially vertical supporting structural member and the elongate generally horizontal supported structural member.

45 Claims, 31 Drawing Sheets

U.S. PATENT DOCUMENTS

| | | | | |
|---|---|---|---|---|
| 3,785,108 | A | 1/1974 | Satchell | |
| 4,022,537 | A * | 5/1977 | Gilb et al. | 403/386 |
| 4,106,257 | A | 8/1978 | Gilb | |
| 4,199,908 | A | 4/1980 | Teeters | |
| 4,327,532 | A | 5/1982 | Matthews | |
| 4,381,635 | A | 5/1983 | Solo | |
| 4,410,294 | A * | 10/1983 | Gilb et al. | 403/27 |
| 4,414,785 | A * | 11/1983 | Howell | 52/169.1 |
| 4,449,335 | A | 5/1984 | Fahey | |
| 4,527,375 | A * | 7/1985 | Braginetz | 52/712 |
| 4,571,114 | A * | 2/1986 | Rionda et al. | 403/400 |
| 4,572,695 | A * | 2/1986 | Gilb | 403/232.1 |
| 4,714,372 | A * | 12/1987 | Commins | 403/400 |
| 4,744,192 | A | 5/1988 | Commins | |
| 4,802,786 | A * | 2/1989 | Yauger et al. | 403/232.1 |
| 4,896,985 | A * | 1/1990 | Commins | 403/11 |
| 5,094,059 | A * | 3/1992 | Ganescu | 52/641 |
| 5,111,632 | A | 5/1992 | Turner | |
| 5,303,520 | A | 4/1994 | Gozdziak | |
| 5,335,469 | A * | 8/1994 | Stuart | 52/655.1 |
| 5,351,456 | A | 10/1994 | Paine, Jr. | |
| 5,380,115 | A * | 1/1995 | Colonias | 403/170 |
| 5,442,887 | A | 8/1995 | Welsh | |
| 5,448,871 | A | 9/1995 | Newman et al. | |
| 5,553,961 | A | 9/1996 | Olden | |
| 5,555,694 | A | 9/1996 | Commins | |
| 5,560,156 | A | 10/1996 | McDonald | |
| 5,575,130 | A | 11/1996 | Chiodo | |
| 5,577,860 | A | 11/1996 | Plank | |
| 5,595,031 | A * | 1/1997 | Commins | 52/264 |
| 5,640,822 | A | 6/1997 | Haswell | |
| 5,718,533 | A | 2/1998 | Mullet et al. | |
| 5,732,524 | A * | 3/1998 | Kalker et al. | 52/712 |
| 5,857,295 | A | 1/1999 | Mikawa | |
| 5,870,861 | A * | 2/1999 | Gnaedinger | 52/93.1 |
| 6,021,839 | A | 2/2000 | Knezevich et al. | |
| 6,167,675 | B1 * | 1/2001 | LeBlanc | 52/847 |
| 6,219,975 | B1 * | 4/2001 | Olden | 52/92.2 |
| 6,295,781 | B1 * | 10/2001 | Thompson | 52/712 |
| 6,324,810 | B1 * | 12/2001 | Thompson | 52/713 |
| 6,401,422 | B1 | 6/2002 | Olden | |
| 6,490,840 | B1 * | 12/2002 | Thompson | 52/715 |
| 6,510,666 | B1 * | 1/2003 | Thompson | 52/712 |
| 6,513,290 | B2 | 2/2003 | Leek | |
| 6,658,796 | B1 | 12/2003 | Higgins | |
| 6,662,517 | B1 | 12/2003 | Thompson | |
| 6,763,634 | B1 * | 7/2004 | Thompson | 52/92.2 |
| 6,877,284 | B2 * | 4/2005 | Thompson | 52/112 |
| 6,971,623 | B2 * | 12/2005 | Allmon et al. | 248/680 |
| 7,065,932 | B2 * | 6/2006 | Roesset et al. | 52/712 |
| 7,254,919 | B2 * | 8/2007 | Lutz et al. | 52/92.2 |
| 2002/0078657 | A1 | 6/2002 | Zambelli et al. | |
| 2004/0079034 | A1 * | 4/2004 | Leek | 52/92.2 |
| 2004/0079044 | A1 * | 4/2004 | Troth et al. | 52/696 |
| 2008/0244993 | A1 * | 10/2008 | Crumley | 52/92.2 |

OTHER PUBLICATIONS

Hughes Manufacturing, Inc. "Uplift Strap Connectors," 1996/1997 catalog, Hughes Manufacturing, Inc. (Largo, Florida), p. 36. (1996),.

USP Structural Connectors, "Truss & Rafter Tiedowns," USP Full Line Catalog 2004, United Steel Products Company. (Livermore, California) p. 48. (2004).

USP Structural Connectors, "Embedded Truss Anchors," USP Full Line Catalog 2004, United Steel Products Company. (Livermore, California) (2004) pp. 49-53.

USP Structural Connectors, "Strap Truss Tiedowns-SGP series" USP Full Line Catalog 2004, United Steel Products Company. (Livermore, California) p. 54. (2004).

USP Structural Connectors, "Uplift Girder Ties" USP Full Line Catalog 2004, United Steel Products Company. (Livermore, California). (2004). pp. 55-57.

USP Structural Connectors, "Girder Tiedowns" USP Full Line Catalog 2004, United Steel Products Company. (Livermore, California) (2004) pp. 58-60.

USP Structural Connectors, "Masonry Uplift Connectors-SHA Series" USP Full Line Catalog 2004, United Steel Products Company. (Livermore, California) p. 61. (2004).

USP Structural Connectors, "Truss Straps" USP Full Line Catalog 2004, United Steel Products Company. (Livermore, California) p. 62. (2004).

USP Structural Connectors, "Hurricane Gusset Angles-HGA Series" USP Full Line Catalog 2004, United Steel Products Company. (Livermore, California) p. 63. (2004).

USP Structural Connectors, "Hurricane/Seismic Anchors" USP Full Line Catalog 2004, United Steel Products Company. (Livermore, California). (2004). pp. 64-67.

Simpson Strong-Tie Connectors, "LTA1 Lateral Truss Anchor," C-2000 Catalog, Simpson Strong-Tie Company, Inc. (Pleasanton, California) p. 109 (2000).

Simpson Strong-Tie Connectors, "Heavy Girder Tiedowns," C-2000 Catalog, Simpson Strong-Tie Company, Inc. (Pleasanton, California) p. 109 (2000).

Simpson Strong-Tie Connectors, "Seismic and Hurricane Ties," C-2003 Catalog, Simpson Strong-Tie Company, Inc. (Dublin, California) p. 134 (2003).

USP Structural Connectors, "Truss & Rafter Tiedowns," USP Full Line Catalog 2003, United Steel Products Company, (Livermore, California) (2003) pp. 41-55.

Simpson Strong-Tie Company, Inc., "Wood Construction Connectors," LTA1, LGT2/MGT/HGT, Simpson Strong-Tie Company, Inc. (U.S.A.), front and back page and p. 109 (2000).

Simpson Strong-Tie Company, Inc., "Wood Construction Connectors," Straps & Ties, H Seismis and Hurricane Ties, HL Heavy Angles and Gussets, Simpson Strong-Tie Company, Inc. (U.S.A.), p. 134 (2002).

United Steel Products, "USP Structural Connectors<" USP Full Line Catalog 2004, www.USPconnectors.com, United Steel Products (U.S.A.), front and back page and pp. 48-67 (2004).

Simpson Strong-Tie, LTT/MTT/HTT Tension Ties, C-2005 catalog, Simpson Strong-Tie Company, Inc. (Pleasanton, California) p. 25 (2005).

WWW.USPconnectors.com 2001 Catalog Truss and Rafter Tiedowns.

Third Party Declaration by Douglas La Chappelle dated Sep. 13, 2004.

* cited by examiner

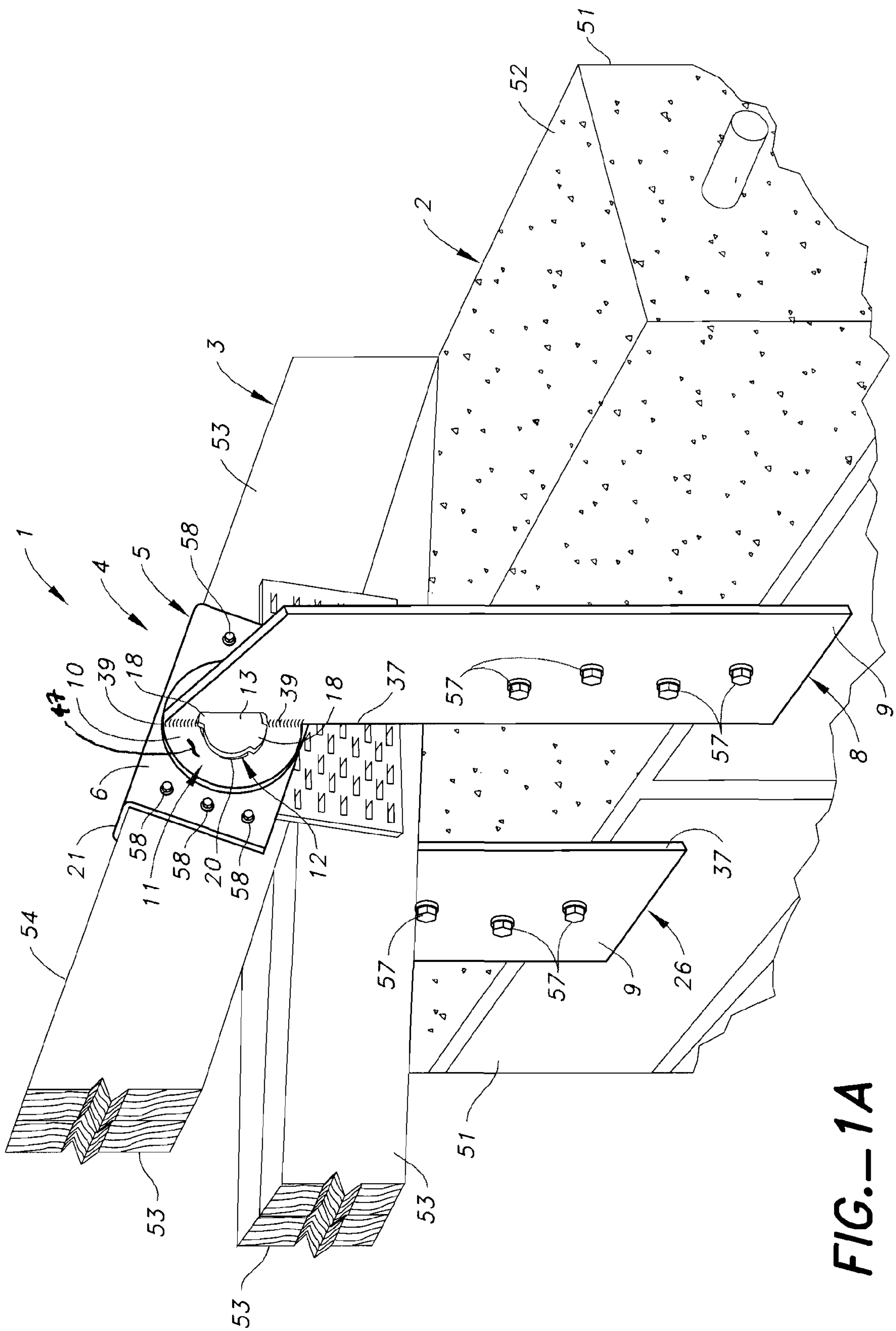
FIG.—1A

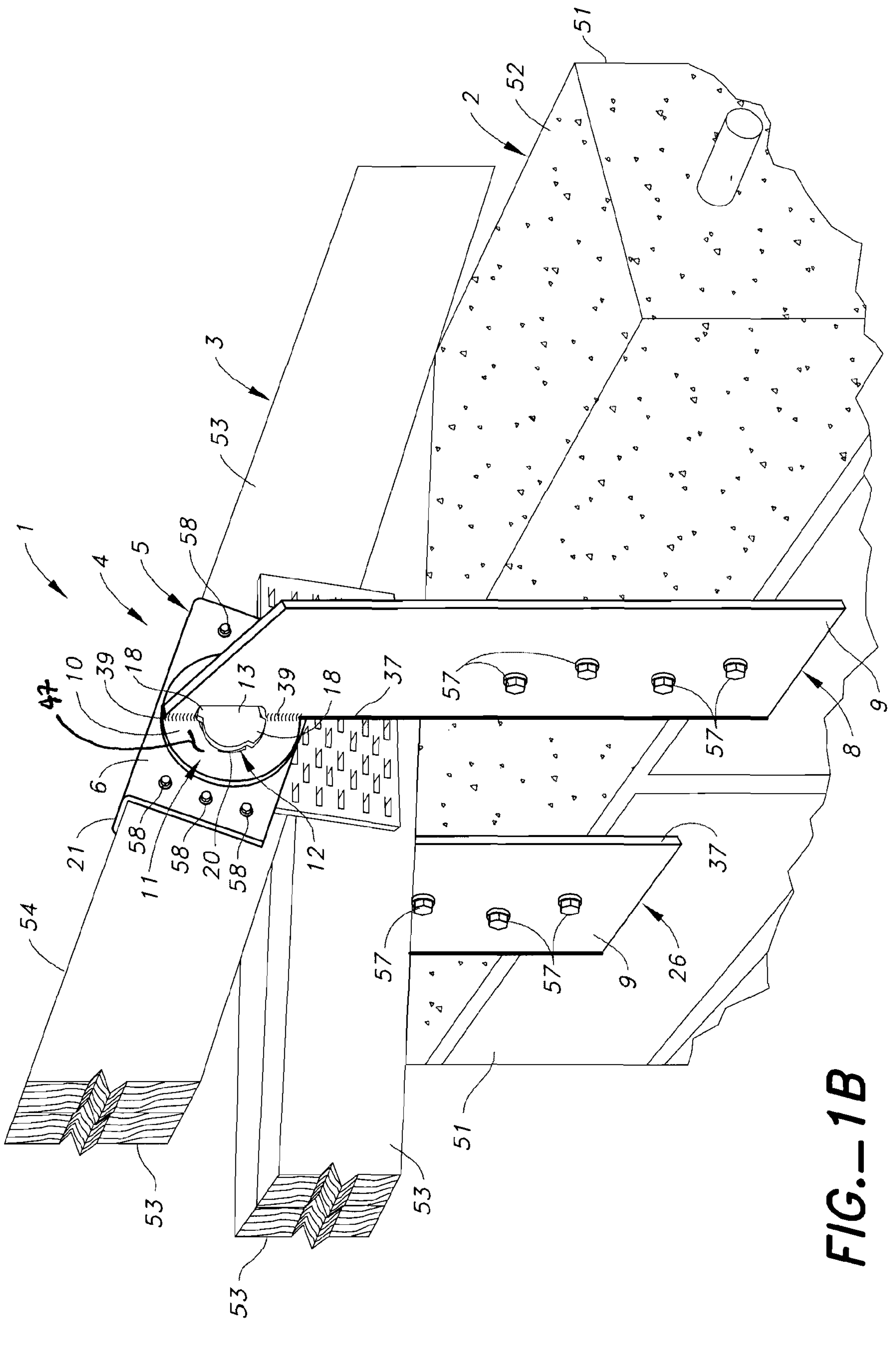
FIG.—1B

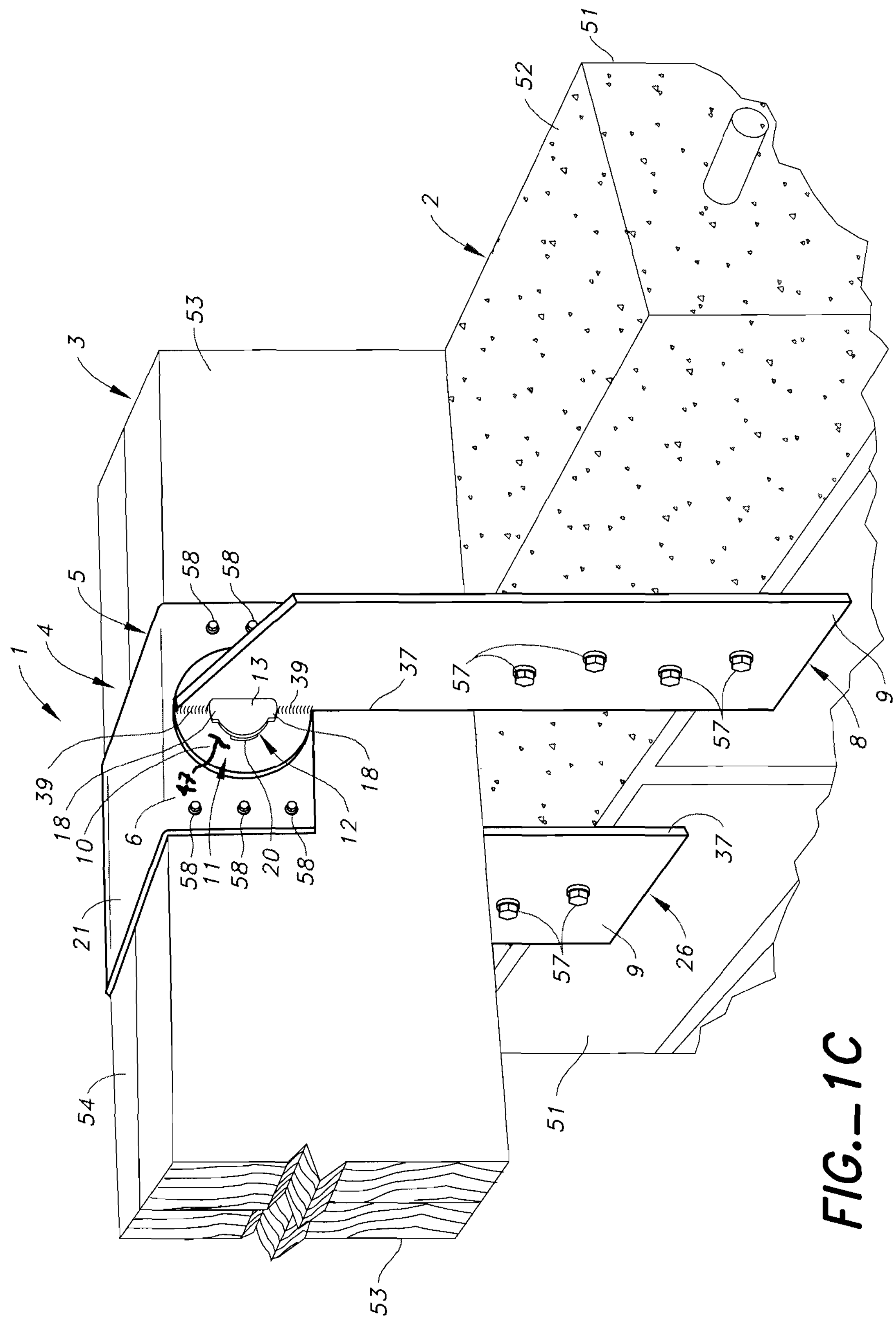
FIG.—1C

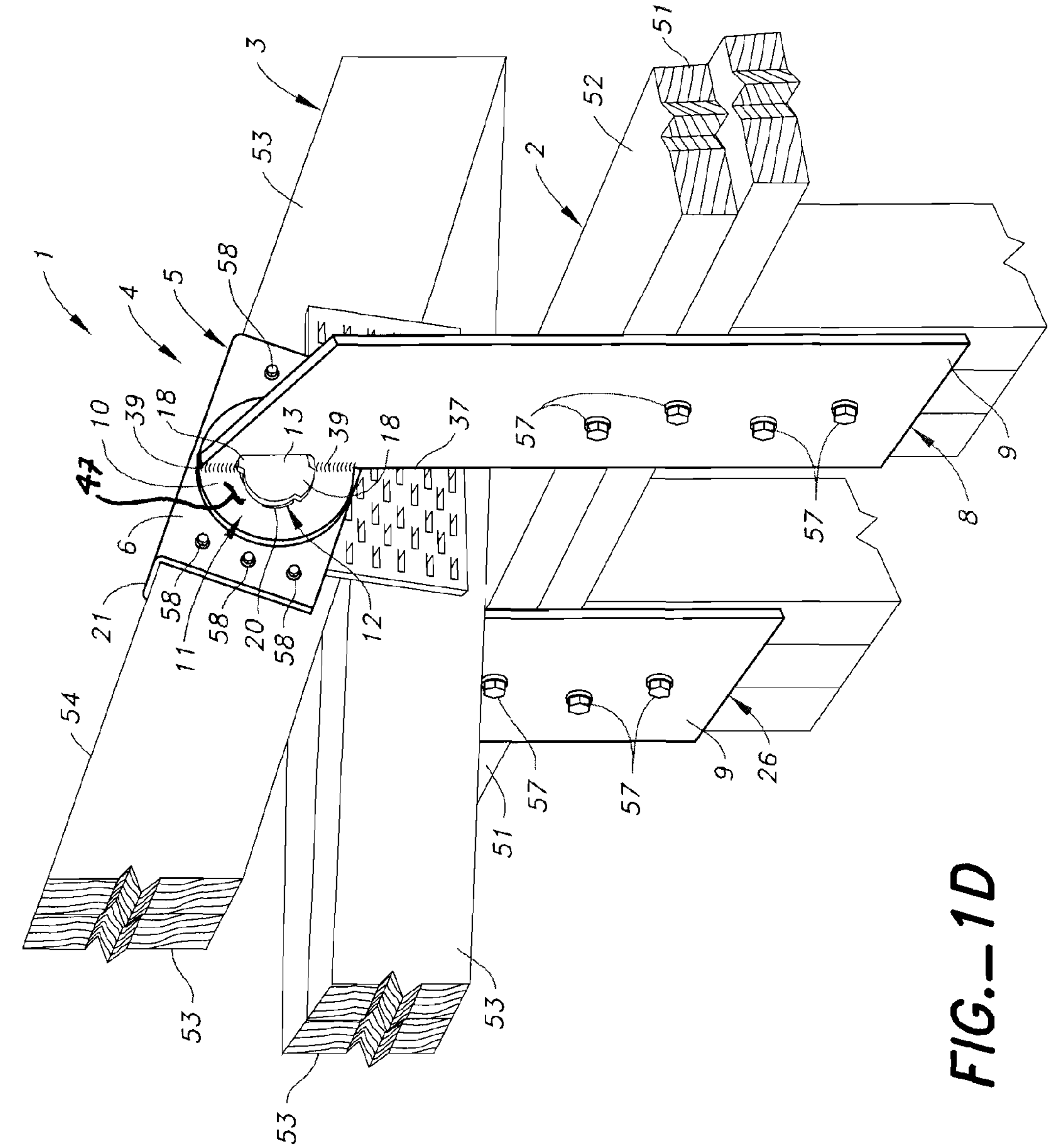
FIG.—1D

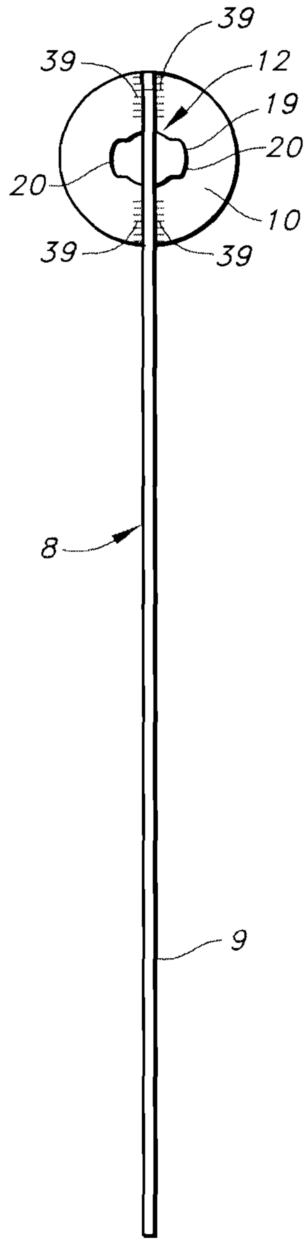
FIG._2
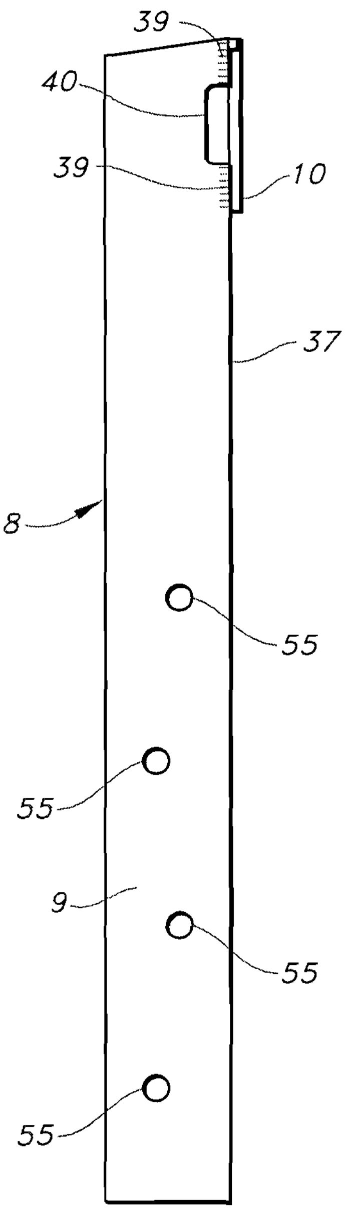
FIG._3
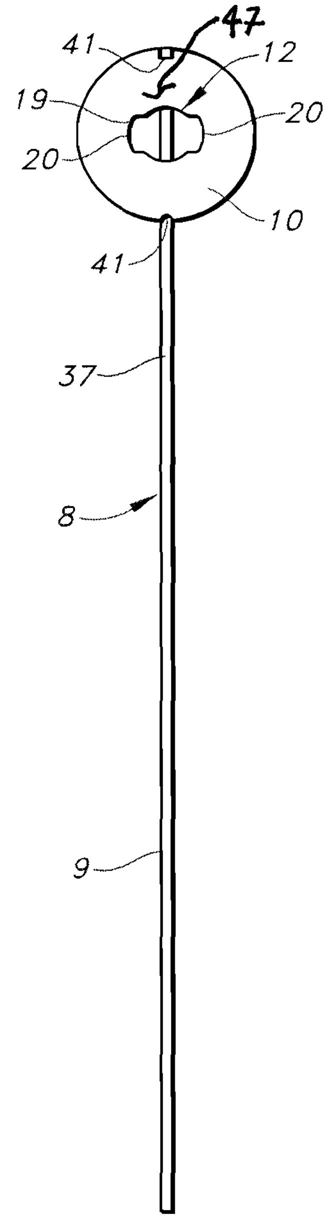
FIG._4
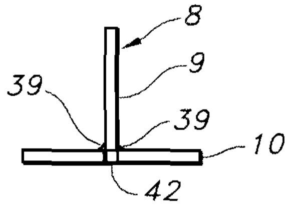
FIG._5

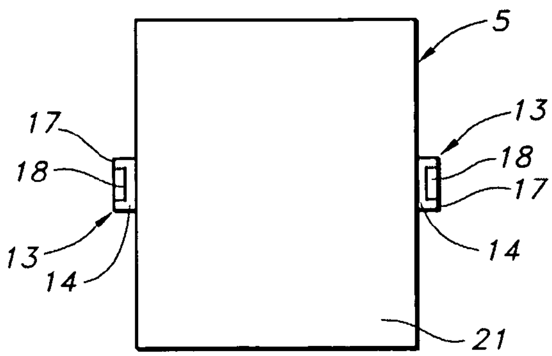
FIG._6
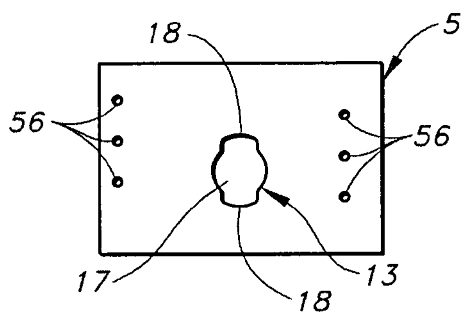
FIG._7
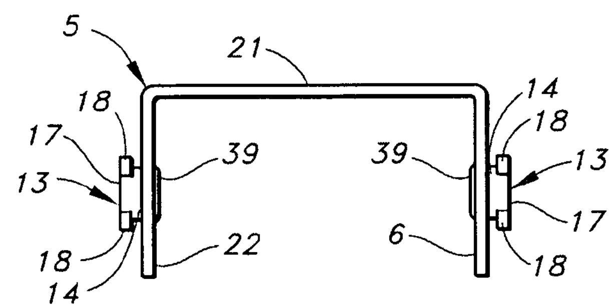
FIG._8
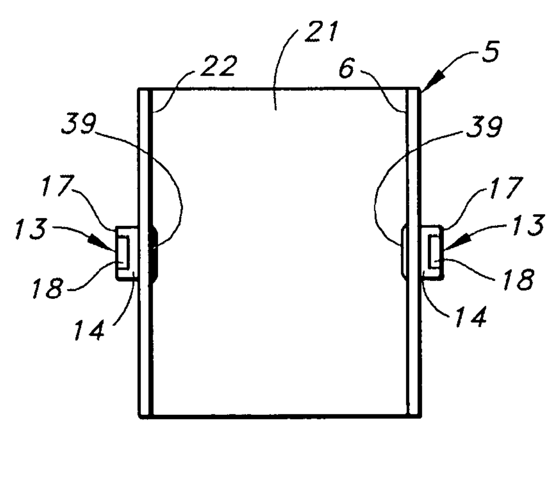
FIG._9

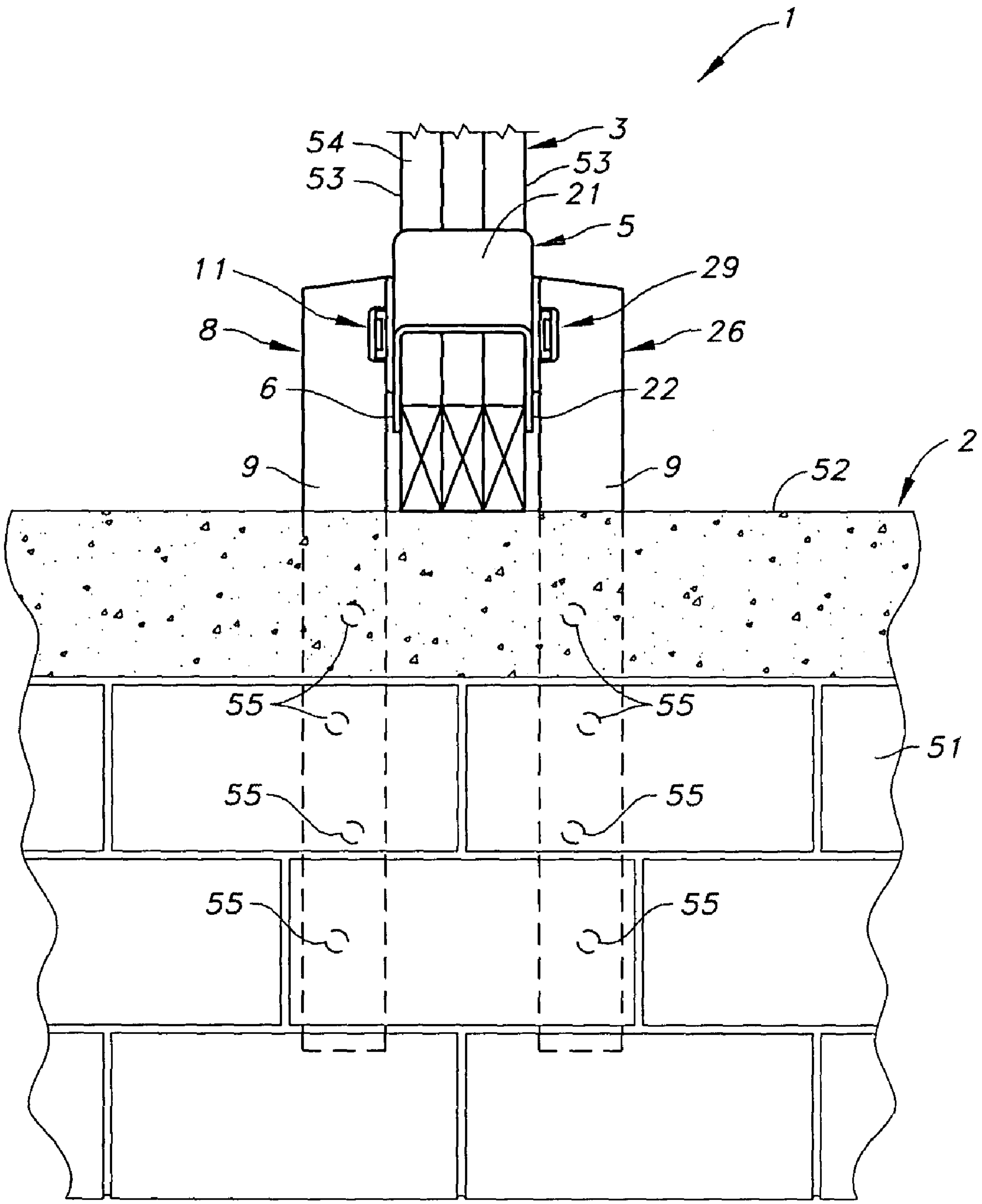
FIG._10

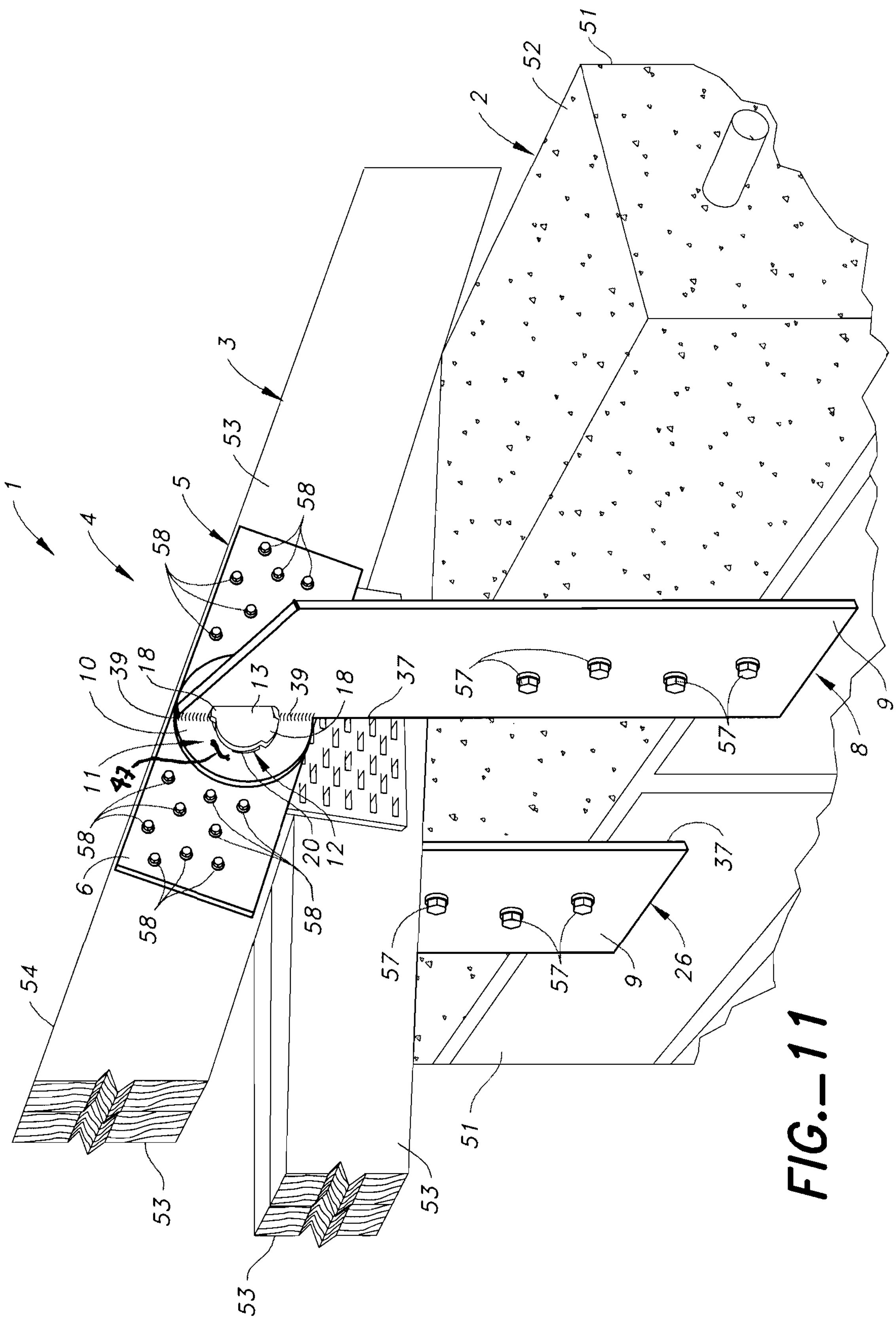
FIG.—11

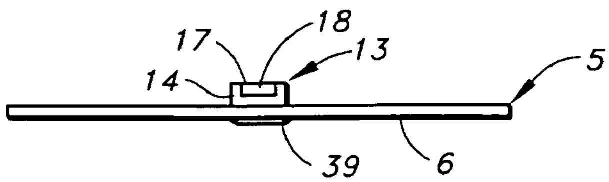
FIG._12
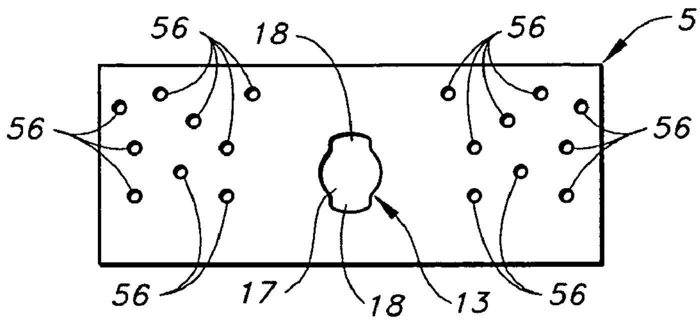
FIG._13
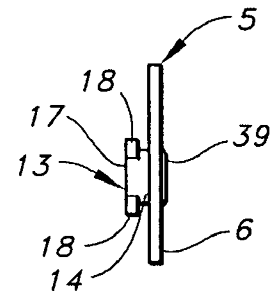
FIG._14
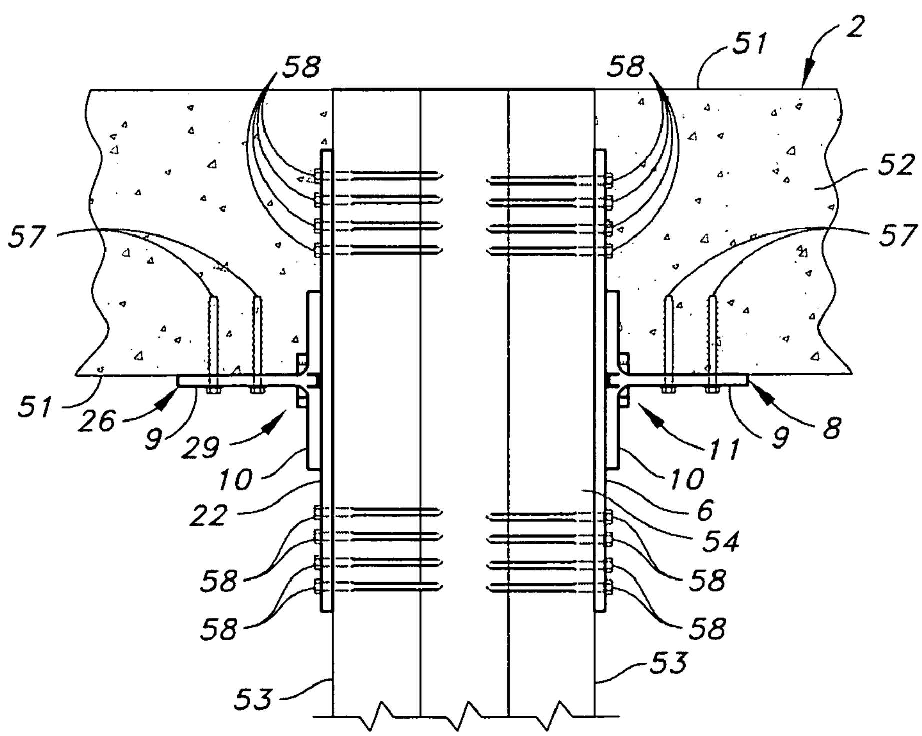
FIG._15

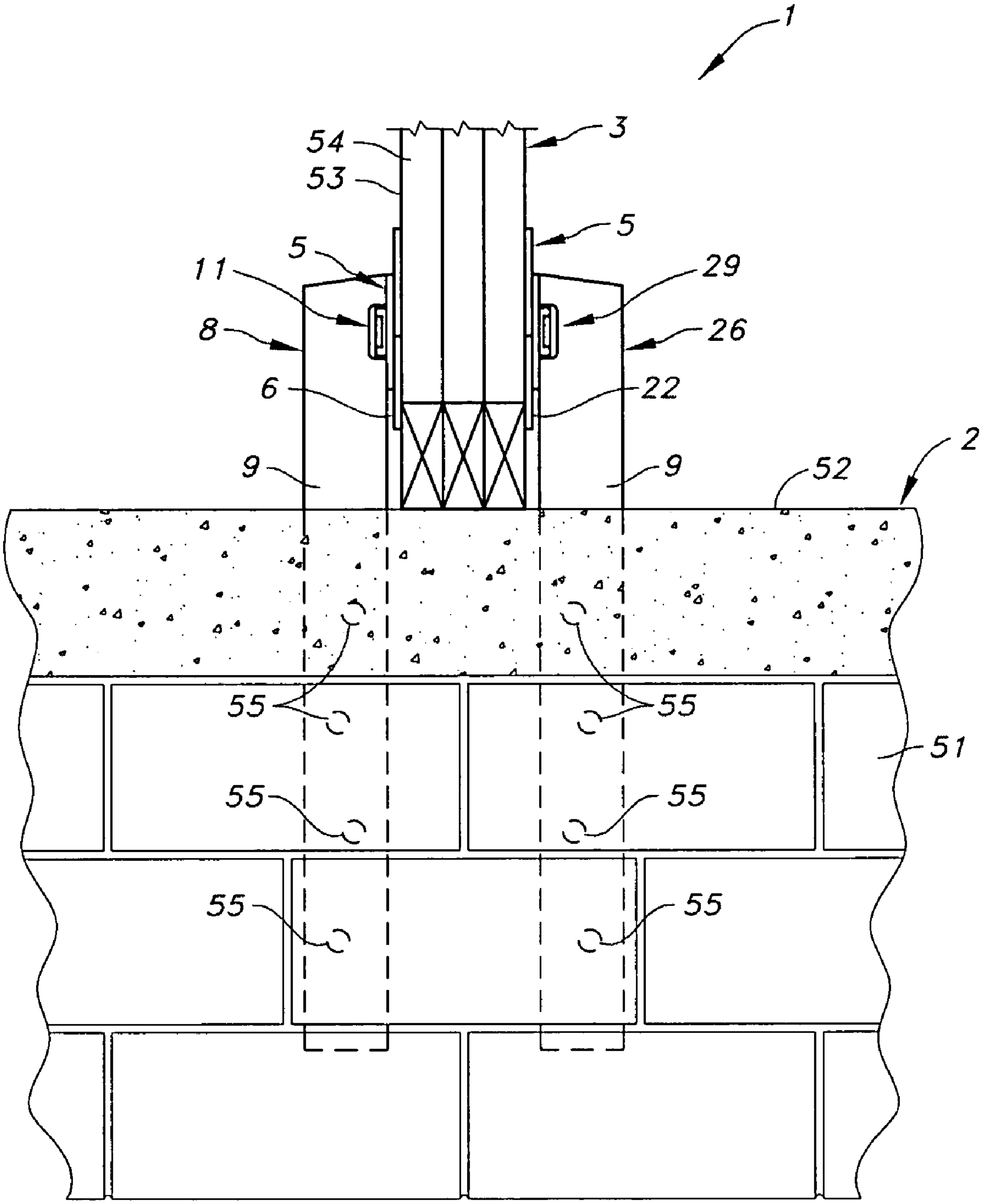
FIG._16

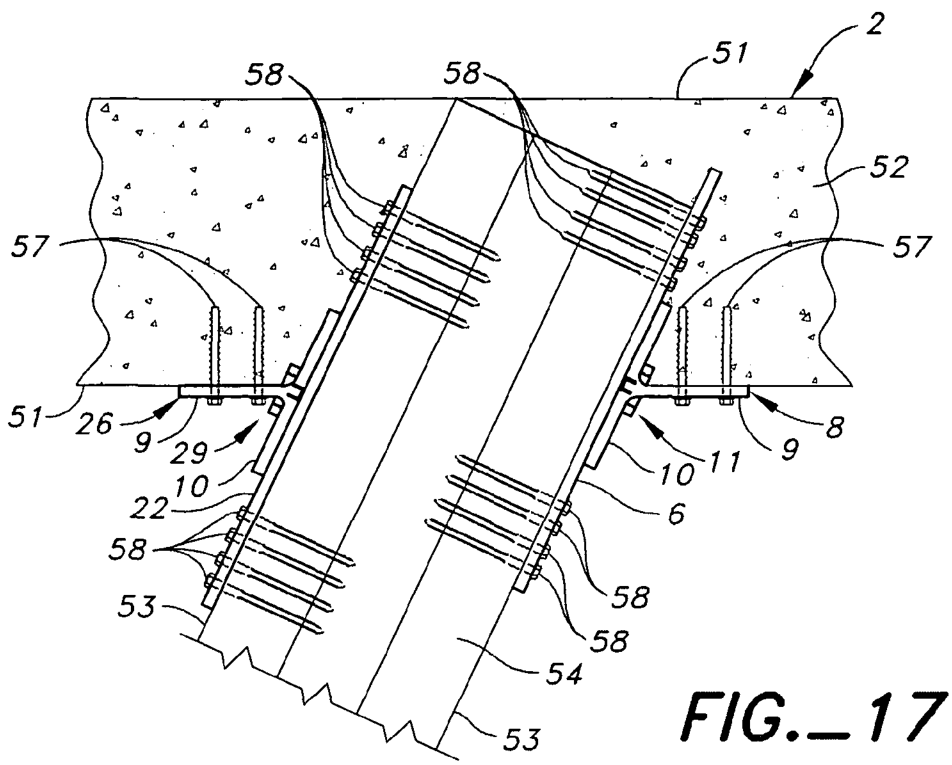
FIG._17
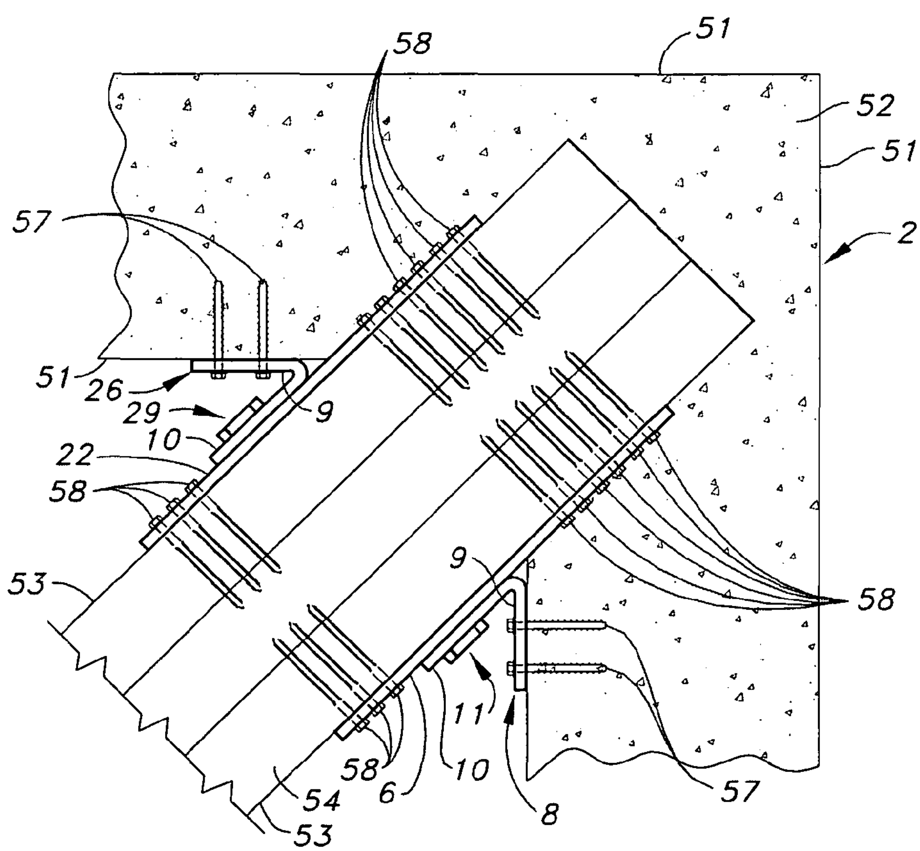
FIG._18

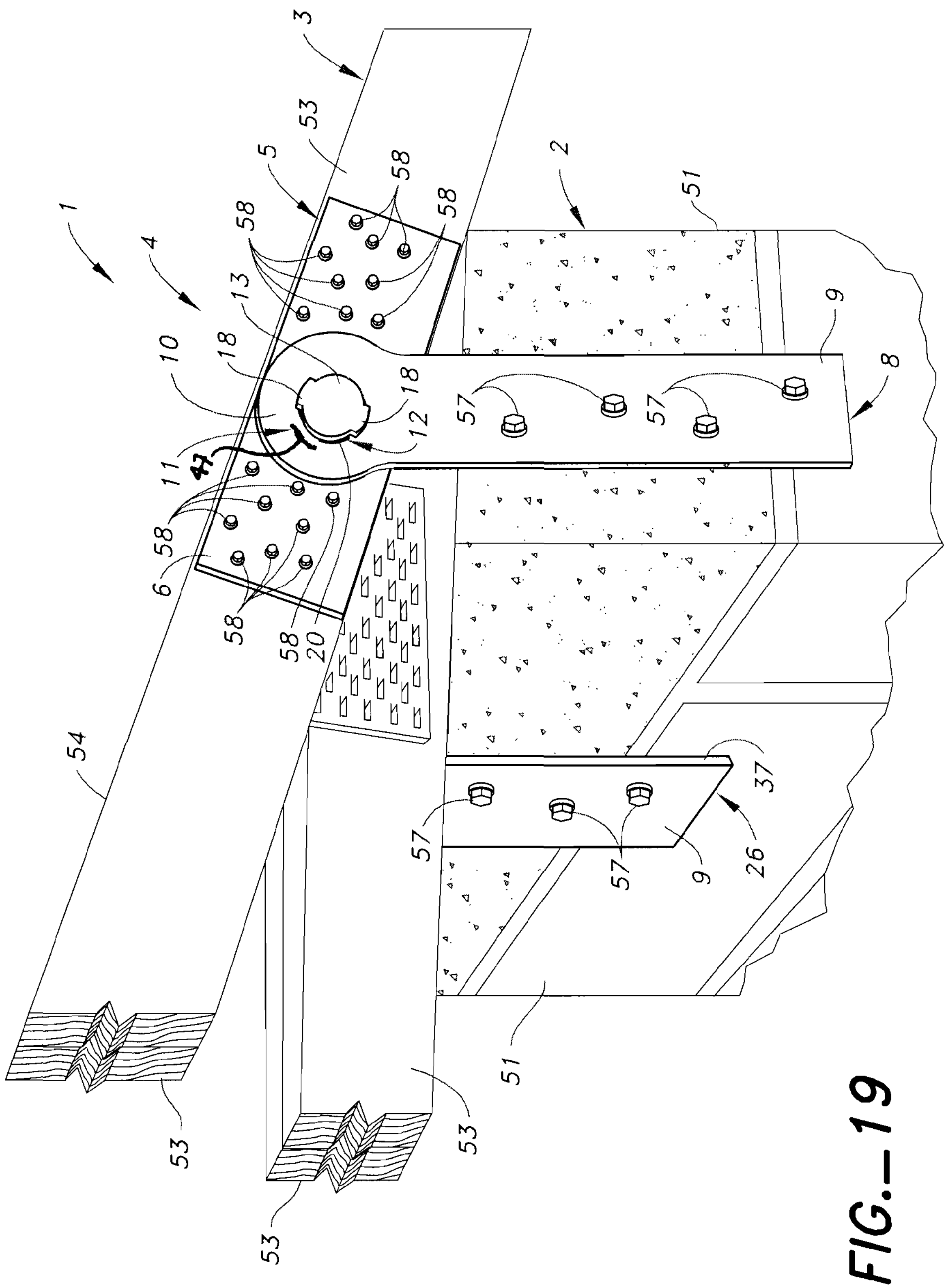
FIG.—19

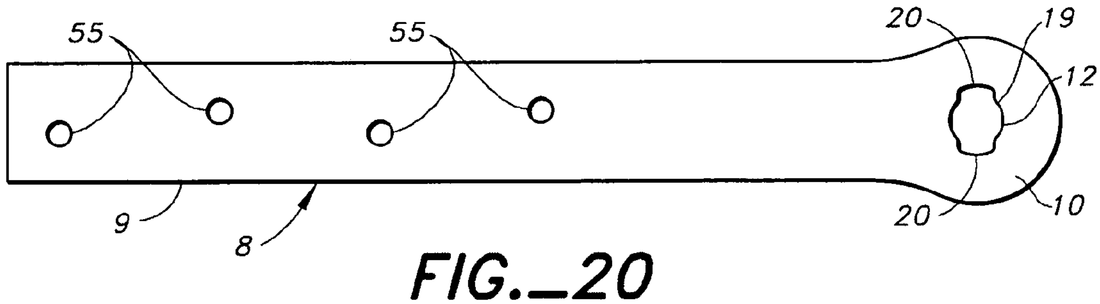
FIG._20
FIG._21
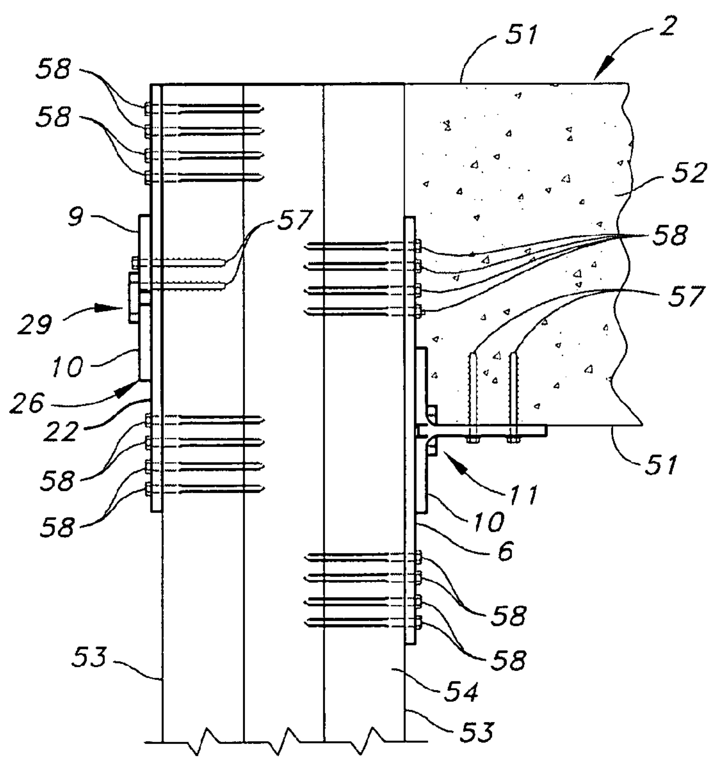
FIG._22

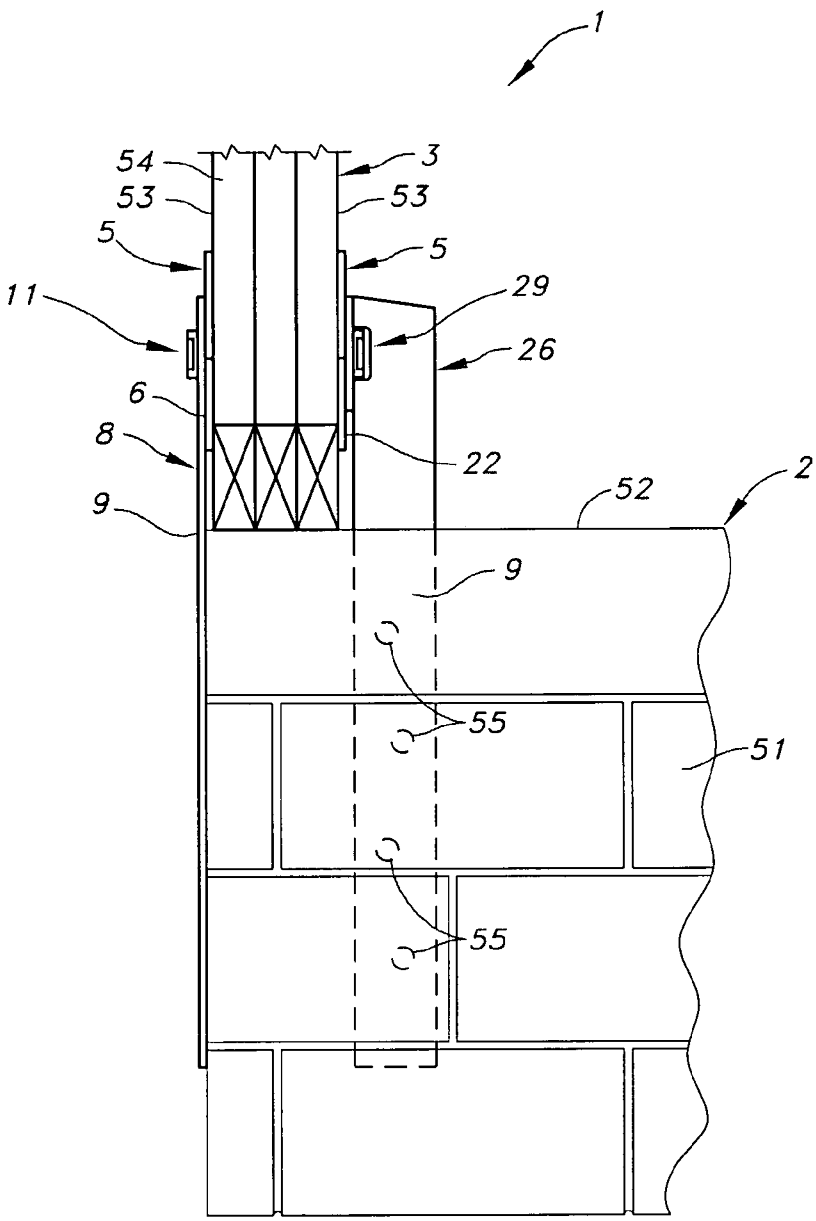
FIG._23

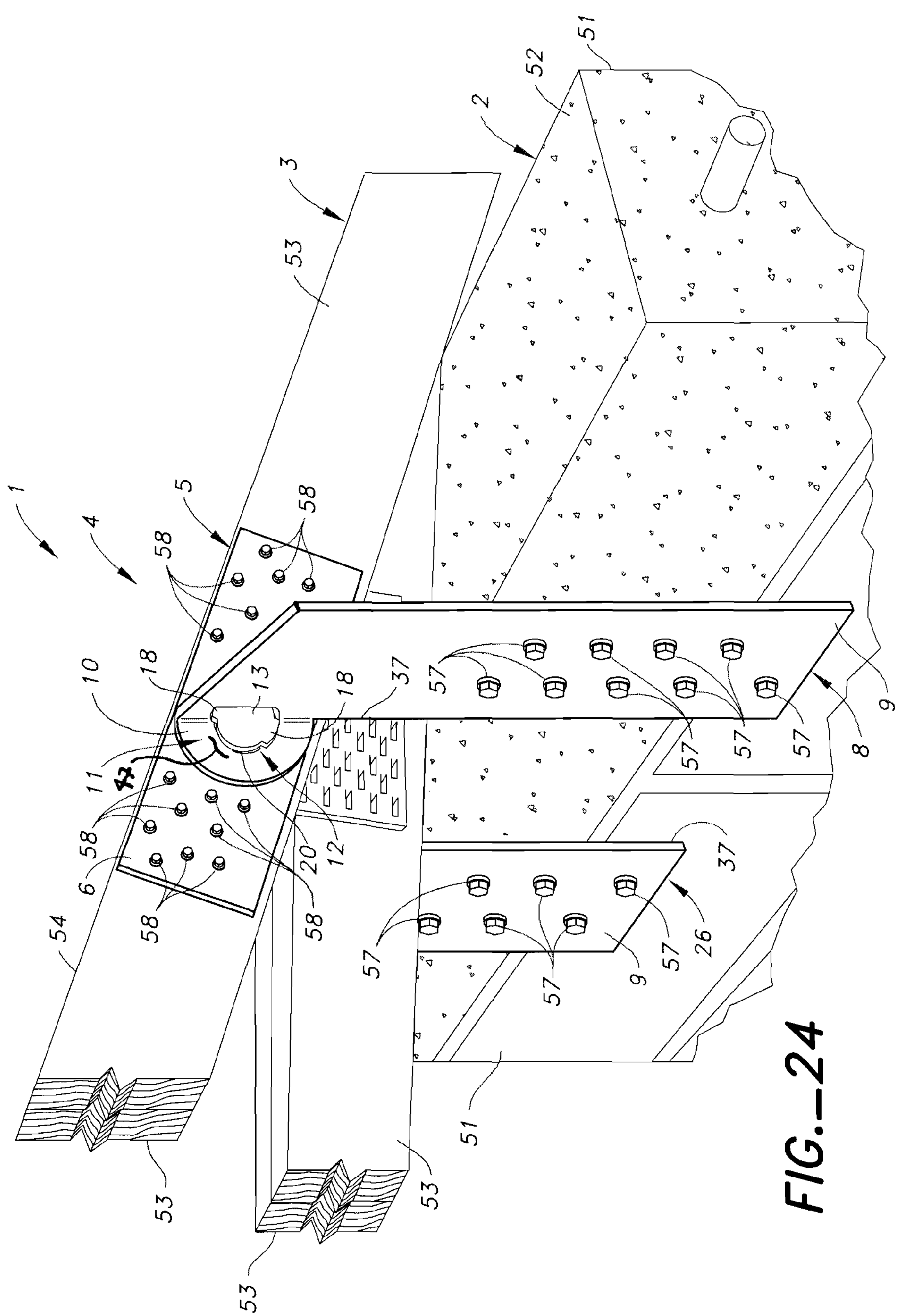
FIG.—24

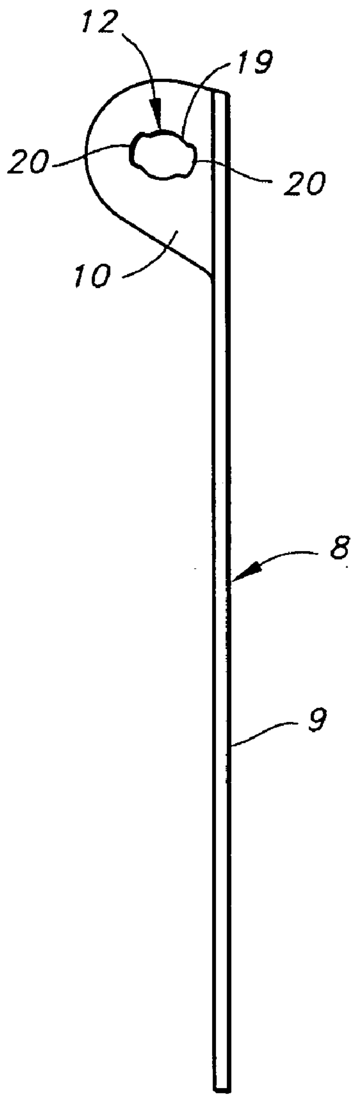
FIG._25
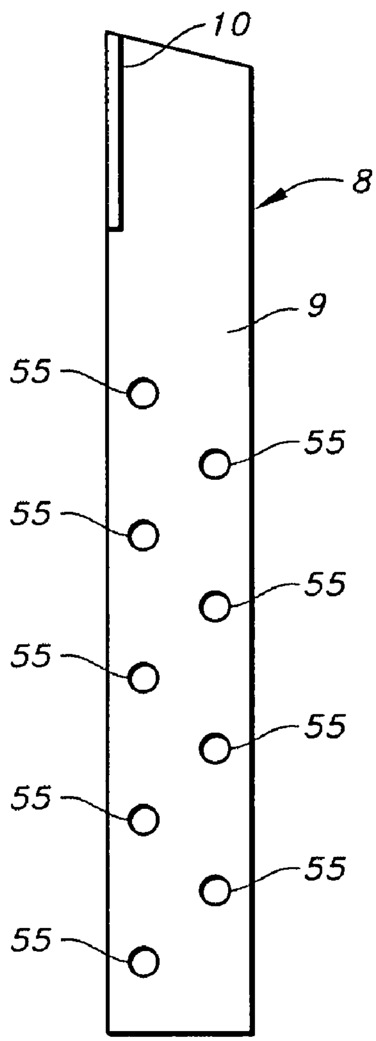
FIG._26
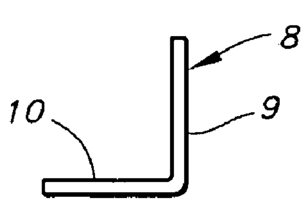
FIG._27

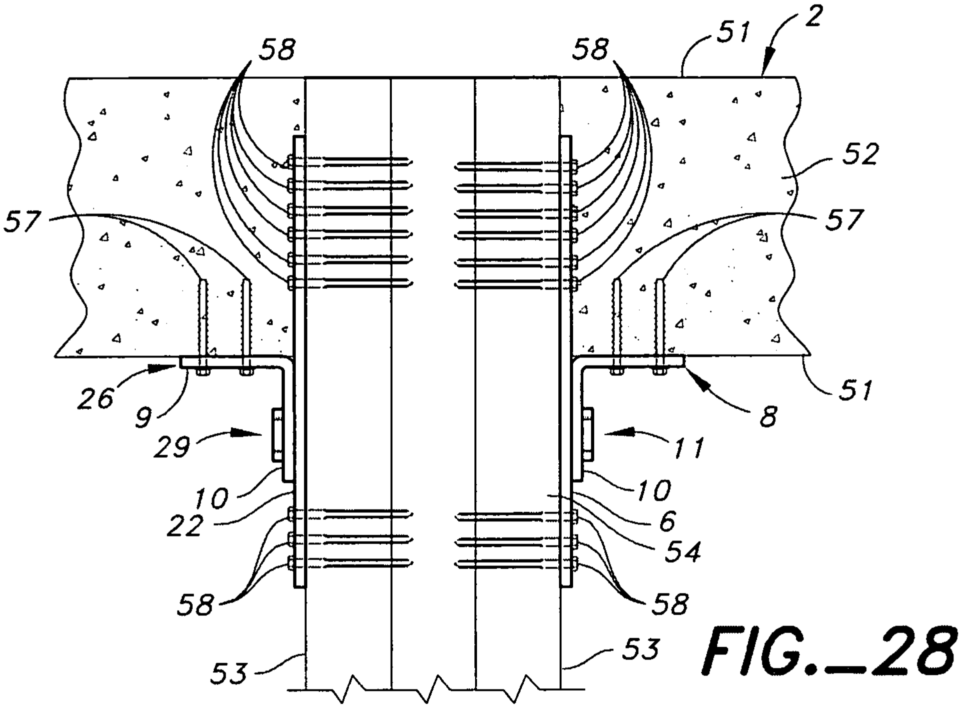
FIG._28
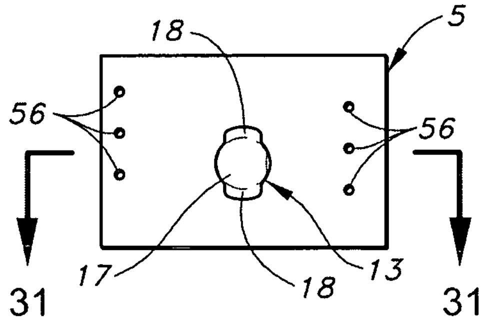
FIG._30
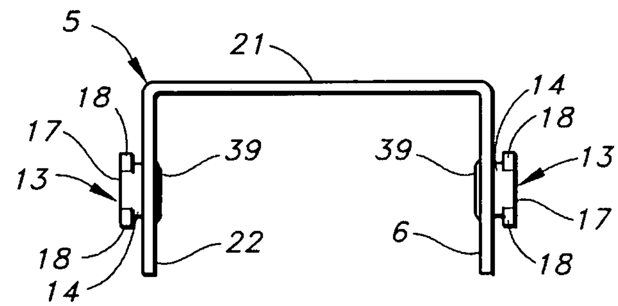
FIG._31
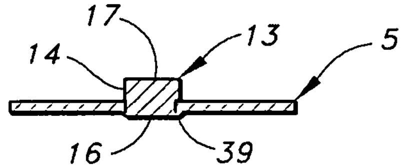
FIG._32

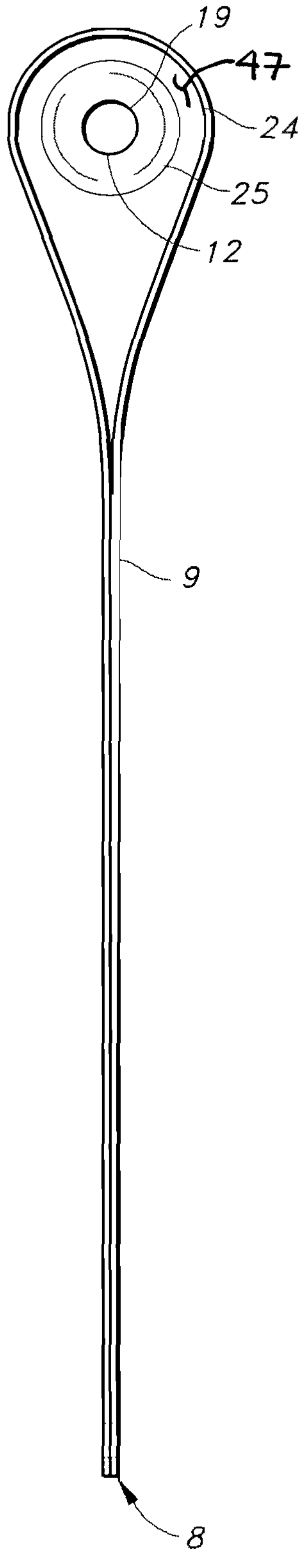
FIG._29
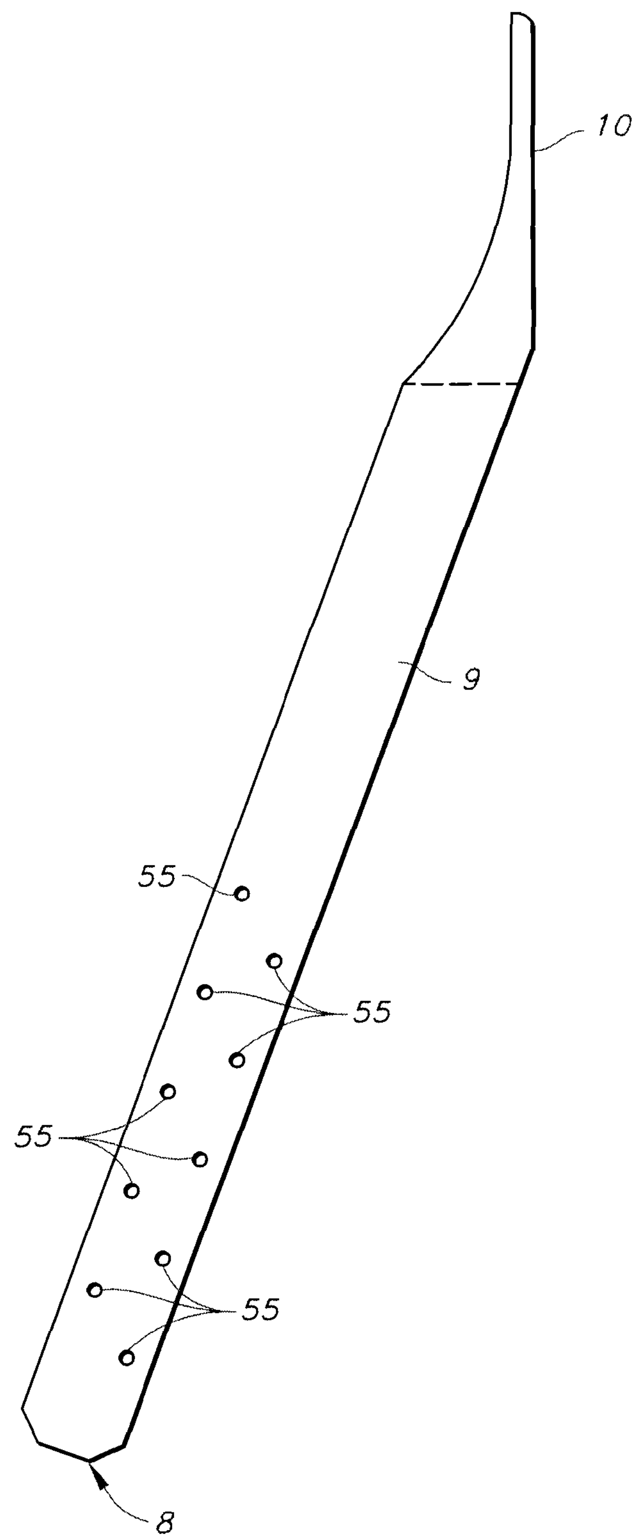
FIG._34

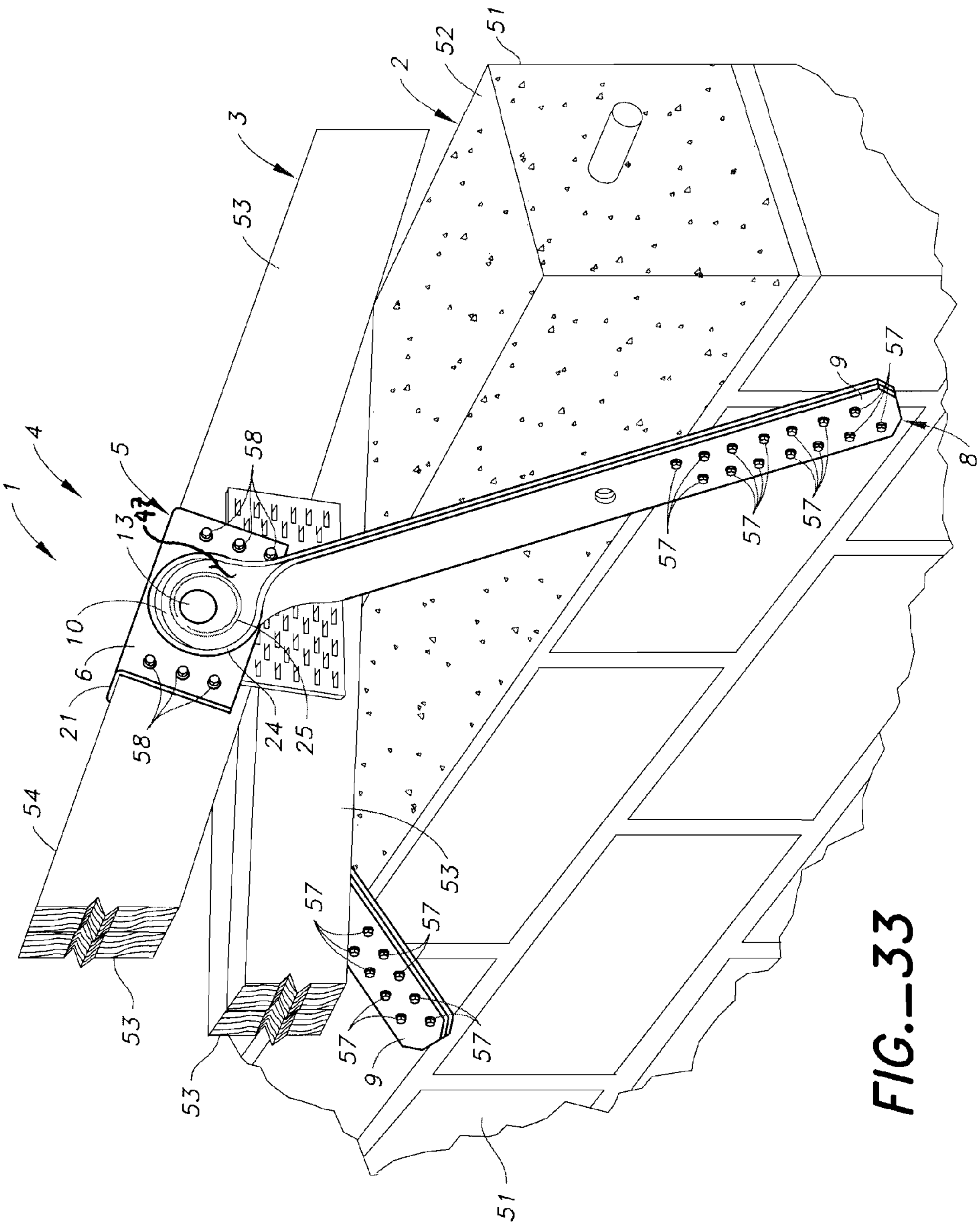
FIG.—33

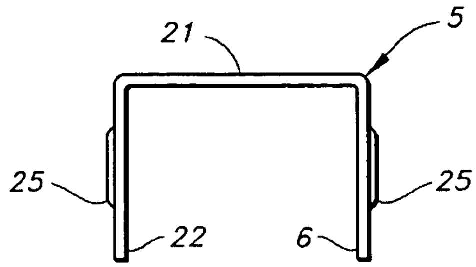
FIG._35
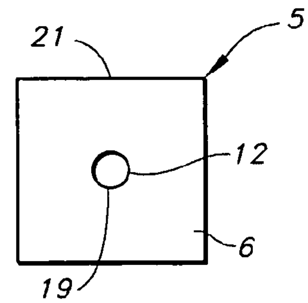
FIG._36
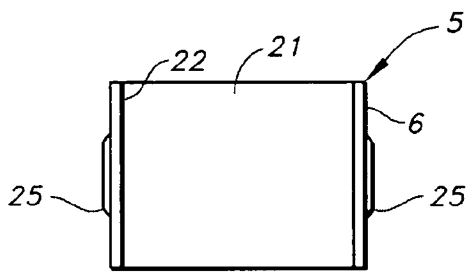
FIG._37
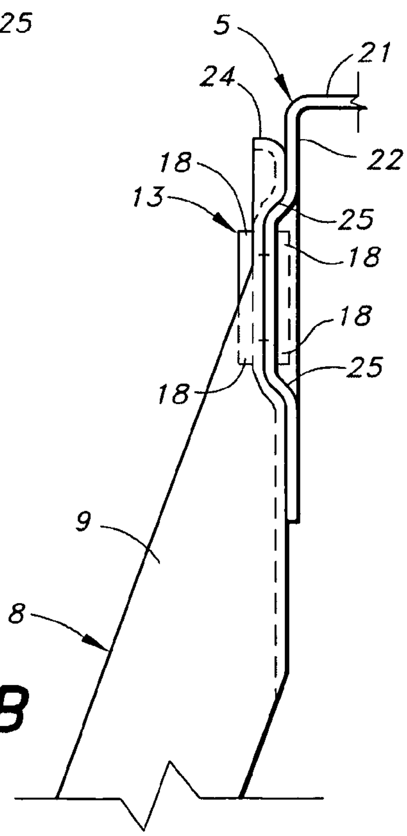
FIG._38B

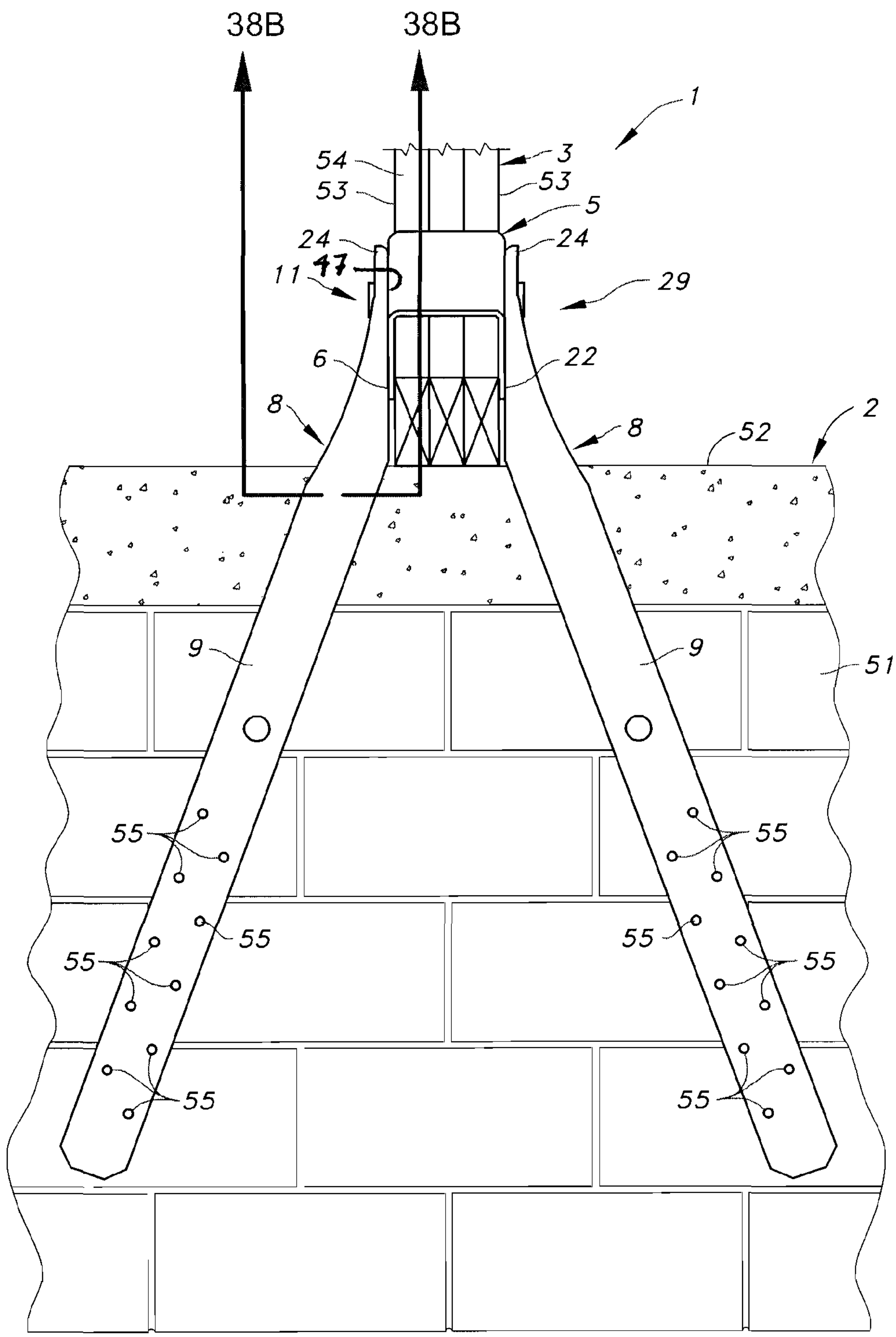
FIG._38A

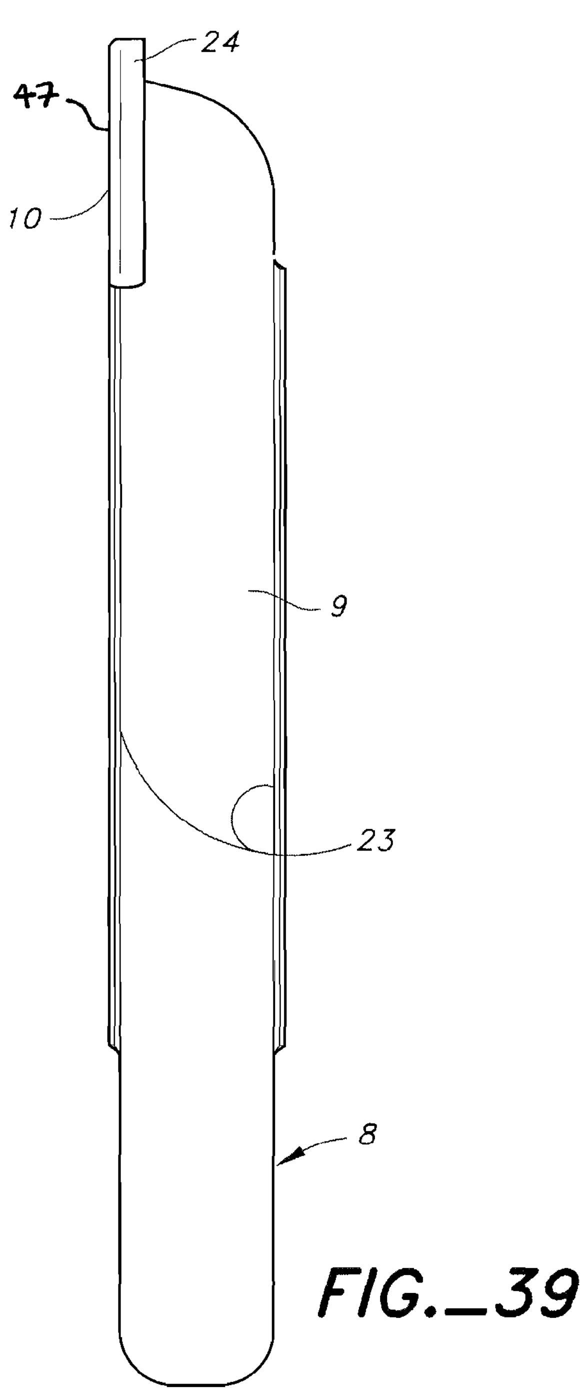
FIG._39
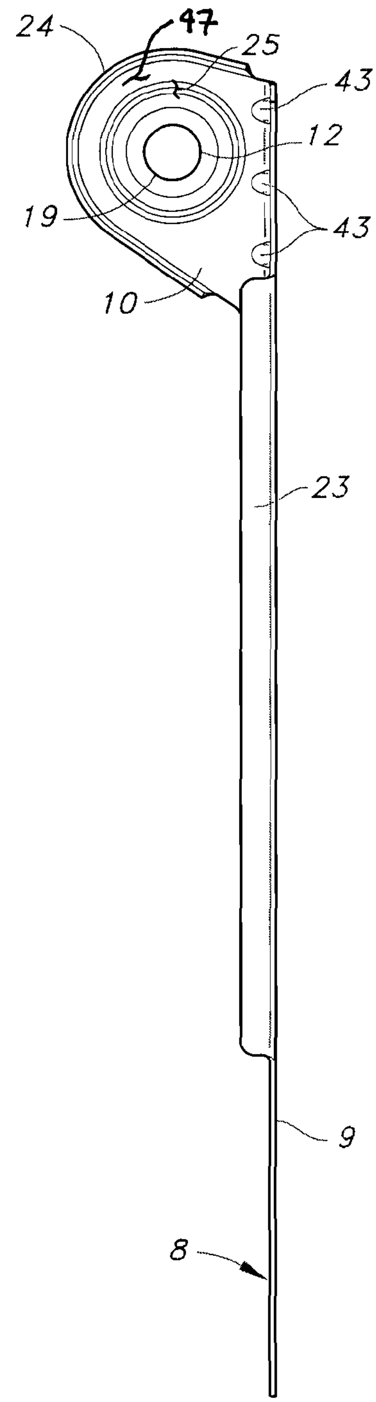
FIG._40
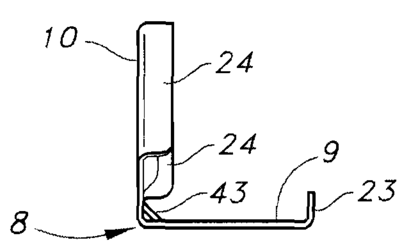
FIG._41

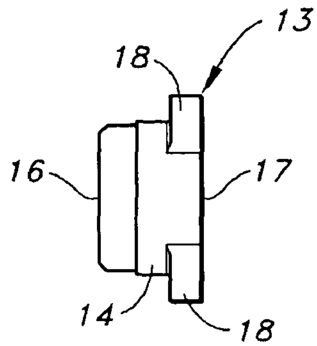
FIG._42
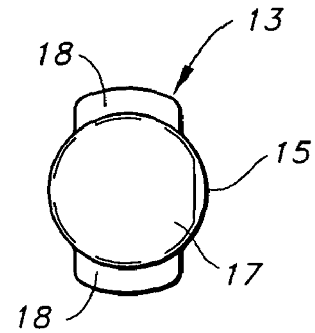
FIG._44
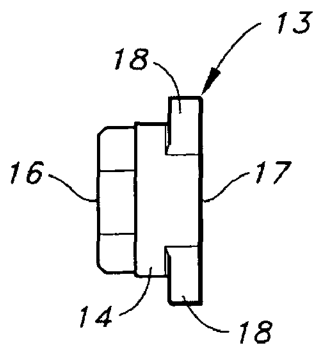
FIG._43
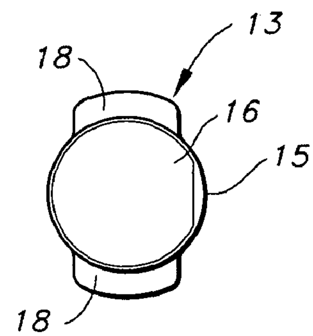
FIG._45
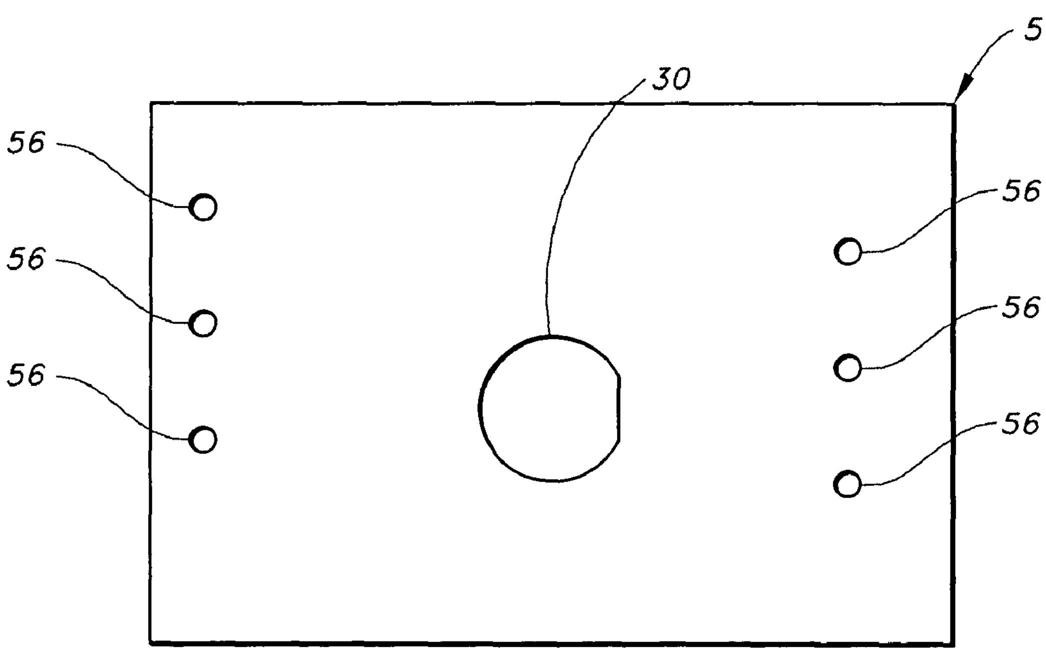
FIG._46

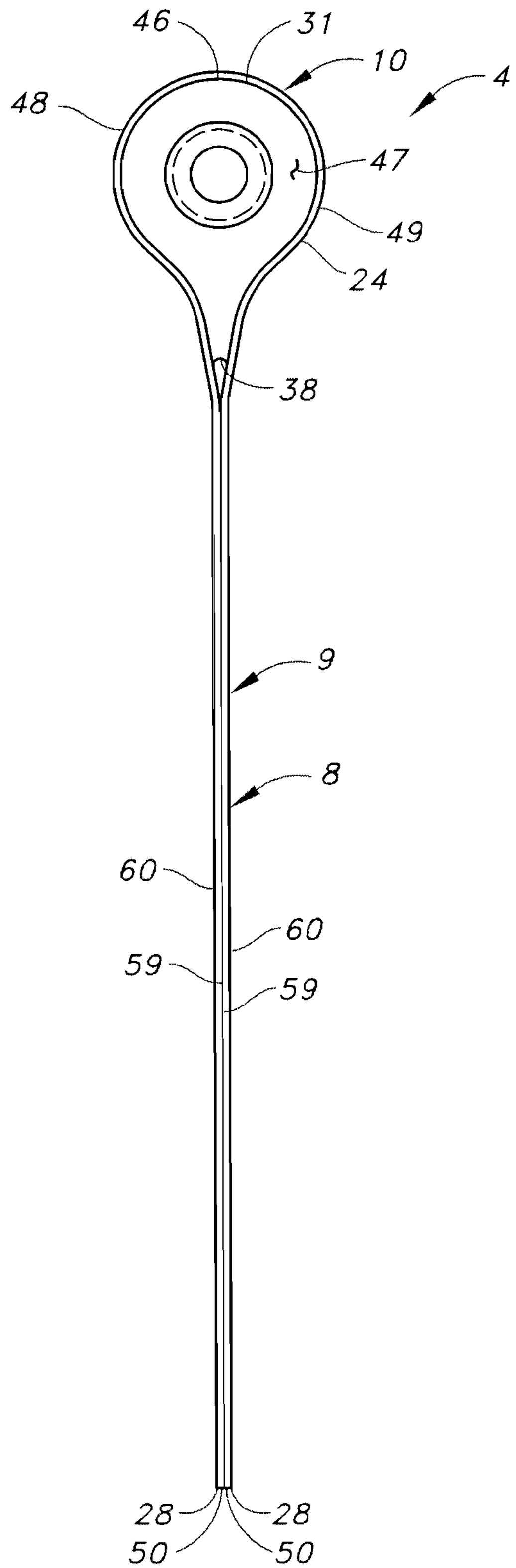
FIG._47
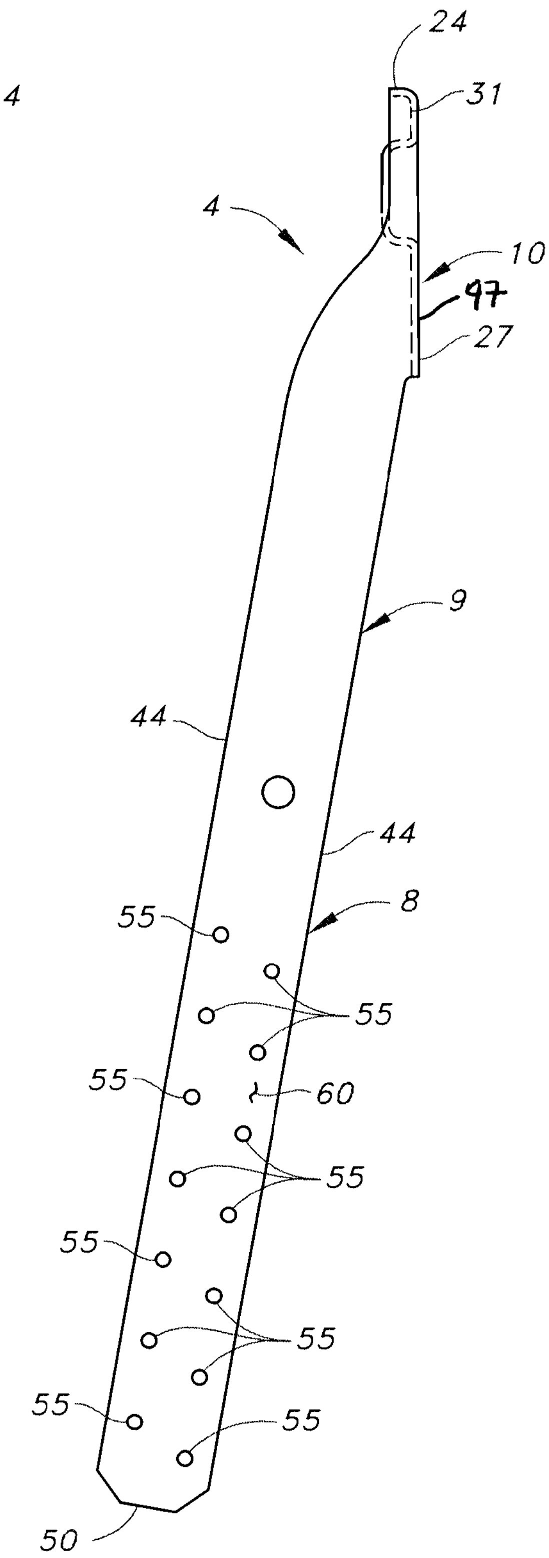
FIG._48

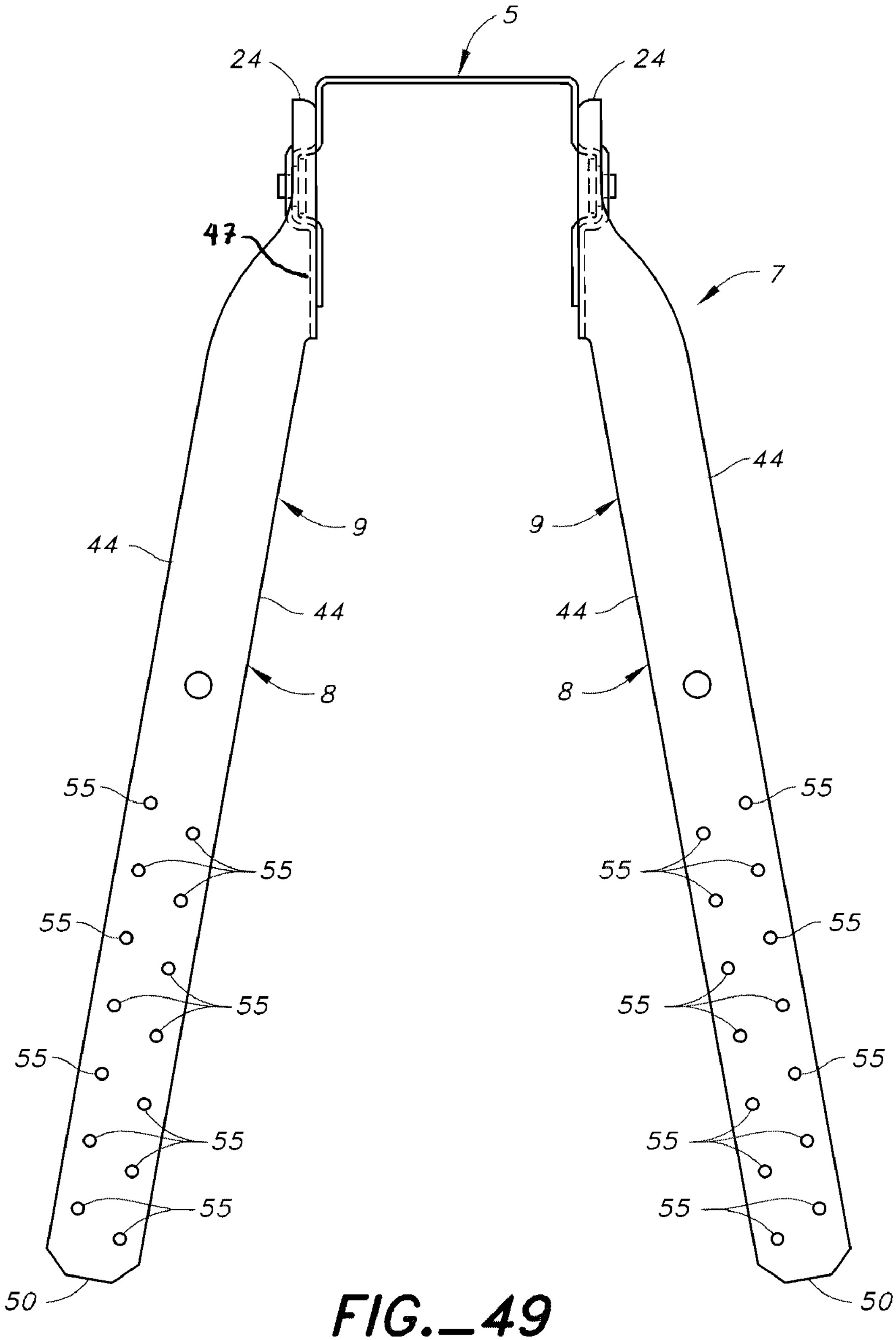
FIG._49

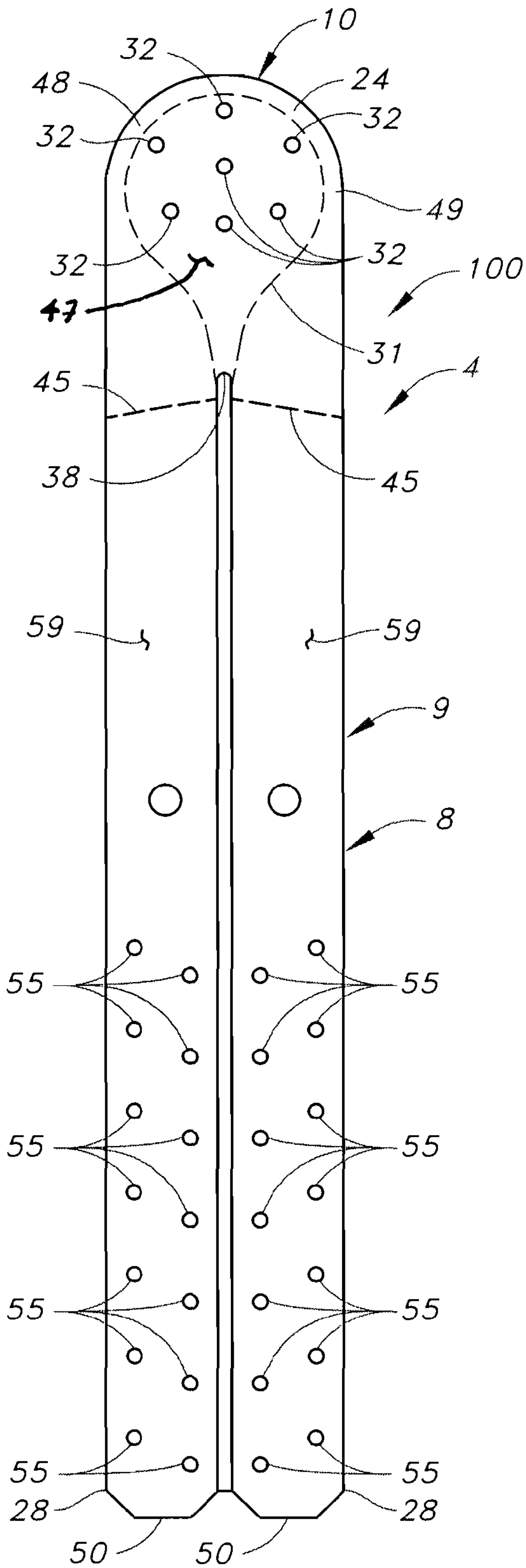
FIG._50
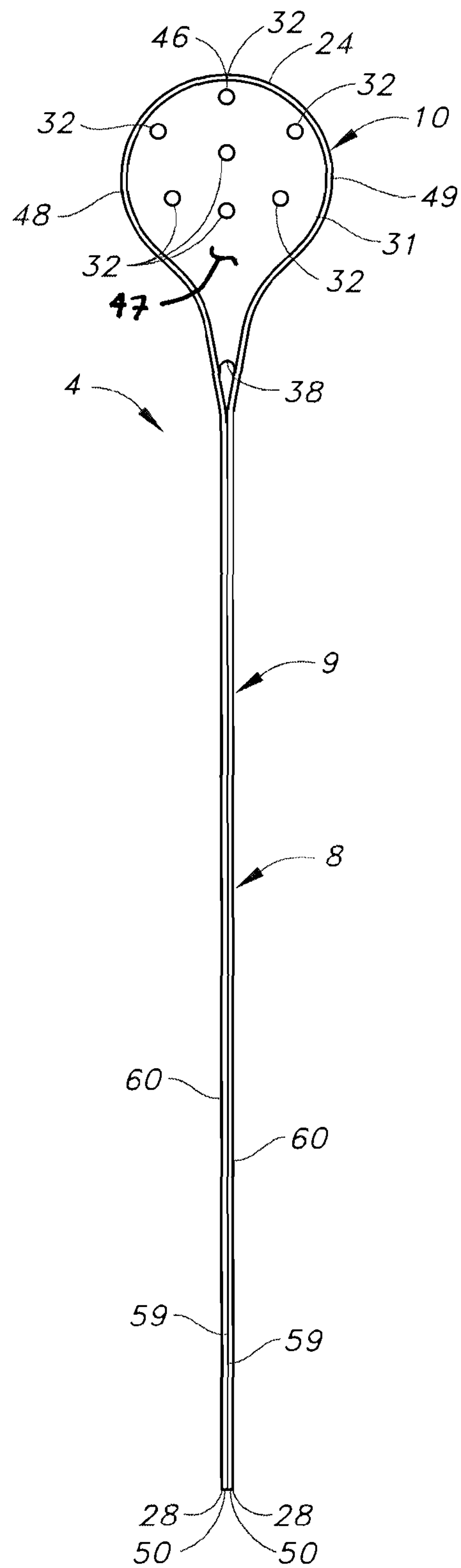
FIG._51

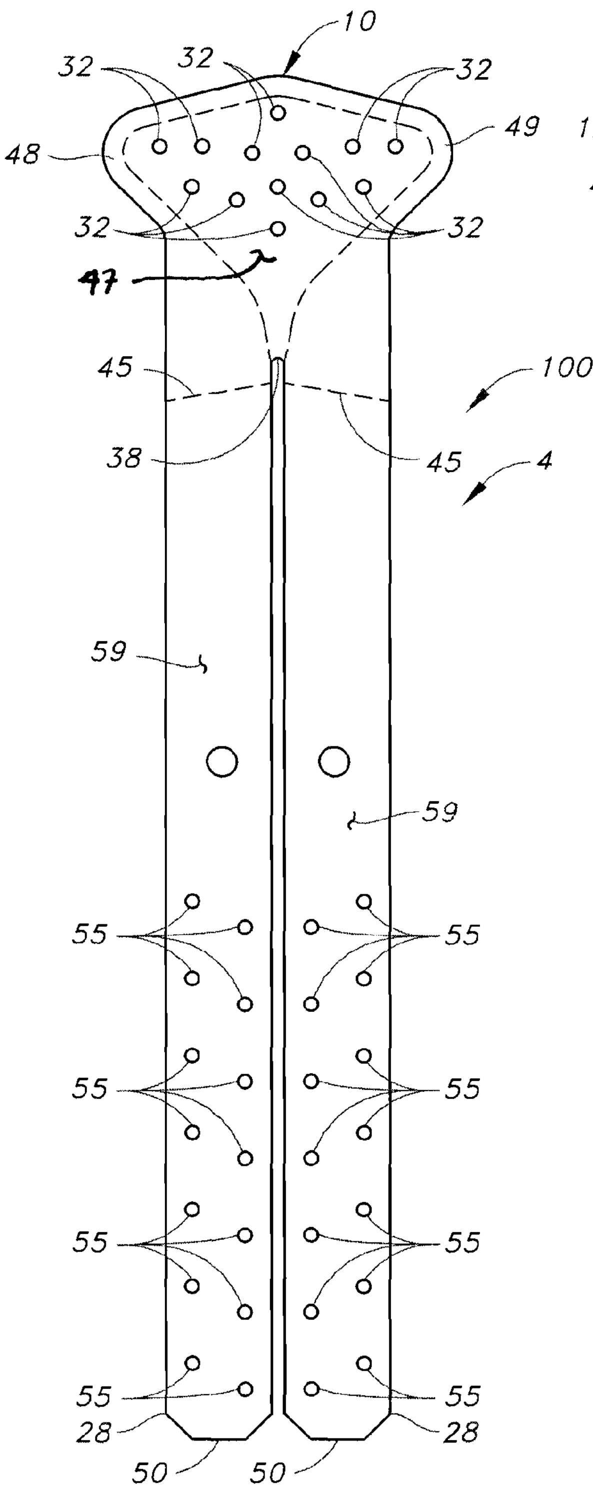
FIG._52
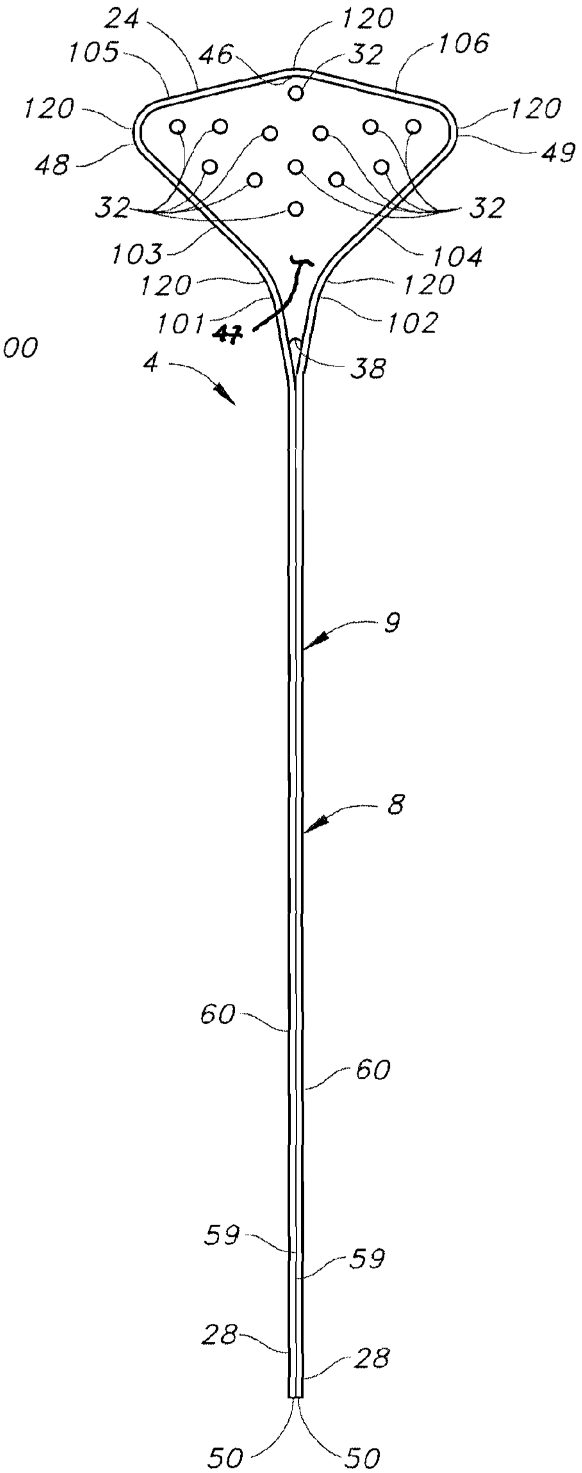
FIG._53

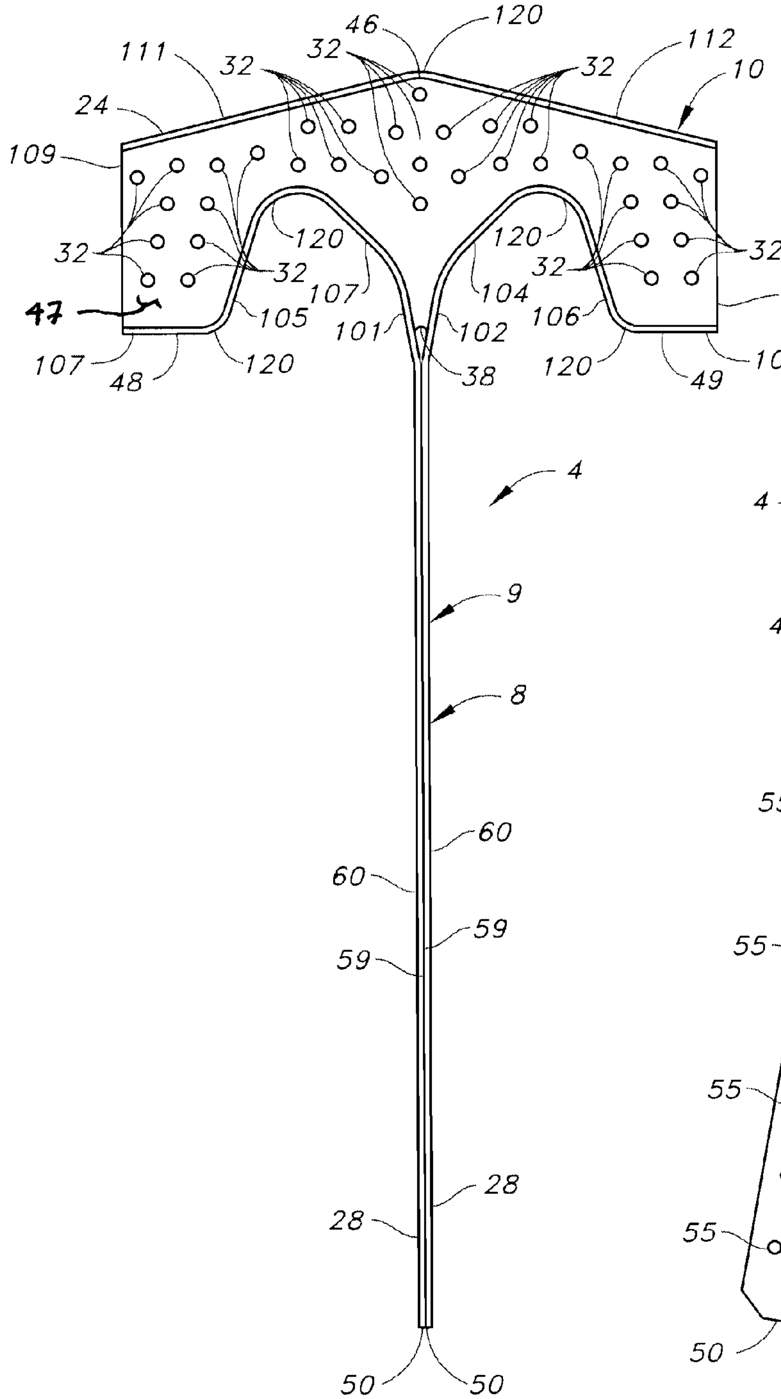
FIG._54
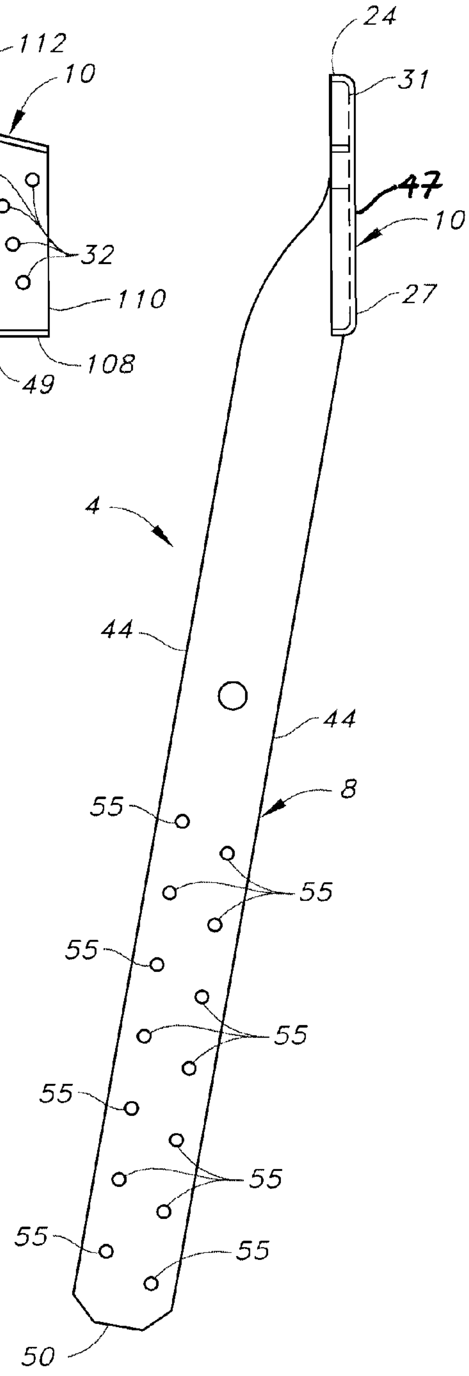
FIG._55

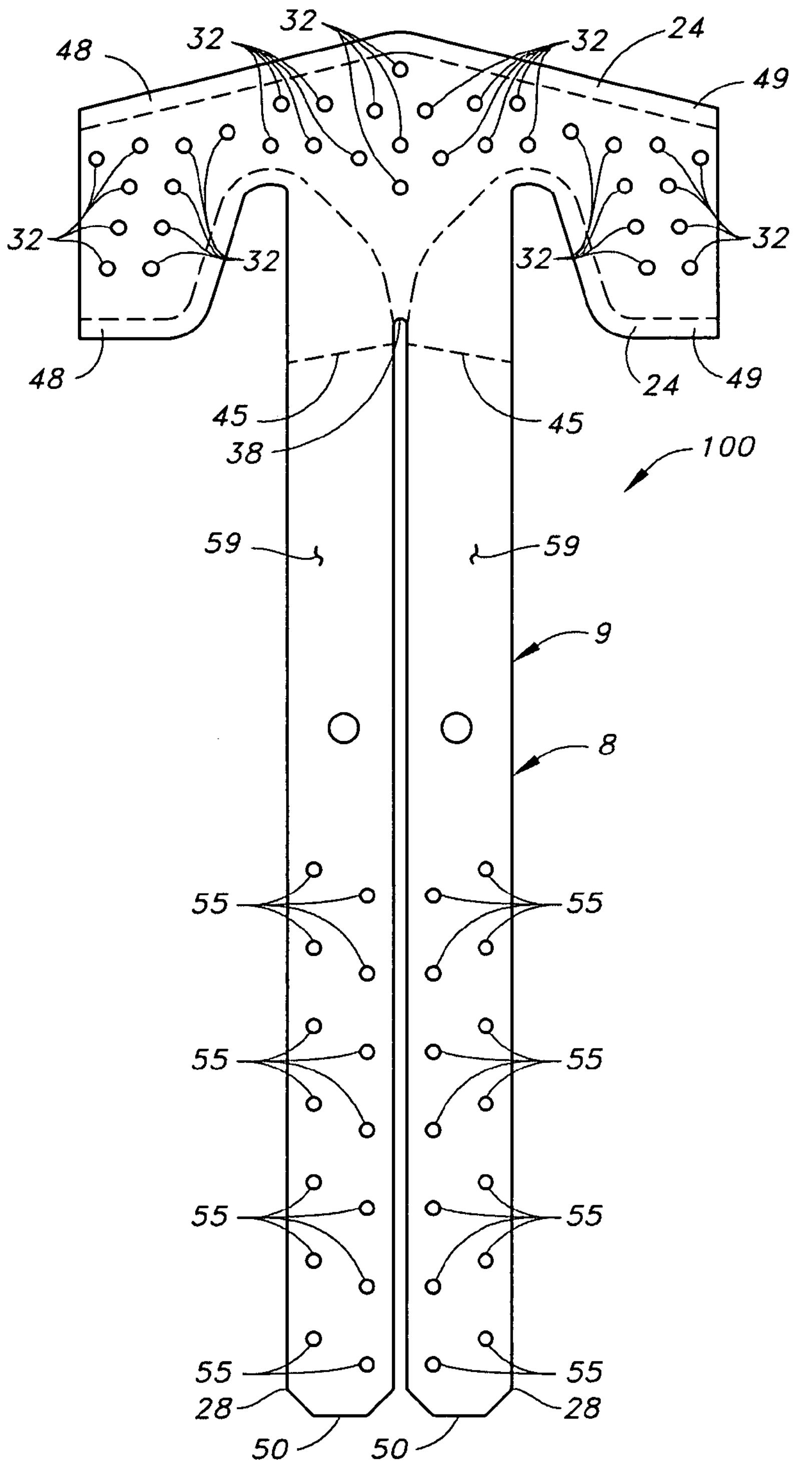
FIG._56

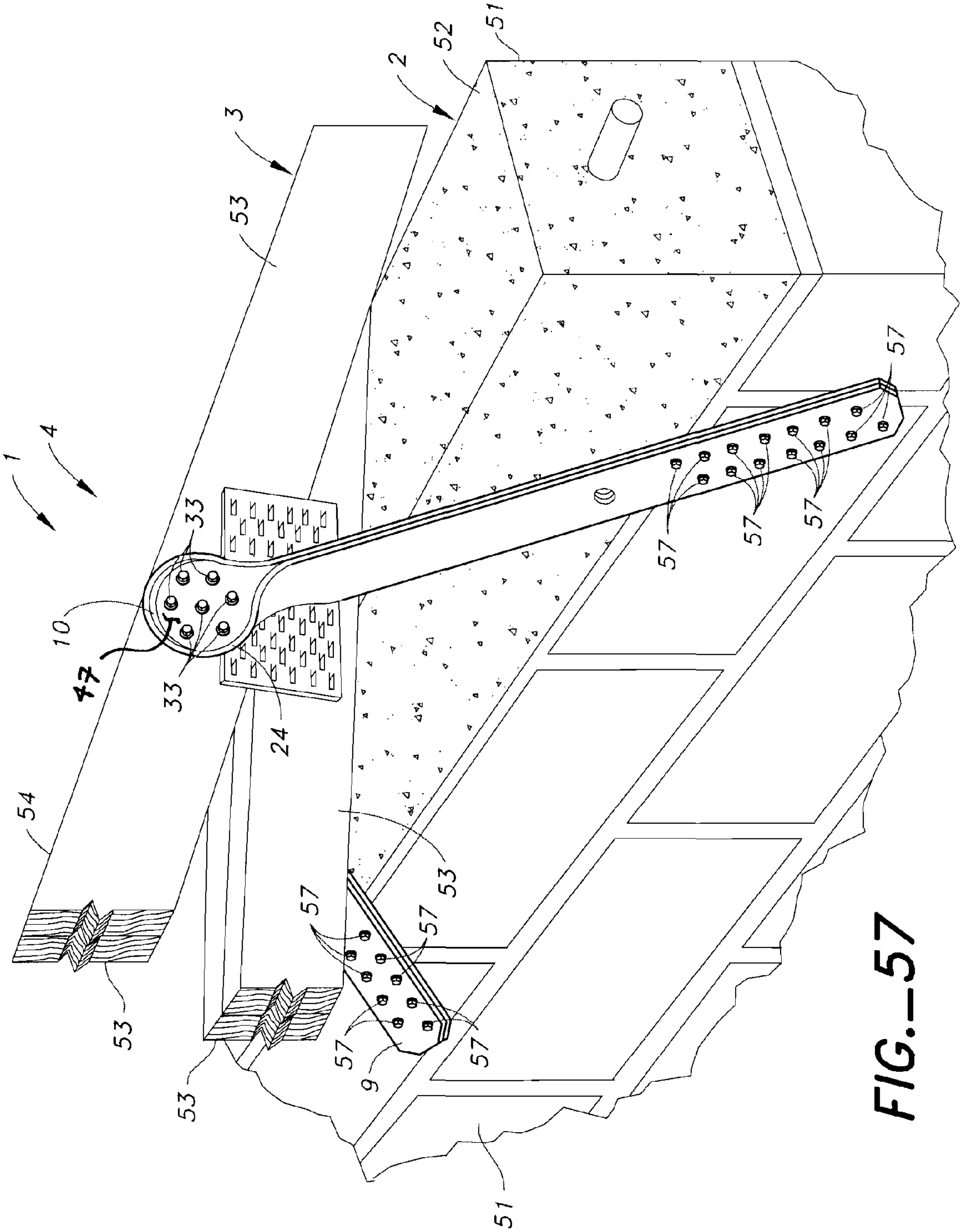
FIG.—57

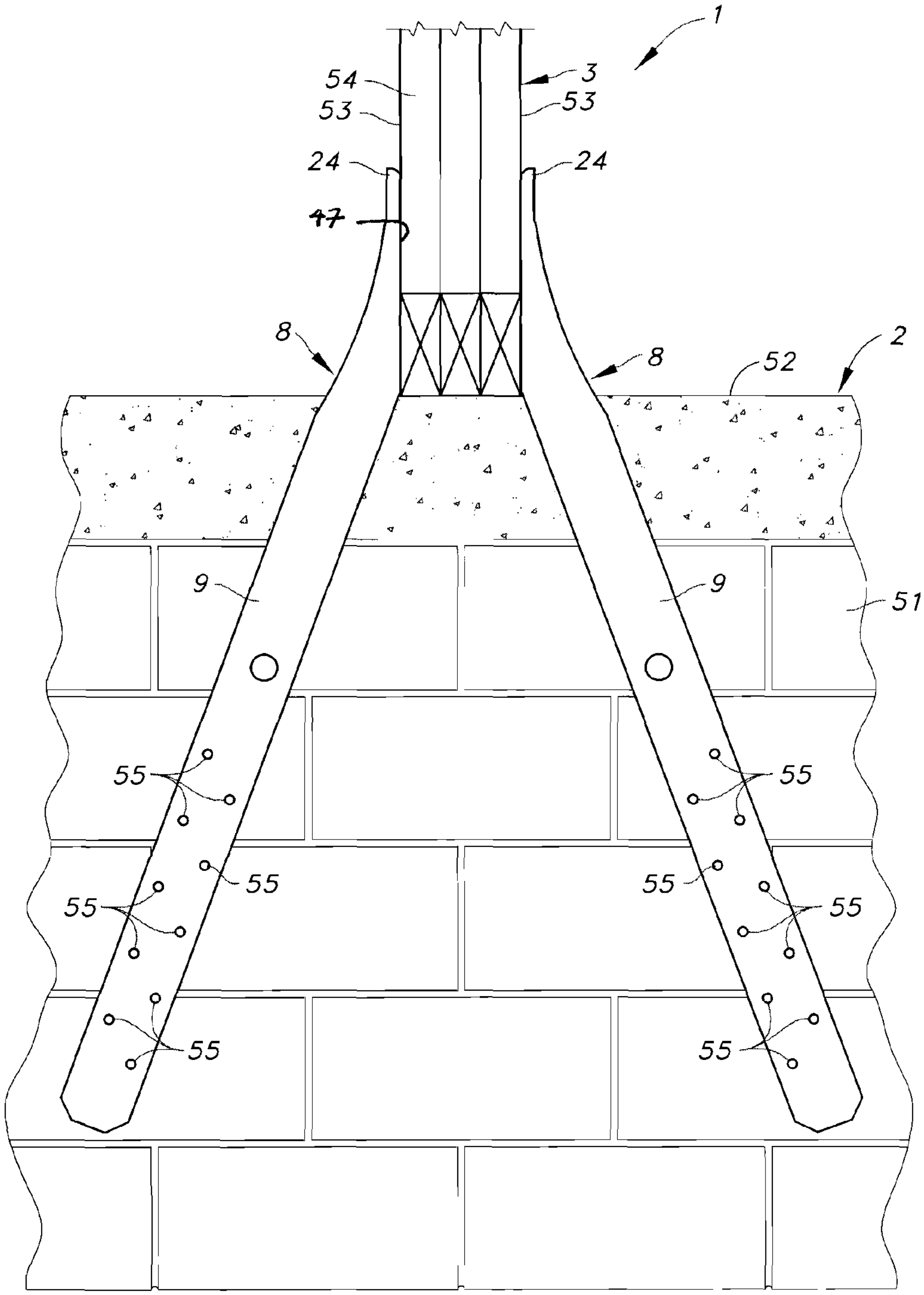
FIG._58

GIRDER TIEDOWN

The present application is a continuation-in-part of Ser. No. 10/912,260, filed Aug. 4, 2004.

BACKGROUND OF THE INVENTION

The roof members of building structures, particularly those located in high wind areas, are often tied down to the supporting wall system to resist the uplift forces caused by winds blowing into, over, and around the structure. Conventionally, these members are tied down to the walls with simple light gauge steel brackets and/or straps which attach to the sides and tops of the roof members and the wall system. The connectors are fastened to the roof and wood wall members with nails or wood screws. The connectors are fastened to concrete or masonry walls with masonry screws, epoxied rods, or are simply embedded into the substrate during construction of the walls. Often the roof is configured such that multiple roof members are supported on one end by the wall and on the other end by a single roof member, commonly referred to as a girder. Each of the roof members which are supported by the girder carry both uplift and download forces which are transferred into the girder through mechanical connections. Often the accumulated forces transferred into the girder can be significant, so much that conventional light gauge connectors do not adequately resist the high uplift forces in the member and as such heavy duty connectors are required to be attached to these girders. Attachment of these heavy duty connectors can be challenging in areas of the country which use concrete or masonry walls because many products are installed to the top of the wall system. This poses problems particularly when products are installed after the framing is complete, which is a common occurrence. Finally, it is standard engineering practice that these high uplift forces are resisted through connector attachment to the top chord of a truss member by either fastening directly to the member or wrapping over the top of the member. Top chord pitches vary widely from job to job and can even vary on the same job in different areas of the roof. The present invention provides a significant improvement on these prior art connectors by offering a connector which can be field adjusted to meet the variable roof pitches and can attach to the face of the wall by means of masonry anchors driven into the constructed wall. The invention can be attached to the top chord through high capacity screws or the traditional method of wrapping over the truss. The present invention also provides an adjustable connector that does not have to be embedded in concrete or masonry and that has unusually strong pin connections that make it adjustable.

SUMMARY OF THE INVENTION

An object of the present invention is to provide an adjustable connector for connecting an elongate substantially vertical supporting structural member and an elongate generally horizontal supported structural member. This object is achieved by providing a connector with a side attachment member that attaches to an elongate substantially vertical supporting structural member and a cap that attaches to the elongate generally horizontal supported structural member, with a pin connection that enables rotation between the cap and the side attachment member.

An object of the present invention is to provide a pin connection that prevents inadvertent separation of the cap and the side attachment member. This object is achieved by providing a pin connection with a pin opening in either the cap or the first side attachment member, or both, and a pin that passes through the pin opening or openings, the pin having one or more restraint extensions that extend beyond the circumference of the pin opening or openings, preventing the pin from withdrawing from the pin opening or openings. In some embodiments, this is achieved by forming the restraint extensions with one or more lobes that extend beyond the body of the pin and the pin opening.

The pin is able to rotate within the pin opening or openings. If the pin is fixed to either the cap or side attachment member, the pin opening is in the other of the cap or side attachment member. The pin opening is not sealed. By contrast, a preferred method of attaching the pin is to insert its first end in a D-shaped aperture in either the cap or side attachment member. The first end of the pin is formed with a D-shaped circumference and it is welded in place in the D-shaped aperture so that it cannot rotate within the D-shaped aperture or withdraw from it, and the D-shaped aperture is sealed so that there is no visible opening.

An object of the present invention is to provide a strong pin connection. In some embodiments, this is achieved by fixedly attaching the pin to either the cap or the side attachment member. In some embodiments, this is further achieved by welding the first end of the pin to the cap. In other possible embodiments, the pin can be fixedly attached to the side attachment member. In some embodiments, the pin is not fixed to either the cap or the side attachment member, but instead passes through pin openings in both and has restraint extensions at both ends. In some embodiments, these are formed as circumferential flanges. In some embodiments, this is simply achieved by using a rivet as the pin.

An object of the present invention is to provide a pin connection that allows the cap and side attachment member to be separated. In some embodiments, this is achieved by forming the pin opening with open lobes that match the lobes on the pin, like a keyhole and key combination.

An object of the present invention is to provide a connector that resists uplift. In some embodiments, this is achieved by forming the cap with a substantially planar top attachment portion that interfaces with the supported structural member.

An object of the present invention is to provide a connector that attaches to both sides of the supported structural member. In some embodiments, this is achieved by forming the cap with a second substantially planar side attachment portion.

An object of the present invention is to provide a connector that attaches to both side of the supporting structural member. In some embodiments, this is achieved by having a second side attachment member and a second pin connection. If the cap has no substantially planar top attachment portion, a connector that has a second side attachment member and a cap with a second substantially planar side attachment portion, is the same as two connectors that each have only a first side attachment member and a cap with only a first substantially planar side attachment portion.

An object of the present invention is to provide a connector that provides rotation on an axis parallel to the supporting structural member. In some embodiments, this is achieved by forming the side attachment member with a connection portion that is attached to the edge of the substantially planar attachment portion. In some embodiments, this is further achieved by welding the connection portion to the substantially planar attachment portion.

An object of the present invention is to provide a secure connection between the connector and the supporting structural member. This is achieved by forming the side attachment member with fastener openings and passing fasteners through the openings and into the supporting structural member.

An object of the present invention is to provide a secure connection between the connector and the supporting structural members. This is achieved by forming the side attachment member with fastener opening and passing fasteners through the openings and into the supporting structural member. If the supporting structural member is made of masonry or concrete, the preferred fasteners connecting the side attachment member with are masonry anchors.

An object of the present invention is to provide a secure connection between the connector and the supported structural members. This is achieved by forming the cap with fastener opening and passing fasteners through the openings and into the supported structural member. If the cap is formed with a with a substantially planar top attachment portion and a second substantially planar side attachment portion, the preferred fasteners connecting the cap to the supported structural member are nails. If the cap is formed without a substantially planar top-attachment portion, the preferred fasteners connecting the cap to the supported structural member are self-drilling wood screws.

An object of the present invention is to provide a connector that is corrosion resistant. This is achieved by forming the connector from galvanized steel and, when the connector includes welding, painting the connector.

An object of the present invention is to provide a connector that has reinforced pin openings. In some embodiments, this is achieved by creating circumferential embossments around the pin openings. A further object of the present invention is to provide pin openings that share the transfer of loads between the cap and the side attachment members with the pin. In some embodiments, this is achieved by forming the cap and side attachment members with matching embossments that fit together with matched bearing surfaces.

An object of the present invention is to provide a connector that has side attachment members that are reinforced against bending. In some embodiments, this is achieved by forming the substantially planar attachment portions with reinforcing flanges. In some embodiments, this is achieved by forming the connection portions with reinforcing flanges.

An object of the present invention is to provide a connector that has side attachment members that are simple, strong and lightweight. In some embodiments, this is achieved by forming the side attachment member by bending a V-shaped length of steel in half to form a two-ply substantially planar attachment portion and a connection portion that joins the plies at the point where the two legs of the V join.

There are two basic preferred types of the present invention. The first is formed from heavier gauge steel, includes welding, and is painted, which is a matter of course when the connector includes welded parts, since welding destroys the corrosion protection offered by galvanized steel. Preferably, the heavier gauge steel type of the present invention uses a pin that is welded to one component of the connector. The second basic type of the present invention is formed from lighter gauge steel, is not welded, and is therefore not painted either. The lighter gauge steel type preferably uses a pin component that is separate from the components that connect to the supporting structural member and the supported structural member. The light gauge steel type preferably includes features, such as additional flanges and embossments, that stiffen it and thereby provide strength similar to that of the heavier gauge steel.

Both basic preferred types of the present invention have a cap that connects to or holds the supported structural member, and two side attachment members, or straps, that are connected to the cap by pin connections and which, in turn, connect to the supporting structural member.

In the first basic preferred form of the present invention, the pin is a post that is connected to, or part of, either the cap or side attachment member. There is a matching pin opening in the opposed cap or side attachment member, through which the post passes, forming a hinge. The preferred form of this pin connection permits the cap and side members to be separated from each other.

In the second basic preferred form of the present invention, the pin is separate from the cap and side attachment members, both of which have pin openings, so that the pin passes through both the cap and the side attachment member. The ends of the pin are widened and the cap and side attachment members can not be separated.

Another object of the present invention is to provide an unadjustable girder tiedown that can be made easily and at low cost on automated machinery without welding or painting and that can be directly attached to the supporting and supported structural members without the use of a cap.

BRIEF DESCRIPTION OF THE DRAWINGS

FIG. 1A is a perspective view of a concrete masonry wall, with a concrete tie beam surmounting the wall, supporting a pitched girder truss that is orthogonal to the wall and ends at the outer side of the wall, and a two-sided form of the connector of the present invention that has fixed pins.

FIG. 1B is a perspective view of a concrete masonry wall, with a concrete tie beam surmounting the wall, supporting a pitched girder truss that is orthogonal to the wall and which overhangs the outer side of the wall, and a two-sided form of the connector of the present invention that has fixed pins.

FIG. 1C is a perspective view of a concrete masonry wall, with a concrete tie beam surmounting the wall, supporting a flat girder truss that is orthogonal to the wall and ends at the outer side of the wall, and a two-sided form of the connector of the present invention that has fixed pins.

FIG. 1D is a perspective view of a wood frame wall, with a double top plate surmounting the wall, supporting a pitched girder truss that is orthogonal to the wall and which overhangs the outer side of the wall, and a two-sided form of the connector of the present invention that has fixed pins.

FIG. 2 is a side elevation view of an embodiment of the side attachment member of the connector of the present invention in which the connection portion is welded to the edge of the substantially planar attachment portion.

FIG. 3 is a front elevation view of an embodiment of the side attachment member of the connector of the present invention in which the connection portion is welded to the edge of the substantially planar attachment portion.

FIG. 4 is another side elevation view of an embodiment of the side attachment member of the connector of the present invention in which the connection portion is welded to the edge of the substantially planar attachment portion.

FIG. 5 is an end elevation view of an embodiment of the side attachment member of the connector of the present invention in which the connection portion is welded to the edge of the substantially planar attachment portion.

FIG. 6 is a top plan view of an embodiment of the cap of the connector of the present invention in which the cap has two substantially planar side attachment members joined by a substantially planar top attachment portion and two fixed pins with restraint extensions in the form of twin lobes.

FIG. 7 is a side elevation view of an embodiment of the cap of the connector of the present invention in which the cap has two substantially planar side attachment members joined by a substantially planar top attachment portion and two fixed pins with restraint extensions in the form of twin lobes.

FIG. 8 is a front elevation view of an embodiment of the cap of the connector of the present invention in which the cap has two substantially planar side attachment members joined by a substantially planar top attachment portion and two fixed pins with restraint extensions in the form of twin lobes.

FIG. 9 is a bottom plan view of an embodiment of the cap of the connector of the present invention in which the cap has two substantially planar side attachment members joined by a substantially planar top attachment portion and two fixed pins with restraint extensions in the form of twin lobes.

FIG. 10 is an elevation view of the outer side of a concrete masonry wall, with a concrete tie beam surmounting the wall, supporting a pitched girder truss that is orthogonal to the wall, and a two-sided form of the connector of the present invention that has fixed pins and a cap that has two substantially planar side attachment members joined by a substantially planar top attachment portion.

FIG. 11 is a perspective view of a concrete masonry wall, with a concrete tie beam surmounting the wall, supporting a pitched girder truss that is orthogonal to the wall and which overhangs the outer side of the wall, and a two-sided form of the connector of the present invention that has fixed pins and a split cap that has two substantially planar side attachment portions but no substantially planar top attachment portion connecting the two.

FIG. 12 is a top plan view of an embodiment of the cap of the connector of the present invention in which the cap has one substantially planar side attachment member and a fixed pin with a restraint extension in the form of twin lobes.

FIG. 13 is a side elevation view of an embodiment of the cap of the connector of the present invention in which the cap has one substantially planar side attachment member and a fixed pin with a restraint extension in the form of twin lobes.

FIG. 14 is a front elevation view of an embodiment of the cap of the connector of the present invention in which the cap has one substantially planar side attachment member and a fixed pin with a restraint extension in the form of twin lobes.

FIG. 15 is a top plan view of an embodiment of the cap of the connector of the present invention in which the cap has two separate substantially planar side attachment members and two fixed pins with restraint extensions in the form of twin lobes.

FIG. 16 is an elevation view of the outer side of a concrete masonry wall, with a concrete tie beam surmounting the wall, supporting a pitched girder truss that is orthogonal to the wall, and a two-sided form of the connector of the present invention that has fixed pins and a cap that has two separate substantially planar side attachment members.

FIG. 17 is a top plan view of the connection of the present invention in which the supported structural member is not orthogonal to the supporting structural member, meeting the wall at an angle, and the two are connected by a connector with a cap that has two separate substantially planar side attachment members.

FIG. 18 is a top plan view of the connection of the present invention in which the supported structural member is not orthogonal to the supporting structural member, bisecting the corner of a wall, and the two are connected by a connector with a cap that has two separate substantially planar side attachment members.

FIG. 19 is a perspective view of a concrete masonry wall, with a concrete tie beam surmounting the wall, supporting a pitched girder truss that is orthogonal to and at the end of the wall and overhangs the outer side of the wall, and a two-sided form of the connector of the present invention that has one side attachment member with a substantially planar attachment portion and a connection portion in the same plane and a fixed pin.

FIG. 20 is an elevation view of an embodiment of the side attachment member with a substantially planar attachment portion and a connection portion in the same plane and a fixed pin.

FIG. 21 is an elevation view of an embodiment of the side attachment member with a substantially planar attachment portion and a connection portion in the same plane and a fixed pin.

FIG. 22 is a top plan view of a concrete masonry wall, with a concrete tie beam surmounting the wall, supporting a pitched girder truss that is orthogonal to and at the end of the wall and overhangs the outer side of the wall, and a two-sided form of the connector of the present invention that has one side attachment member with a substantially planar attachment portion and a connection portion in the same plane and a fixed pin.

FIG. 23 is an elevation view of the outer side of a concrete masonry wall, with a concrete tie beam surmounting the wall, supporting a pitched girder truss that is orthogonal to and at the end of the wall and overhangs the outer side of the wall, and a two-sided form of the connector of the present invention that has one side attachment member with a substantially planar attachment portion and a connection portion in the same plane and a fixed pin.

FIG. 24 is a perspective view of a concrete masonry wall, with a concrete tie beam surmounting the wall, supporting a pitched girder truss that is orthogonal to the wall and which overhangs the outer side of the wall, and a two-sided form of the connector of the present invention that has fixed pins and a split cap that has two substantially planar side attachment portions but no substantially planar top attachment portion connecting the two. FIG. 24 is identical to FIG. 11 except that FIG. 24 shows a side attachment member in which the connection portion and substantially planar attachment portion are formed, rather than welded, together, as shown in FIG. 8.

FIG. 25 is a side elevation view of an embodiment of the side attachment member of the connector of the present invention in which the connection portion is orthogonally joined to the edge of the substantially planar attachment portion.

FIG. 26 is a front elevation view of an embodiment of the side attachment member of the connector of the present invention in which the connection portion is orthogonally joined to the edge of the substantially planar attachment portion.

FIG. 27 is an end elevation view of an embodiment of the side attachment member of the connector of the present invention in which the connection portion is orthogonally joined to the edge of the substantially planar attachment portion.

FIG. 28 is a top plan view of the connection of the present invention with a cap that has two separate substantially planar side attachment members and two fixed pins with restraint extensions in the form of twin lobes and two side attachment members of the connector of the present invention in which the connection portion is orthogonally joined to the edge of the substantially planar attachment portion.

FIG. 29 is a side elevation view of a first side attachment member that is formed by bending a V-shaped strap to form a two-ply substantially planar attachment portion and a connection portion, with a reinforcing embossment around the pin opening, from the middle of the V-shaped strap.

FIG. 30 is a side elevation view of an embodiment of the cap of the connector of the present invention in which the cap has two substantially planar side attachment members joined by a substantially planar top attachment portion and showing the fixed pin in detail.

FIG. 31 is a front elevation view of an embodiment of the cap of the connector of the present invention in which the cap has two substantially planar side attachment members joined by a substantially planar top attachment portion and showing the fixed pin in detail. FIG. 31 is identical to FIG. 8 but is represented for convenience in viewing different angles of the pin connection in the cap.

FIG. 32 is a cross-sectional view of an embodiment of the cap of the connector of the present invention in which the cap has two substantially planar side attachment members joined by a substantially planar top attachment portion and showing the fixed pin in detail.

FIG. 33 is a perspective view of a concrete masonry wall, with a concrete tie beam surmounting the wall, supporting a pitched girder truss that is orthogonal to the wall and overhangs the outer side of the wall, and a two-sided form of the connector of the present invention that has first side attachment members that are formed by bending a V-shaped strap to form two-ply substantially planar attachment portions and connection portions, with reinforcing embossments around the pin openings, from the middle of the V-shaped strap.

FIG. 34 is a front elevation view of a first side attachment member that is formed by bending a V-shaped strap to form a two-ply substantially planar attachment portion and a connection portion, with a reinforcing embossment around the pin opening, from the middle of the V-shaped strap.

FIG. 35 is a front elevation view of an embodiment of the cap of the connector of the present invention in which the cap has two substantially planar side attachment members joined by a substantially planar top attachment portion and two pin openings.

FIG. 36 is a side elevation view of an embodiment of the cap of the connector of the present invention in which the cap has two substantially planar side attachment members joined by a substantially planar top attachment portion and two pin openings.

FIG. 37 is a bottom plan view of an embodiment of the cap of the connector of the present invention in which the cap has two substantially planar side attachment members joined by a substantially planar top attachment portion and pin openings.

FIG. 38A an elevation view of the outer side of a concrete masonry wall, with a concrete tie beam surmounting the wall, supporting a pitched girder truss that is orthogonal to the wall, and a two-sided form of the connector of the present invention that has first side attachment members that are formed by bending a V-shaped strap to form two-ply substantially planar attachment portions and connection portions, with reinforcing embossments around the pin openings, from the middle of the V-shaped strap.

FIG. 38B is an end view of an embodiment of the pin connection showing matching embossments in the cap and side attachment member and a reinforcing flange in the side attachment member.

FIG. 39 is a front elevation view of a first side attachment member that is formed with reinforcing flanges and a reinforcing embossment around the pin opening.

FIG. 40 is a side elevation view of a first side attachment member that is formed with reinforcing flanges and a reinforcing embossment around the pin opening.

FIG. 41 is an end elevation view of an embodiment of the side attachment member of the connector of the present invention in which the connection portion and the substantially planar attachment portion are both formed with reinforcing flanges and the connection portion is formed with a reinforcing embossment around the pin opening.

FIG. 42 is a side elevation view of an embodiment of the fixed pin of the present invention.

FIG. 43 is an opposite side elevation view of an embodiment of the fixed pin of the present invention.

FIG. 44 is a top plan view of an embodiment of the fixed pin of the present invention, showing the D-shape of the first end of the pin in dotted line, but not showing all three diameters of the preferred embodiment because they are too close to be shown fully separated.

FIG. 45 is a bottom plan view of an embodiment of the fixed pin of the present invention, showing the D-shape of the first end of the pin, but not showing all three diameters of the preferred embodiment because they are too close to be shown fully separated.

FIG. 46 is a side elevation view of the an embodiment of the cap of the connector of the present invention showing the D-shaped fixture opening before the pin is inserted and fixed.

FIG. 47 is a side elevation view of a first side attachment member that is formed by bending a V-shaped strap to form a two-ply substantially planar attachment portion and a connection portion, with a reinforcing embossment around the pin opening, from the middle of the V-shaped strap.

FIG. 48 is a front elevation view of a first side attachment member that is formed by bending a V-shaped strap to form a two-ply substantially planar attachment portion and a connection portion, with a reinforcing embossment around the pin opening, from the middle of the V-shaped strap.

FIG. 49 is a front elevation view of two side attachment members formed by bending a V-shaped strap connected by a cap member to which they are attached by pins.

FIG. 50 is a top plan view of a V-shaped blank from which an unadjustable embodiment of a side attachment member with a teardrop-shaped connection portion is formed.

FIG. 51 is a side elevation view of an unadjustable embodiment of a side attachment member with a teardrop-shaped connection portion.

FIG. 52 is a top plan view of a V-shaped blank from which an unadjustable embodiment of a side attachment member with a connection portion in the general shape of an irregular quadrilateral is formed.

FIG. 53 is a side elevation view of an unadjustable embodiment of a side attachment member with a connection portion in the general shape of an irregular quadrilateral.

FIG. 54 is a top plan view of an unadjustable embodiment of a side attachment member with a connection portion that is generally M-shaped.

FIG. 55 is a side elevation view of an unadjustable embodiment of a side attachment member with a connection portion that is generally M-shaped.

FIG. 56 is a top plan view of a V-shaped blank from which an unadjustable embodiment of a side attachment member with a connection portion that is generally M-shaped is formed.

FIG. 57 is a perspective view of a concrete masonry wall, with a concrete tie beam surmounting the wall, supporting a pitched girder truss that is orthogonal to the wall and ends at the outer side of the wall, and a two-sided form of the connection of the present invention that is unadjustable and has teardrop-shaped connection portions.

FIG. 58 is an elevation view of the outer side of a concrete masonry wall, with a concrete tie beam surmounting the wall, supporting a pitched girder truss that is orthogonal to the wall, and a two-sided form of the connection of the present invention that is unadjustable and has teardrop-shaped connection portions.

DETAILED DESCRIPTION OF THE INVENTION

Basic Connection

As shown in FIGS. 1A-1D, the present invention is a connection 1 that comprises an elongate substantially vertical supporting structural member 2, further comprising two sides 51 and a top 52, supporting an elongate generally horizontal supported structural member 3, further comprising two sides 53 and a top 54, that is not parallel to the elongate substantially vertical supporting member 2, and a connector 4. In most installations, the supported structural member 3 and the supporting structural member 2 will be generally orthogonal, but as shown in FIG. 17 the supported structural member 3 may be diagonal to the supporting structural member 2. In particular, as shown in FIG. 18, trusses, the preferred form of the supported structural member 3, installed at corners run at 45 degrees to the supporting structural member 2, bisecting what is usually a 90 degree angle between two walls, the preferred form of the supporting structural member 2.

The elongate substantially vertical supporting structural member 2 is preferably a building wall 2, typically an exterior wall 2, possibly framed in wood, as shown in FIG. 1D, or steel, but typically a masonry wall 2, as shown in FIGS. 1A-1C, 10, 11, 15-19, 22-24, 28, 33 and 38A. In particular, the masonry wall 2 is illustrated as concrete block surmounted by a poured concrete tie beam. In all of Florida except the northernmost part, it is common to see structures built with concrete block masonry exterior walls 2. Concrete block is used because it has some inherent wind-resistance benefits, and because it resists termite infestation. It develops a good load path to resist uplift forces caused by wind, it is heavier than wood framing, a reinforced concrete block wall system creates fewer connection points than wood framing, which may imply fewer construction errors, and concrete block offers impact resistance to windborne debris. Concrete block exterior walls 2 are not composed solely of concrete block; instead, the concrete blocks usually sit within a grid of poured concrete and rebar. A key structural element of an exterior concrete block wall is usually the tie beams. The tie beam is located at the top 54 of the wall 2 and is either poured concrete or masonry bond beams (U-shaped concrete blocks filled with concrete). Poured concrete naturally creates a level tie beam, but it is only common in the southernmost part of Florida. In the prior art, hurricane straps that held down the roof trusses were placed in the still-wet concrete; if mislocated, they could be replaced by hurricane straps retrofitted to the tie beam with masonry anchors.

The elongate generally horizontal supported structural member 3 is preferably a roof member, such as a beam, girder, truss, girder truss or rafter 3. The particular connection that is shown in shown in FIGS. 1A-1D, 10, 11, 15-19, 22-24, 28, 33 and 38A is between a girder truss 3 and a wall 2. A girder truss 3 is a heavy truss from which other, lighter trusses may be suspended. Girder trusses 3 require stronger tie down connectors 4 because they generate high uplift forces, particularly in high wind areas and particularly when they overhang the outside of the wall 2. The greater the overhang, the more uplift is caused by wind loading. Larger overhangs are, however, particularly desirable in areas with a lot of rain, which are also typically areas with high winds.

The connector 4 of the present invention improves on the prior art by providing an exceptionally strong connection 1 between trusses 3 and walls 2 that need not be cast in concrete, is suitable for both original and retrofit installations, and is adjustable to accommodate trusses 3 of various pitches. At its most basic, the connector 4 comprises a cap 5, connected to said supported structural member 3, a first side attachment member 8 and a pin connection 11 between the cap 5 and the first side attachment member 8. The cap 5 comprises a first substantially planar side attachment portion 6 that interfaces with the supported structural member 3. The first side attachment member 8 comprises a substantially planar attachment portion 9 that interfaces with and is fastened to the supporting structural member 2, and a connection portion 10 that is positioned alongside the first substantially planar side attachment portion 6 of the cap 5. The first pin connection 11 enables rotation between the cap 5 and the first side attachment member 8, and that connects said cap 5 to said first attachment member 8, so that the cap 5 can be attached to supported structural members 8 of various pitches.

There are several primary variations on the basic form of the connector 4 of the present invention. The connector 4 can be either one-sided or two-sided, having either only a first side attachment member 8 when it is one-sided or a first side attachment member 8 and a second side attachment member 26 when it is two-sided. The cap 5 can take several different basic forms. The pin connections 11 can either have pin 13 that is fixed to either the cap 5 or the one of the first and second side attachment members 8 and 26, or a pin 13 that is separate from the cap 5 and the first and second side attachment members 8 and 26. If the pin 13 is fixed, it passes through one pin opening 12 in the cap 5 or the one of the first and second side attachment members 8 and 26. If the pin 13 is separate, it passes through two matching pin openings 12 in the cap 5 and one of the first and second side attachment members 8 and 26. If the connector 4 is one-sided, it will preferably have one side attachment member 8 positioned to one side of the supported structural member 3. If the connector 4 is two-sided it will preferably have two side attachment members 8 and 26, one on each side of the supported structural member 3. The cap 5 can take three basic forms. First, an inverted U-shaped, with two substantially planar side attachment portions 6 and 22 that interface with the sides 53 of the supported structural member 3 and a substantially planar top attachment portion 21 that connects the two substantially planar side attachment portions 6 and 22. Second, an inverted L-shape (if the connection is one-sided) or a pair of inverted L-shapes (if the connection is two-sided), the L-shape having a substantially planar side attachment portion 6 or 22 and a substantially planar top attachment portion 21. Third, one (if the connection is one-sided) or two (if the connection is two-sided) substantially planar side attachment portions 6 and 22. All three basic forms of the cap 5 can be fastened to the supported structural member 3 using fasteners 55 such as nails, screws or bolts. The cap 5 could also be bonded to the supported structural member 3 using adhesives or welds, depending on the materials used to compose the cap 5 and the supported structural member 3. Preferably, the connector 4 will be made from steel and the supported structural member 3 will be made primarily of wood, but the connector 4 might also be made of other metals, plastics or composites, and the same is true of the supported structural member 3. When fasteners 55 are used to fasten the cap 5 to the supported structural member 3, the fasteners 55 can pass through the substantially planar side attachment portion or portions 6 and the substantially planar top attachment portion or portions 21. Because the connector 4 is designed primarily to resist uplift forces, fasteners 55 or other bonding is only critical when the cap 5 has no substantially planar top attachment portion 21. In the preferred embodiment of this form, fasteners 55 pass through the substantially planar side attachment portion or portions 6 into the side or sides 53 of the supported structural member 3.

As shown in FIGS. 2, 4, 20, 25 and 40, preferably the first pin connection 11 further comprises a first pin opening 12 in one of the cap 5 and the first side attachment member 8, and a first pin 13 that passes through the first pin opening 12. As shown in FIGS. 42-45, the first pin 13 preferably comprises a body 14 that has a circumference 15, a first end 16, and a second end 17 with a first restraint extension 18 that extends beyond the circumference 15 of the body 14. As shown in FIGS. 2, 4, 20, 25, 29 and 40, the first pin opening 12 has a circumference 19. The first restraint extension 18 extends beyond the circumference of the first pin opening 12, preventing the first pin 13 from withdrawing from the first pin opening 12.

First Preferred Embodiment

In the first preferred embodiment, the first pin 13 is fixedly attached to the other of the cap 5 and the first side attachment member 8 that does not have a first pin opening 12. Preferably, as shown in FIG. 1A, the first pin 13 is fixedly attached to the cap 5 and the first pin opening 12 is in the first side attachment member 8.

Preferably, the first restraint extension 18 is one or more lobes 18 that extend beyond the circumference 15 of the body 14 and the circumference 19 of the first pin opening 12. Preferably, the first pin opening 12 has one or more open lobes 20 that extend beyond the circumference 19 of the first pin opening 12. Preferably, the fixedly attached first pin 13 is inserted through the first pin opening 12 in an orientation that permits the one or more lobes 18 on the first pin 13 to pass through the one or more open lobes 20 of the first pin opening 12, and the cap 5 and the first side attachment member 8 are then rotated on the first pin connection 11 so that the one or more lobes 18 on the first pin 13 no longer match the one or more open lobes 20 of the first pin opening 12, thereby restraining the cap 5 and the first side attachment member 8 from being separated at the first pin connection 11. The open lobes 20 permit the first side attachment member 8 and the cap 5 to be separated and reconnected. The open lobes 20 are preferably oriented so that they will be 90 degrees off of the lobes 18 when the supported structural member 3 is perfectly horizontal and the supporting structural member 2 is perfectly vertical, so that an interlock is formed in every orientation except if the supported structural member 3 is perfectly vertical, which is essentially impossible when the supported structural member 3 is a truss or other similar roofing member. Preferably, the pins 13 are machined from 1¾" diameter hot rolled bar stock with CNC (computer numerical control) lathes and machining centers. Preferably, the pins 13 each have two opposed lobes 18 that are ⅞" wide and extend to the 1¾" diameter of the bar stock. Preferably, the thickness of the lobes 18 is approximately one third the length of the pins 13. The middle third of the pin 13 is preferably 1.312" in diameter while the remaining third is preferably 1.245" in diameter with a flat portion of the circumference making it roughly D-shaped. As shown in FIGS. 30-32 and 42-46, the pins 13 are preferably fixed to the cap 5 by being inserted in D-shaped apertures 30 in the substantially planar side attachment portions 6 and 22 until the pins are flush with the insides of the substantially planar side attachment portions 6 and 22 and then welded on the insides of the substantially planar side attachment portions 6 and 22 with fillet welds 39 that go around the circumferences of the D-shaped apertures. The D shape ensures that the pins 13 cannot rotate so that the welds 39 are not stressed by torsion.

Preferably, the cap 5 additionally comprises a substantially planar top attachment portion 21 that interfaces with the supported structural member 3. As shown in FIGS. 11-19, 22-24 and 28, the cap 5 could be formed with a first substantially planar attachment portion 6 in the case of a one-sided variant of the connector 4, and the cap 5 can be formed with first and second substantially planar attachment portions 6 and 22 that are not connected. However, as shown in FIGS. 1A-1D, 6-10, and 31-33, the cap can be formed with first and second substantially planar attachment portions 6 and 22 that are connected by a substantially planar top attachment portion 21. The width of the cap 5 varies according to the width of the supported structural member 3, which is usually made from nominal 2×4 umber. For 2-ply, 3-ply, 4-ply and 5-ply supported structural members 3, the width of the cap is preferably approximately 3½", 5.062", 7¼ and 8.312", respectively. With the forms of the connector 4 of the present invention in which the cap 5 has a top attachment portion 21, the fixed pins 13 herein described can be advantageous because they allow the side attachment members 8 and 26 to be separated from the cap member 5, making the parts somewhat interchangeable.

Preferably, the cap 5 can additionally comprise a second substantially planar side attachment portion 22 that interfaces with the supported structural member 3. In a single-sided variant of the connector 4 of the present invention, a second side attachment portion 22 is not strictly necessary. When the cap 5 has only a first side attachment portion 6, a plurality of fasteners 58 are necessary to resist uplift, but when the cap 5 has a top attachment portion 21, the top attachment portion 21 can resist uplift and the fasteners 58 are less important.

Preferably, as shown in FIG. 3, the first side attachment member 8 additionally comprises an edge 37 on said substantially planar attachment portion 9 and the connection portion 10 of the first side attachment member 8 is attached to the edge 37. While it is possible to make a completely flat first side attachment member 8, as shown in FIGS. 19-23, this is normally only used at the ends of the supporting structural member 2. As shown in FIGS. 1A-5, 10, 11 and 15, the substantially planar attachment portion 9 and the connection portion 10 of the first side attachment member 8 are orthogonally related so that the attachment portion 9 faces a side 51 of the supporting structural member 2 and the connection portion 10 faces a side 53 of the supported structural member 3 and the cap 5.

Preferably, as shown in FIG. 1A, the substantially planar side attachment portion 9 of the first side attachment member 8 additionally comprises fastener openings 55, and the connection 1 additionally comprises fasteners 57 that pass through the fastener openings 55 in the first substantially planar side attachment portion 9 of the first side attachment member 8 and into the supporting structural member 2. Alternatively, the first side attachment member 8 could be made without fastener openings 55, and could be fastened to the supporting structural member 2 either with fasteners 57 that pierce the first side attachment member 8, an adhesive, or welds (if the supporting structural member 2 and the connector 4 are both made of metal).

Preferably, as shown in FIG. 7, the first and second substantially planar side attachment portions 6 and 22 of the cap 5 additionally comprise fastener openings 56, and the connection 1 additionally comprises fasteners 58 that pass through the fastener openings 56 in the first and second substantially planar side attachment portions 6 and 22 of the cap 5 and into the supported structural member 3. Alternatively, the cap 5 could be made without fastener openings 56, and could be fastened to the supported structural member 3 either with fasteners 58 that pierce the cap 5, an adhesive, or welds (if the supported structural member 3 and the connector 4 are both made of metal). When the cap 5 has no top attachment portion 21, the fasteners 58 are critical because uplift is transferred from the supported structural member 3 solely through the fasteners 58 to the connector 4 and the supporting structural member 2.

Preferably, the fasteners 57 that that pass through the fastener openings 55 in the first substantially planar side attachment portion 9 of the first side attachment member 8 are masonry screw anchors 57, and the fasteners 58 that pass through the fastener openings 56 in the first and second substantially planar side attachment portions 6 and 22 of the cap 5 are self-drilling wood screws 58. Most preferably, the fasteners 57 are Simpson Strong-Tie Titen HD masonry screw anchors. Most preferably, the fasteners 58 are Simpson Strong-Tie SDS Strong Drive screws.

Preferably, as shown in FIG. 32, the first end 16 of the first pin 13 is welded to the cap 5. Alternatively, the first pin 13 could be attached by a mechanical interlock, adhesive, or the like. Otherwise, the first pin 13 and the cap 5 could be cast, molded or otherwise formed as a single piece.

Preferably, as shown in FIG. 11, the connection portion 10 of the first side attachment member 8 is welded to the edge 37. Alternatively, the substantially planar side attachment portion 9 and the connection portion 10 could be attached by a mechanical interlock, adhesive, or the like. Otherwise, substantially planar side attachment portion 9 and the connection portion 10 could be cast, molded or otherwise formed as a single piece, as shown in FIG. 24. Equally, the substantially planar side attachment portion 9 and the connection portion 10 could be bent out of a single piece of metal or other material. Preferably, the connector 4 is painted. Welding destroys the corrosion protection of galvanized steel and therefore requires painting.

Second Preferred Embodiment

In the second preferred embodiment, the first pin 13 is fixedly attached to the first side attachment member 8 and the first pin opening 12 is in the cap 5. This particular arrangement, according to which the first pin 13 is fixedly attached to the first side attachment member 8, is similar to fixedly attaching the first pin 13 to the cap 5 and is, therefore, not shown in the drawings. This is less preferred than attaching the first pin 13 to the cap member 5, but it would be a functional alternative. As in the first preferred embodiment, and the first restraint extension 18 is one or more lobes 18 that extend beyond the circumference 15 of the body 14 and the circumference 19 of the first pin opening 12, and the first pin opening 12 has one or more open lobes 20 that extend beyond the circumference 19 of the first pin opening 12. The fixedly attached first pin 13 is inserted through the first pin opening 12 in an orientation that permits the one or more lobes 18 on the first pin 13 to pass through the one or more open lobes 20 of the first pin opening 12, and the cap 5 and the first side attachment member 8 are then rotated on the first pin connection 11 so that the one or more lobes 18 on the first pin 13 no longer match the one or more open lobes 20 of the first pin opening 12, thereby restraining the cap 5 and the first side attachment member 8 from being separated at the first pin connection 11. The cap 5 additionally comprises a substantially planar top attachment portion 21 that interfaces with the supported structural member 3. Preferably, the cap 5 additionally comprises a second substantially planar side attachment portion 22 that interfaces with the supported structural member 3, and the first side attachment member 8 additionally comprise an edge 37 and the connection portion 10 of the first side attachment member 8 is attached to the edge 37.

Preferably, the substantially planar side attachment portion 9 of the first side attachment member 8 additionally comprises fastener openings 55, and the connection 1 additionally comprises fasteners 57 that pass through the fastener openings 55 in the first substantially planar side attachment portion 9 of the first side attachment member 8 and into the supporting structural member 2. Preferably, the first and second substantially planar side attachment portions 6 and 22 of the cap 5 additionally comprise fastener openings 56, and the connection 1 additionally comprises fasteners 58 that pass through the fastener openings 56 in the first and second substantially planar side attachment portions 6 and 22 of the cap 5 and into the supported structural member 3. Preferably, the fasteners 57 that that pass through the fastener openings 55 in the first substantially planar side attachment portion 9 of the first side attachment member 8 are masonry screw anchors 57, and the fasteners 58 that pass through the fastener openings 56 in the first and second substantially planar side attachment portions 6 and 22 of the cap 5 are self-drilling wood screws 58.

Preferably, the first end 16 of the first pin 13 is welded to the first side attachment member 8, the connection portion 10 of the first side attachment member 8 is welded to the edge 37, and the connector 4 is painted.

Third Preferred Embodiment

The third preferred embodiment is essentially the same as the first preferred embodiment, except that it is double-sided. It is always preferable that the connection of the present invention be double-sided because a single-sided connection is weaker than its double-sided counterpart. It is shown FIGS. 1A-1D and 10. In it, the cap 5 additionally comprises a second substantially planar side attachment portion 22 that interfaces with the supported structural member 3. The connector 4 additionally comprises a second side attachment member 26 comprising a substantially planar attachment portion 9 that interfaces with and is fastened to the supporting structural member 2, and a connection portion 10 that is positioned alongside the first substantially planar attachment portion 6 of the cap 5, and a second pin connection 29 that enables rotation between the second side attachment member 26 and the cap 5.

The cap 5 further comprises a second substantially planar side attachment portion 22 that interfaces with the supported structural member 3 opposite the first substantially planar side attachment portion 6. The second pin connection 29 further comprises a second pin opening 12 in one of the cap 5 and the second attachment member 26, and a second pin 13 that passes through the second pin opening 12, the second pin 13 comprises a body 14 having a circumference 15, a first end 16, and a second end 17 with a first restraint extension 18 that extends beyond the circumference 15 of the body 14. The second pin opening 12 has a circumference 19, and the first restraint extension 18 extends beyond the circumference of the second pin opening 12, preventing the second pin 13 from withdrawing from the second pin opening 12. The second pin 13 is fixedly attached to the other of the cap 5 and the second side attachment member 26 that does not have a second pin opening 12. Preferably, the first and second side attachment members 8 and 26 are essentially the same, either identical or mirror images of each other, except in an end wall attachment as shown in FIGS. 19, 22 and 23, where it is practical to use a side attachment member 8 or 26 that is flat or when the supported structural member 3 is not orthogonal to the supporting structural member 2. Preferably, the pin connections 11 and 29 are essentially the same, either identical or mirror images of each other.

Preferably, the first pin 13 is fixedly attached to the cap 5 and the first pin opening 12 is in the first side attachment member 8, and the second pin 13 is fixedly attached to the cap 5 and the second pin opening 12 is in the second side attachment member 26. Preferably, the first restraint extension 18 of the first pin 13 is one or more lobes 18 that extend beyond the circumference 15 of the body 14 and the circumference 19 of the first pin opening 12, and the first restraint extension 18 of the second pin 13 is one or more lobes 18 that extend beyond the circumference 15 of the body 14 and the circumference 19 of the second pin opening 12. Preferably, the first pin opening 12 has one or more open lobes 20 that extend beyond the circumference 19 of the first pin opening 12. The fixedly attached first pin 13 is preferably inserted through the first pin opening 12 in an orientation that permits the one or more lobes 18 on the first pin 13 to pass through the one or more open lobes 20 of the first pin opening 12, and the cap 5 and the first side attachment member 8 are then rotated on the first pin connection 11 so that the one or more lobes 18 on the first pin 13 no longer match the one or more open lobes 20 of the first pin opening 12, thereby restraining the cap 5 and the first side attachment member 8 from being separated at the first pin connection 11. Preferably, the second pin opening 12 has one or more open lobes 20 that extend beyond the circumference 19 of the second pin opening 12. The fixedly attached second pin 13 is preferably inserted through the second pin opening 12 in an orientation that permits the one or more lobes 18 on the second pin 13 to pass through the one or more open lobes 20 of the second pin opening 12, and the cap 5 and the second side attachment member 26 are then rotated on the second pin connection 29 so that the one or more lobes 18 on the second pin 13 no longer match the one or more open lobes 20 of the second pin opening 12, thereby restraining the cap 5 and the second side attachment member 26 from being separated at the first pin connection 29.

Preferably, the cap 5 additionally comprises a substantially planar top attachment portion 21 that interfaces with the supported structural member 3. The second substantially planar side attachment portion 22 of the cap 5 is attached to the substantially planar top attachment portion 21. Preferably, the first side attachment member 8 additionally comprises an edge 37 on said substantially planar attachment portion 9 and the connection portion 10 of the first side attachment member 8 is attached to the edge 37. Preferably, the second side attachment member 26 additionally comprises an edge 37 and the connection portion 10 of the second side attachment member 26 is attached to the edge 37.

As best shown in FIG. 3, the substantially planar attachment portions 9 preferably each have two parallel long edges 37 and two short edges 37 that connect the long side edges 37. The short edge 37 farthest away from the connection portion 10 preferably meets both the long edges 37 at right angles. The short edge 37 nearest the connection portion 10 preferably meets the long edges 37 at 8.14 degrees off of orthogonal, so that the long edge 37 to which the connection portion 10 is attached is longer than the opposite long edge 37.

Preferably, the substantially planar side attachment portion 9 of the first side attachment member 8 and the substantially planar side attachment portion 9 of the second side attachment member 26 additionally comprise fastener openings 55. Preferably, the connection 1 additionally comprises fasteners 57 that pass through the fastener openings 55 in the first substantially planar side attachment portion 9 of the first side attachment member 8 and the substantially planar side attachment portion 9 of the second side attachment member 26 and into the supporting structural member 2. Preferably, the first and second substantially planar side attachment portions 6 and 22 of the cap 5 additionally comprise fastener openings 56, and the connection 1 additionally comprises fasteners 58 that pass through the fastener openings 56 in the first and second substantially planar side attachment portions 6 and 22 of the cap 5 and into the supported structural member 3. Preferably, the fasteners 57 that that pass through the fastener openings 55 in the first substantially planar side attachment portion 9 of the first side attachment member 8 and the substantially planar side attachment portion 9 of the second side attachment member 26 are masonry screw anchors 57, and the fasteners 58 that pass through the fastener openings 56 in the first and second substantially planar side attachment portions 6 and 22 of the cap 5 are self-drilling wood screws 58.

Preferably, the first end 16 of the first pin 13 is welded to the cap 5, and the first end 16 of the second pin 13 is welded to the cap 5 with a circumferential fillet weld 39. Preferably, the connection portion 10 of the first side attachment member 8 is welded to the edge 37, and the connection portion 10 of the second side attachment member 26 is welded to the edge 37 with a pair of fillet welds 39. As shown in FIG. 3, the edge 37 to which the connection portion 10 is welded has an indentation 40 between the fillet welds 39 that attach the connection portion 10. Preferably, as shown in FIG. 4, the connection portion 10 has a pair of opposed notches 41 on its circumference that act as visual indicia for correct alignment when welding the connection portion 10 to the substantially planar attachment portion 9. As shown in FIG. 5, the substantially planar attachment portion includes a small peg 42 that projects from the edge 37 to interlock with one of the notches 41 and provide further assistance in aligning the connection portion 10. Preferably, the connector 4 is painted.

Preferably, the substantially planar attachment portions 9 of the first and second side attachment members 8 and 26 are 24 3/16" from the centerlines of the pins 13 to the short edge 37 furthest away from the connection portion 10. Preferably, as shown in FIGS. 1A-1D, 3, 10, 11, 16, 19, 20 and 23, the substantially planar attachment portions 9 each have four fastener openings 55, and preferably only two of each set of four is used. The most preferred fasteners 57 for attaching to the supporting structural member 2 are Simpson Strong-Tie TITEN HD masonry screw anchors 57. If the supporting structural member 2 is a wood wall 2, the most preferred fasteners 57 would be a greater plurality of Simpson Strong-Tie Strong Drive SDS self-drilling wood screws. Preferably, the clearance diameter of the pin openings 12 is 1.344" and the outer diameter of the connection portion 10 is 4.210". The pins 13 are preferably machined from 1¾" Grade 36 diameter hot rolled bar stock with CNC lathes and machining centers. The first ends 16 of the pins 13 preferably have a D-shaped circumference and, as shown in FIG. 46, are inserted in D-shaped fixture openings 30 in the first and second substantially planar side attachment portions 6 and 22 of the cap 5. The pins 13 are then preferably welded in those fixture openings 30 with circumferential fillet welds 39. The cap 5 is preferably fastened to the supported structural member 3 with twelve fasteners 58, preferably self-driving wood screws 58, most preferably Simpson Strong-Tie Strong Drive SDS ¼" screws, 3" long if the supporting structural member 3 is sufficiently wide. If the first and second substantially planar side attachment portions 6 and 22 of the cap 5 are two separate plates 6 and 22 attached to the sides 53 of the supported structural member 3, as is preferred for retrofit installations, the plates 6 and 22 are preferably attached with eighteen fasteners 58, preferably self-driving wood screws 58, most preferably Simpson Strong-Tie Strong Drive SDS ¼×3 screws. The cap 5 is preferably made in several widths for double, triple, quadruple and quintuple-ply trusses 3, 3.5", 5.062", 7.25" and 8.312" wide respectively. Preferably, the cap 5 and first and second side attachment members 8 and 26 are formed from 3 gauge Grade 33 hot rolled steel.

Fourth Preferred Embodiment

In the fourth preferred embodiment, the first pins 13 are fixedly attached to the first and second side attachment members 8 and 26 and the first pin openings 12 are in the cap 5. As with the second preferred embodiment, this particular arrangement, according to which the first pin 13 is fixedly attached to the first side attachment member 8, is similar to fixedly attaching the first pin 13 to the cap 5 and is, therefore, not shown in the drawings. This is less preferred than attaching the first pins 13 to the cap member 5, but it would be a functional alternative. Preferably, the first pin 13 is fixedly attached to the first side attachment member 8 and the first pin opening 12 is in the cap 5, and the second pin 13 is fixedly attached to the second side attachment member 26 and the second pin opening 12 is in the cap 5. Preferably, the first restraint extension 18 on the first pin 13 is one or more lobes 18 that extend beyond the circumference 15 of the body 14 and the circumference 19 of the first pin opening 12. Preferably, the first restraint extension 18 on the second pin 13 is one or more lobes 18 that extend beyond the circumference 15 of the body 14 and the circumference 19 of the second pin opening 12. Preferably, the first pin opening 12 has one or more open lobes 20 that extend beyond the circumference 19 of the first pin opening 12. Preferably, the fixedly attached first pin 13 is inserted through the first pin opening 12 in an orientation that permits the one or more lobes 18 on the first pin 13 to pass through the one or more open lobes 20 of the first pin opening 12, and the cap 5 and the first side attachment member 8 are then rotated on the first pin connection 11 so that the one or more lobes 18 on the first pin 13 no longer match the one or more open lobes 20 of the first pin opening 12, thereby restraining the cap 5 and the first side attachment member 8 from being separated at the first pin connection 11. Preferably, the second pin opening 12 has one or more open lobes 20 that extend beyond the circumference 19 of the second pin opening 12. The fixedly attached second pin 13 is preferably inserted through the second pin opening 12 in an orientation that permits the one or more lobes 18 on the second pin 13 to pass through the one or more open lobes 20 of the second pin opening 12, and the cap 5 and the second side attachment member 26 are then rotated on the second pin connection 29 so that the one or more lobes 18 on the second pin 13 no longer match the one or more open lobes 20 of the second pin opening 12, thereby restraining the cap 5 and the second side attachment member 26 from being separated at the first pin connection 29.

Preferably, the cap 5 additionally comprises a substantially planar top attachment portion 21 that interfaces with the supported structural member 3. Preferably, the second substantially planar side attachment portion 22 of the cap 5 is attached to the substantially planar top attachment portion 21. Preferably, the first side attachment member 8 additionally comprises an edge 37 on said substantially planar attachment portion 9 and the connection portion 10 of the first side attachment member 8 is attached to the edge 37. Preferably, the second side attachment member 26 additionally comprise an edge 37 and the connection portion 10 of the second side attachment member 26 is attached to the edge 37.

Preferably, the substantially planar side attachment portion 9 of the first side attachment member 8 and the substantially planar side attachment portion 9 of the second side attachment member 26 additionally comprise fastener openings 55. Preferably, the connection 1 additionally comprises fasteners 57 that pass through the fastener openings 55 in the first substantially planar side attachment portion 9 of the first side attachment member 8 and the substantially planar side attachment portion 9 of the second side attachment member 26 and into the supporting structural member 2. Preferably, the first and second substantially planar side attachment portions 6 and 22 of the cap 5 additionally comprise fastener openings 56, Preferably, the connection 1 additionally comprises fasteners 58 that pass through the fastener openings 56 in the first and second substantially planar side attachment portions 6 and 22 of the cap 5 and into the supported structural member 3. Preferably, the fasteners 57 that that pass through the fastener openings 55 in the first substantially planar side attachment portion 9 of the first side attachment member 8 and the substantially planar side attachment portion 9 of the second side attachment member 26 are masonry screw anchors 57. Preferably, the fasteners 58 that pass through the fastener openings 56 in the first and second substantially planar side attachment portions 6 and 22 of the cap 5 are self-drilling wood screws 58.

Preferably, the first end 16 of the first pin 13 is welded to the first side attachment member 8, and the first end 16 of the second pin 13 is welded to the second side attachment member 26. The connection portion 10 of the first side attachment member 8 is preferably welded to the edge 37, and the connection portion 10 of the second side attachment member 26 is preferably welded to the edge 37. Preferably, the connector 4 is painted.

Fifth Preferred Embodiment

As shown in FIGS. 29, 34-37 and 28B, in the fifth preferred embodiment the first pin opening 12 is preferably in the cap 5, the first attachment member 8 additionally comprises a second pin opening 12 and the first pin 13 passes through the second pin opening 12, and the first pin 13 additionally comprises a second restraint extension 18 that extends beyond the circumference 15 of the body 14. The pin openings 12 in the cap 5 and the first attachment member 8 preferably face each other side-by-side. Preferably, the second pin opening 12 has a circumference 19, and the second restraint extension 18 extends beyond the circumference 19 of the second pin opening 12, preventing the first pin 13 from withdrawing from the second pin opening 12.

Preferably, the first restraint extension 18 is a circumferential flange 18 that extends beyond the circumference 15 of the body 14 and the circumference 19 of the first pin opening 12. The second restraint extension 18 is a circumferential flange 18 that extends beyond the circumference 15 of the body 14 and the circumference 19 of the second pin opening 12. In this form, the cap member 5 and the first side attachment member 8 cannot be separated without disassembling the pin 13 itself, which is not possible in the preferred form of the pin 13, which is a rivet.

Preferably, the cap 5 additionally comprises a substantially planar top attachment portion 21 that interfaces with the supported structural member 3. Preferably, the cap 5 additionally comprises a second substantially planar side attachment portion 22 that interfaces with the supported structural member 3.

Preferably, as shown in FIG. 29, the connection portion 10 of the first side attachment member 8 additionally comprises a reinforcing embossment 25 around the first pin opening 12 in the first side attachment member 8. The embossment 25 reinforces the first pin opening 12 by stiffening the material around the first pin opening 12. Preferably, the first substantially planar side attachment portion 6 of the cap 5 additionally comprises a reinforcing embossment 25 around the second pin opening 12 that matches the reinforcing embossment 25 around the first pin opening 12 in the first side attachment member 8 so that the reinforcing embossment 25 and the reinforcing embossment 25 fit together and transmit bearing forces between the cap 5 and the first side attachment member 8. The reinforcing embossments 25 are shown in FIGS. 35-37, 38B and 40.

Preferably, the substantially planar attachment portion 9 of the first side attachment member 8 additionally comprises a reinforcing flange 23. Preferably, the connection portion 10 of the first side attachment member 8 additionally comprises a reinforcing flange 24. The reinforcing flanges 23 and 24 are shown in FIGS. 39-41. The embossments 25 and the reinforcing flanges 23 and 24 are particularly important when the connector 4 is made of lighter gauge sheet steel. The heavier gauge steel of the welded and painted forms of the connector 4 do not require the embossments 25 and reinforcing flanges 23 and 24.

Preferably, as shown in FIG. 38B, the first pin 13 is a rivet. The first pin 13 could also be made as a press fit part, but the restraint extensions 18 of a rivet are stronger.

Preferably, as shown in FIG. 38A, the substantially planar side attachment portion 9 of the first side attachment member 8 additionally comprises fastener openings 55, and the connection 1 additionally comprises fasteners 57 that pass through the fastener openings 55 in the first substantially planar side attachment portion 9 of the first side attachment member 8 and into the supporting structural member 2. Preferably, the first and second substantially planar side attachment portions 6 and 22 of the cap 5 additionally comprise fastener openings 56, and the connection 1 additionally comprises fasteners 58 that pass through the fastener openings 56 in the first and second substantially planar side attachment portions 6 and 22 of the cap 5 and into the supported structural member 3. Preferably, the fasteners 57 that pass through the fastener openings 55 in the first substantially planar side attachment portion 9 of the first side attachment member 8 are masonry screw anchors 57, and the fasteners 58 that pass through the fastener openings 56 in the first and second substantially planar side attachment portions 6 and 22 of the cap 5 are self-drilling wood screws 58.

Sixth Preferred Embodiment

As shown in FIG. 38A, the sixth preferred embodiment is essentially the same as the fifth preferred embodiment, except that it is double-sided. The preferred side attachment member 8 or 26 is shown FIGS. 29 and 24, but other side attachment members 8 or 26 could be used, including those shown in FIGS. 39-4. The cap member 5 additionally comprises a second substantially planar side attachment portion 22 that interfaces with the supported structural member 3. The connector additionally comprises a second side attachment member 26 comprising a substantially planar attachment portion 9 that interfaces with and is fastened to the supporting structural member 2, and a connection portion 10 that is positioned alongside said second substantially planar side attachment portion 22 of said cap 5. Preferably, a second pin connection 29 that enables rotation between the second side attachment member 26 and the cap 5. The second pin connection 29 preferably further comprises a third pin opening 12 in the cap 5 and a fourth pin opening 12 in the second side attachment member 26, and a second pin 13 that passes through the third pin opening 12 and the fourth pin opening 12. Preferably, the second pin 13 comprises a body 14 having a circumference 15, a first end 16 with a second restraint extension 18 that extend beyond the circumference 19, and a second end 17 with a first restraint extension 18 that extends beyond the circumference 15 of the body 14. The third pin opening 12 preferably has a circumference 19 and the fourth pin opening 12 has a circumference 19. Preferably, the first restraint extension 18 of the second pin 13 extends beyond the circumference 19 of the third pin opening 12, preventing the second pin 13 from withdrawing from the third pin opening 12. The second restraint extension 18 of the second pin 13 preferably extends beyond the circumference 19 of the fourth pin opening 12, preventing the second pin 13 from withdrawing from the fourth pin opening 12.

Preferably, the first restraint extension 18 of the first pin 13 is a circumferential flange 18 that extends beyond the circumference 15 of the body 14. The second restraint extension 18 of the first pin 13 preferably is a circumferential flange 18 that extends beyond the circumference 15 of the body 14, and the first restraint extension 18 of the first pin 13 is a circumferential flange 18 that extends beyond the circumference 15 of the body 14. Preferably, the second restraint extension 18 of the first pin 13 is a circumferential flange 18 that extends beyond the circumference 15 of the body 14.

As previously described, preferably the cap 5 additionally comprises a substantially planar top attachment portion 21 that interfaces with the supported structural member 3. Preferably, the cap 5 additionally comprises a second substantially planar side attachment portion 22 that interfaces with the supported structural member 3. Preferably, the connection portion 10 of the first side attachment member 8 additionally comprises a reinforcing embossment 25 around the second pin opening 12 in the first side attachment member 8. Preferably, the connection portion 10 of the second side attachment member 9 additionally comprises a reinforcing embossment 25 around the fourth pin opening 12 in the second side attachment member 9. Preferably, the first substantially planar side attachment portion 6 of the cap 5 additionally comprises a reinforcing embossment 25 around the first pin opening 12 that matches the reinforcing embossment 25 around the second pin opening 12 in the first side attachment member 8 so that the reinforcing embossment 25 in the first substantially planar side attachment portion 6 and the reinforcing embossment 25 fit together and transmit bearing forces between the cap 5 and the first side attachment member 8. Preferably, the second substantially planar side attachment portion 22 of the cap 5 additionally comprises a reinforcing embossment 25 around the third pin opening 12 that matches the reinforcing embossment 25 around the fourth pin opening 12 in the second side attachment member 26 so that the reinforcing embossment 25 in the second substantially planar side attachment portion 22 and the reinforcing embossment 25 in the second side attachment member 26 fit together and transmit bearing forces between the cap 5 and the second side attachment member 26.

Preferably, the first pin 13 is a rivet, and the second pin 13 is a rivet.

Preferably, the substantially planar side attachment portion 9 of the first side attachment member 8 and the substantially planar side attachment portion 9 of the second side attachment member 26 additionally comprise fastener openings 55. Preferably, the connection 1 additionally comprises fasteners 57 that pass through the fastener openings 55 in the first substantially planar side attachment portion 9 of the first side attachment member 8 and the substantially planar side attachment portion 9 of the second side attachment member 26 and into the supporting structural member 2. Preferably, the first and second substantially planar side attachment portions 6 and 22 of the cap 5 additionally comprise fastener openings 56, and the connection 1 additionally comprises fasteners 58 that pass through the fastener openings 56 in the first and second substantially planar side attachment portions 6 and 22 of the cap 5 and into the supported structural member 3. Preferably, the fasteners 57 that that pass through the fastener openings 55 in the first substantially planar side attachment portion 9 of the first side attachment member 8 and the substantially planar side attachment portion 9 of the second side attachment member 26 are masonry screw anchors 57. Preferably, the fasteners 58 that pass through the fastener openings 56 in the first and second substantially planar side attachment portions 6 and 22 of the cap 5 are self-drilling wood screws 58.

As described above, the sixth preferred embodiment of the invention can be used with a variety of side members 8 and 26. The following is a description of the use of the side members 8 and 26 shown in FIGS. 39-41. The substantially planar attachment portion 9 of the first side attachment member 8 additionally comprises a reinforcing flange 23, and the substantially planar attachment portion 9 of the second side attachment member 26 additionally comprises a reinforcing flange 23. Preferably, the connection portion 10 of the first side attachment member 8 additionally comprises a reinforcing flange 24, and the connection portion 10 of the second side attachment member 9 additionally comprises a reinforcing flange 24.

Preferably, the first and second side attachment members 8 and 26 are 25" long and 4" wide. Preferably, they are each attached to the supporting structural member 2 with 5 fasteners 57, preferably masonry screw anchors 57, most preferably ⅝" diameter×6" long Simpson Strong-Tie TITEN HD anchors. As shown in FIGS. 39-41, the connection portions 10 are preferably bent out of the material of the first and second side attachment members 8 and 26 so that they are orthogonal to the substantially planar attachment portions 9, forming a P-shape in which the head of the P is the connection portion 10 and the leg of the P is the substantially planar attachment portion 9. FIGS. 25-27 show a P-shaped first or second side attachment member 8 or 26, in which the head of the P is the connection portion 10 and the leg of the P is the substantially planar attachment portion 9, but the embodiment shown in FIGS. 25-27 is used with a fixed pin 13 attached to the cap 5. As shown in FIGS. 39-41, the juncture between the head and leg of the P in this P-shaped embodiment is preferably reinforced with gussets 43. The connection portion 10 is preferably is 3.76" in diameter. Preferably, the first and second side attachment members 8 and 26 and the cap 5 are all formed from 12 gauge (0.1" thick) galvanized sheet steel. The reinforcing flanges 23 of the first and second side attachment members 8 and 26 are preferably on both the substantially planar attachment portions 9 and the connection portions 10, as shown in FIGS. 39-41, and are preferably ⅝" high. The pin openings 12 are preferably 1" in diameter and the pins 13 themselves are preferably 1" diameter rivets 13. The reinforcing embossments 25 around the pin openings 12 in the cap 5 and the first and second side attachment members 8 and 26 are preferably ¼" deep.

Seventh Preferred Embodiment

The seventh preferred embodiment is shown in FIGS. 29, 34, 35-37, 38A and 38B. In it, the first side attachment member 8 is formed by bending a V-shaped length of steel in half to form a two-ply substantially planar attachments portion 9 and a connection portion 10 that joins the plies. The apex of the V is formed with a teardrop shape (that becomes the connection portion 10) and the straps (which become the substantially planar attachment portion 9) branch out at a narrow angle that allows them to be folded together to form a single substantially planar attachment portion 9.

Preferably, the substantially planar side attachment portion 9 of the first side attachment member 8 additionally comprises fastener openings 55, and the connection 1 additionally comprises fasteners 57 that pass through the fastener openings 55 in the first substantially planar side attachment portion 9 of the first side attachment member 8 and into the supporting structural member 2. Preferably, the first and second substantially planar side attachment portions 6 and 22 of the cap 5 additionally comprise fastener openings 56, and the connection 1 additionally comprises fasteners 58 that pass through the fastener openings 56 in the first and second substantially planar side attachment portions 6 and 22 of the cap 5 and into the supported structural member 3. Preferably, the fasteners 57 that that pass through the fastener openings 55 in the first substantially planar side attachment portion 9 of the first side attachment member 8 are masonry screw anchors 57, and the fasteners 58 that pass through the fastener openings 56 in the first and second substantially planar side attachment portions 6 and 22 of the cap 5 are self-drilling wood screws 58.

Eighth Preferred Embodiment

The eighth preferred embodiment is essentially the same as the seventh preferred embodiment, except that it is double-sided. In it, the first side attachment member 8 is formed by bending a V-shaped length of steel in half to form a two-ply substantially planar attachment portion 9 and a connection portion 10 that joins the plies. The second side attachment member 26 is also formed by bending a V-shaped length of steel in half to form a two-ply substantially planar attachment portion 9 and a connection portion 10 that joins the plies.

Preferably, the substantially planar side attachment portion 9 of the first side attachment member 8 and the substantially planar side attachment portion 9 of the second side attachment member 26 additionally comprise fastener openings 55. Preferably, the connection 1 additionally comprises fasteners 57 that pass through the fastener openings 55 in the first substantially planar side attachment portion 9 of the first side attachment member 8 and the substantially planar side attachment portion 9 of the second side attachment member 26 and into the supporting structural member 2. Preferably, the first and second substantially planar side attachment portions 6 and 22 of the cap 5 additionally comprise fastener openings 56, and the connection 1 additionally comprises fasteners 58 that pass through the fastener openings 56 in the first and second substantially planar side attachment portions 6 and 22 of the cap 5 and into the supported structural member 3. Preferably, the fasteners 57 that that pass through the fastener openings 55 in the first substantially planar side attachment portion 9 of the first side attachment member 8 and the substantially planar side attachment portion 9 of the second side attachment member 26 are masonry screw anchors 57. Preferably, the fasteners 58 that pass through the fastener openings 56 in the first and second substantially planar side attachment portions 6 and 22 of the cap 5 are self-drilling wood screws 58.

Preferably, the first and second side attachment members 8 and 26 are 22⅛" long and 2" wide. Preferably, they are each attached to the supporting structural member 2 with 5 fasteners 57, preferably masonry screw anchors 57, most preferably ½" diameter×6" long Simpson Strong-Tie TITEN HD anchors. Preferably, the connection portion 10 is 3¾" in diameter. Preferably, the first and second side attachment members 8 and 26 and the cap 5 are all formed from 10 gauge (0.135" thick) galvanized sheet steel. Preferably, the connection portions 10 are canted 10 degrees out of line from the substantially planar attachment portions 9 of the first and second side attachment member 8 and 26, so that the substantially planar side attachment portions 9 angle outward from the supported structural member 3, as shown in FIG. 38A. As shown in FIGS. 29, 24 and 38B and 38B, the reinforcing flanges 23 of the first and second side attachment members 8 and 26 extend between the connection portion 10 and the substantially planar attachment portion 9 and are preferably 0.38" high in the connection portion 10. The pin openings 12 are preferably 1" in diameter and the pins 13 themselves are preferably 1" diameter rivets 13.

In retrofit or new construction application using caps 5 that have no substantially planar top attachment portion 21 and only a first substantially planar side attachment portion 6 or only first and second substantially planar side attachment portions 6 and 22, the first side attachment member 8 or the first and second side attachment members 8 and 26, if there are two, are first connected to the cap 5, if they have detachable pins 13. Second, the substantially planar side attachment portions 6 and 22 are aligned so that they are flush with the top 54 of the truss 3 and the first and second side attachment members 8 and 26 are vertical and in contact with the side 51 of the wall 2. Third, the substantially planar side attachment portions 6 and 22 are attached to the truss 3 with fasteners 58 and the first and second side attachment members 8 and 26 are attached to the wall with fasteners 57.

In new construction application using caps 5 that have a substantially planar top attachment portion 21, the first and second side attachment members 8 and 26, are first connected to the cap 5, if they have detachable pins 13. Second, the substantially planar top attachment portion 21 of the cap 5 is placed on the top 54 of the truss 3, which aligns the substantially planar side attachment portions 6 and 22 so that they are flush with the top 54 of the truss 3 and the first and second side attachment members 8 and 26 are vertical and in contact with the side 51 of the wall 2. Third, the substantially planar side attachment portions 6 and 22 are attached to the truss 3 with fasteners 58 and the first and second side attachment members 8 and 26 are attached to the wall with fasteners 57.

Generally, only caps 5 without substantially planar top attachment portions 21 will be used in retrofit applications because substantially planar top attachment portions 21 would interfere with roof sheathing on top of the trusses 3. If there is enough space between any roof sheathing and the tops 54 of the trusses 3, L-shaped caps 5 with only a first substantially planar side attachment portion 6 and a substantially planar top attachment portion 21 could be used by sliding the substantially planar top attachment portion 21 between the top 54 of the truss 3 and the roof sheathing. If there is no roof sheathing, as in new construction, caps 5 with first and second substantially planar side attachment portions 6 and 22 and a substantially planar top attachment portion 21 can be used and are preferable because they require fewer fasteners 58 to attach them to the truss 3 since the substantially planar top attachment portion 21 primarily holds down the truss 3.

Most Preferred Embodiments

There are three most preferred embodiments. The first is shown in FIGS. 11-16), the second in FIG. 18, and the third in FIGS. 19-23. These are suitable for both retrofit and new construction, having caps 5 that have a separate first substantially planar side attachment portion 6 and a separate second substantially planar side attachment portion 22, and no connecting substantially planar top attachment portion 21 which can interfere with roof sheathing.

Unadjustable Embodiments

In addition to the adjustable embodiments of the present invention, there are unadjustable embodiments, shown in FIGS. 50-58, in which the side attachment members connected directly to the supported structural members, rather than by jointed attachment to a cap that interfaces with the supported structural member.

At their most basic, the unadjustable embodiments of the present invention are all a connection, as shown in FIGS. 57 and 58, that comprises an elongate substantially vertical supporting structural member 2, an elongate generally horizontal supported structural member 3, and a first connector 4. The elongate substantially vertical supporting structural member 2 has two sides 51 and a top 52. The elongate generally horizontal supported structural member 3 is not parallel to the supporting structural member 2, has two sides 53 and a top 54, and is supported by the supporting structural member 2. The first connector 4 has a first side attachment member 8.

The first side attachment member has a connection portion 10 and an elongate substantially planar attachment portion 9. The connection portion 10 has a substantially planar fastening portion 47 with a border 31, and a reinforcing flange 24 integrally joined to the fastening portion 47 along at least part of the border 31. The elongate substantially planar attachment portion 9 comprises first and second straps 28, each having an inner side 59 and an outer side 60, integrally connected to the connection portion 10.

The reinforcing flange 24 has a left side 48 and a right side 49. The reinforcing flange 24 can be discontinuous. The first strap 28 is integrally connected to the left side 48 of the reinforcing flange 24 and the second strap 28 is integrally connected to the right side 49 of the reinforcing flange 24. The first and second straps 28 at least partially overlap each other, the inner sides 59 interfacing. The fastening portion 47 is positioned alongside and fastened to one of the two sides 53 of the supported structural member 3. The attachment portion 9 interfaces with and is fastened to one of the two sides 51 of the supporting structural member 2.

Preferably, the fastening portion 47 and the attachment portion 9 generally occupy substantially perpendicular planes. The greater part of the first and second straps 28 preferably overlap. Preferably, the first and second straps 28 have open ends 50 opposite the connection portion 10 and the open ends 50 are equidistant from the connection portion. The greater part of the first and second straps 28 preferably overlap and the open ends 50 preferably contact each other. The straps 28 are preferably 18" long. Preferably, the straps 28 have two parallel long sides 44, one that faces the supported structural member 3 and one that faces away from the supported structural member 3. The angle between the long sides 44 and the fastening portion 47 is preferably 10 degrees, so that the straps 28 are not vertical when installed as preferred. The first and second straps 28 extend the material of the reinforcing flange 24, extending outward from the connection portion 10 and being brought together as close to the connection portion 10 as possible. The straps 28 are bent at a bend 45 so that they interface for almost their entire length.

The reinforcing flange 24 preferably occupies substantially all of the border 31. Preferably, the reinforcing flange 24 has a first end 35 and a second end 36, the first end 35 and the second end 36 being separated by a first gap 38 along the border 31 of the connection portion 10. The reinforcing flange 24 preferably rises a uniform 0.5" from the connection portion 10 border 31, except that is rises further as it transitions into the straps 28.

Preferably, the first and second straps 28 have fastener openings 55, and the fastening portion 47 has fastener openings 32. The connection 1 preferably includes fasteners 57 that pass through the fastener openings 55 in the first and second straps 28 and into the supporting structural member 2. The connection 1 preferably also includes fasteners 33 that pass through the fastener openings 32 in the fastening portion 47 and into the supported structural member 3. Preferably, the fasteners 57 that pass through the fastener openings 55 in the first and second straps 28 have shanks 34, and the fasteners 33 that pass through the fastener openings 32 in the fastening portion 47 have shanks 34. The fasteners 57 that pass through the fastener openings 55 in the first and second straps 28 preferably have threaded shanks 34, and fasteners 33 that pass through the fastener openings 32 in the fastening portion 47 preferably have threaded shanks 34. Preferably, the fasteners 57 that pass through the fastener openings 55 in the first and second straps 28 are screws 57, and the fasteners 33 that pass through the fastener openings 32 in the fastening portion 47 are screws 33.

If the supporting structural member 2 is a wood-framed wall 2, the screws 57 that pass through the fastener openings 55 in the first and second straps 28 are preferably wood screws 57. Most preferably, the screws 57 are Simpson Strong-Drive ¼" wood screws. The Simpson Strong-Drive wood screw has a hex washer head for easy driving with a ⅜" hex head socket and a low speed drill. The built-in reamer and type 17 tip cuts a hole to allow installation without predrilling. If the supporting structural member 2 is a masonry wall 2, the screws 57 that pass through the fastener openings 55 in the first and second straps 28 are preferably masonry screws 57. Most preferably, the screws 57 are Simpson Titen masonry screws. Titen screws are 3/16 and ¼ diameter masonry screws for attaching all types of components to concrete and masonry. If the supporting structural member 2 is a metal-framed wall 2, the screws 57 that pass through the fastener openings 55 in the first and second straps 28 are preferably metal screws 57. Preferably, fourteen screws 57 connect the attachment portions 9 to the supporting structural member 2.

If the supported structural member 3 is a wood-framed truss 3, the screws 33 that pass through the fastener openings 32 in the fastening portion 47 are preferably wood screws 33. If the supported structural member 3 is a composite truss 3, the fasteners 33 that pass through the fastener openings 32 in the fastening portion 47 preferably are those best suited to the material of the member or members to which the connection portion 10 is attached. If the supported structural member 3 is a metal-framed truss 3, the screws 33 that pass through the fastener openings 32 in the fastening portion 47 are preferably metal screws 33.

The connection 1 is preferably a double-sided connection 1, having second connector 7 essentially identical to the first connector 4. The second connector 7 has a first side attachment member 8. The first side attachment member has a connection portion 10 and an elongate substantially planar attachment portion 9. The connection portion 10 has a substantially planar fastening portion 47 with a border 31, and a reinforcing flange 24 integrally joined to the fastening portion 47 along at least part of the border 31. The elongate substantially planar attachment portion 9 comprises first and second straps 28, each having an inner side 59 and an outer side 60, integrally connected to the connection portion 10. The reinforcing flange 24 has a left side 48 and a right side 49. The first strap 28 is integrally connected to the left side 48 of the reinforcing flange 24 and the second strap 28 is integrally connected to the right side 49 of the reinforcing flange 24. The first and second straps 28 at least partially overlap each other, the inner sides 59 interfacing. The fastening portion 47 is positioned alongside and fastened to the other of the two sides 53 of the supported structural member 3 from the first connector 4. The attachment portion 9 interfaces with and is fastened to one of the two sides 51 of the supporting structural member 2.

Preferably, the connector 4 of the present invention is formed first by cutting a substantially planar blank 100 from sheet metal. The substantially planar blank 100 preferably has a connection portion 10 and an elongate substantially planar attachment portion 9. Preferably, the connection portion 10 has a substantially planar fastening portion 47 with a border 31. The elongate substantially planar attachment portion 9 preferably comprises first and second straps 28, each having an inner side 59 and an outer side 60, integrally connected to the connection portion 10. Preferably, a reinforcing flange 24 is then bent up along at least part of the border 31, the reinforcing flange (24) being integrally joined to the fastening portion 47 and having a left side 48 and a right side 49. The first strap 28 preferably is integrally connected to the left side 48 of the reinforcing flange 24 and the second strap 28 is integrally connected to the right side 49 of the reinforcing flange 24. Preferably, the first and second straps 28 are bent up and together at the same time as the reinforcing flange (24) such that the first and second straps 28 at least partially overlap each other, the inner sides 59 interfacing. The connector 4 of the present invention is preferably further formed by punching fastener openings 55 in the first and second straps 28, and by punching fastener openings 32 in the fastening portion 47. The preferred material is 10 gauge (118 mils) G90 zinc-coated (0.90 oz/ft$^2$) galvanized sheet steel with a minimum yield strength of 33 ksi (kip [1000 pounds] per square inch) designated GR33.

Preferably, the attachment portion 9 equally bifurcates the connection portion 10 where the attachment portion 9 is integrally connected to the connection portion 10. The connection portion 10 has a top point 46 on the border 31 that is farthest away from the attachment portion 9.

In a first preferred embodiment best shown in FIGS. 50 and 51 the connection portion 10 is substantially teardrop-shaped, the narrowest part being where the attachment portion 9 joins the connection portion 10, curving outward to widen on either side of the attachment portion 9 and then curving together to narrow again, coming to a point at the top point 46. The first preferred embodiment preferably has seven fastener openings 32 in the fastening portion 47 and all are used to attach the connection portion 10 to the supported structural member 3.

In a second preferred embodiment shown in FIGS. 52 and 53, the connection portion 10 is generally formed as an irregular quadrilateral with four corners 120, three of which are rounded, the connection portion 10 being symmetrical to either side of the attachment portion, the attachment portion 9 joining the connection near the fourth of the four corners 120, the fourth corner 120 tapering to an acute and toward the attachment portion 9. Preferably, one of the rounded corners 120 is opposite the fourth corner 120 and the top point 46 is at the midpoint of the rounded corner 120 opposite the fourth corners.

In the second preferred embodiment the connection portion 10 widens from its narrowest portion, where the attachment portion 9 joins the connection portion 10, the border 31 diverging symmetrically, forming a first straight side 101 and a second straight side 102 at an acute angle to the first straight side 101, then curving out to form a third straight side 103 and a fourth straight side 104 at an obtuse angle to the third straight side 103, then curving in to form a fifth straight side 105 and a sixth straight side 106 that meet at an obtuse angle opposite the attachment portion 9 across the connection portion 10, the obtuse angle being centered on the top point 46. The fifth and sixth straight sides 105 and 106 preferably are angled to match the pitch of a truss top chord with a ½ pitch. The second preferred embodiment preferably has thirteen fastener openings 32 in the fastening portion 47 and all are used to attach the connection portion 10 to the supported structural member 3.

In a third preferred embodiment shown in FIGS. 55-57, the connection portion 10 extends symmetrically to either side of the attachment portion 9, narrows and then widens again. In the third preferred embodiment, the connection portion 10 widens from its narrowest portion, where the attachment portion 9 joins the connection portion 10, the border 31 diverging symmetrically, forming a first straight side 101 and a second straight side 102 at an acute angle to the first straight side 101, then curving out to form a third straight side 103 and a fourth straight side 104 at an obtuse angle to the third straight side 103, then curving further out to form a fifth straight side 105 and a sixth straight side 106 at an acute angle to the fifth straight side 105, then curving in to form a seventh straight side 107 and an eighth straight side 108 in line with the seventh straight side 107 and substantially orthogonal to the attachment portion 9, then turning in at right angles to form a ninth straight side 109 and a tenth straight side 110 parallel to the ninth straight side 109, then turning in to form an eleventh straight side 111 and a twelfth straight side 112 that meet at an obtuse angle opposite the attachment portion 9 across the connection portion 10. In the third preferred embodiment, the reinforcing flange 24 reinforces all of the border 31 except the ninth straight side 109 and the tenth straight side 110. The eleventh and twelfth straight sides 111 and 112 preferably are angled to match the pitch of a truss top chord with a ½ pitch. The third preferred embodiment preferably has thirty-five fastener openings 32 in the fastening portion 47 and twenty-eight are used to attach the connection portion 10 to the supported structural member 3.

Adjustable Embodiments

At their simplest, the light gauge steel embodiments of the present invention are all a connection 1 comprising an elongate substantially vertical supporting structural member 2, an elongate generally horizontal supported structural member 3, and a connector 4, as shown in FIGS. 47-49. The elongate substantially vertical supporting structural member 2, further comprises two sides 51 and a top 52 and supports the elongate generally horizontal supported structural member 3. The elongate generally horizontal supported structural member 3 further comprises two sides 53 and a top 54, and it is not parallel to the elongate substantially vertical supporting member 2. The connector 4 comprises a cap 5, a first side attachment member 8, and a first pin connection 11. The cap 5 is connected to the supported structural member 3, and comprises a first substantially planar side attachment portion 6 that interfaces with the supported structural member 3. The first side attachment member 8 comprises a substantially planar attachment portion 9 that interfaces with and is fastened to the supporting structural member 2, and a connection portion 10 that is positioned alongside the first substantially planar side attachment portion 6 of the cap 5. The first pin connection 11 enables rotation between the cap 5 and the first side attachment member 8, and connects the cap 5 to the first attachment member 8.

As with the unadjustable embodiments, preferably the connection portion 10 has a substantially planar fastening portion 47 with a border 31, and a reinforcing flange 24 integrally joined to the fastening portion 47 along at least part of the border 31. The elongate substantially planar attachment portion 9 preferably comprises first and second straps 28, each having an inner side 59 and an outer side 60. Preferably, the reinforcing flange 24 has a left side 48 and a right side 49. The first strap 28 preferably is integrally connected to the left side 48 of the reinforcing flange 24 and the second strap 28 preferably is integrally connected to the right side 49 of the reinforcing flange 24. Preferably, the first and second straps 28 at least partially overlap each other, the inner sides 59 interfacing. The reinforcing flange 24 preferably has a first end 35 and a second end 36, the first end 35 and the second end 36 being separated by a first gap 38 along the border 31 of the connection portion 10. Preferably, the connection portion 10 has a top point 46 on the border 31 that is farthest away from the attachment portion 9. The connection portion 10 preferably is substantially teardrop-shaped, the narrowest part being where the attachment portion 9 joins the connection portion 10, curving outward to widen on either side of the attachment portion 9 and then curving together to narrow again, coming to a point at the top point 46.

Preferably, the first pin connection 11 further comprises a first pin opening 12 in one of the cap 5 and the first side attachment member 8, and a first pin 13 that passes through the first pin opening 12. The first pin 13 preferably comprises a body 14 having a circumference 15, a first end 16, and a second end 17 with a first restraint extension 18 that extends beyond the circumference 15 of the body 14. Preferably, the first pin opening 12 has a circumference 19, and the first restraint extension 18 extends beyond the circumference of the first pin opening 12, preventing the first pin 13 from withdrawing from the first pin opening 12.

The first pin opening 12 is preferably in the cap 5. Preferably, the first attachment member 8 additionally comprises a second pin opening 12 and the first pin 13 passes through the second pin opening 12. The first pin 13 additionally comprises a second restraint extension 18 that extends beyond the circumference 15 of the body 14. Preferably, the second pin opening 12 has a circumference 19. The second restraint extension 18 extends beyond the circumference 19 of the second pin opening 12, preventing the first pin 13 from withdrawing from the second pin opening 12.

Preferably, the first restraint extension 18 is a circumferential flange 18 that extends beyond the circumference 15 of the body 14 and the circumference 19 of the first pin opening 12. The second restraint extension 18 preferably is a circumferential flange 18 that extends beyond the circumference 15 of the body 14 and the circumference 19 of the second pin opening 12. Preferably, the first pin 13 is a rivet.

Preferably, the cap 5 includes a substantially planar top attachment portion 21 that interfaces with the supported structural member 3. The cap 5 preferably includes a second substantially planar side attachment portion 22 that interfaces with the supported structural member 3. Preferably, the connection portion 10 of the first side attachment member 8 includes a reinforcing embossment 25 around the first pin opening 12 in the first side attachment member 8. The first substantially planar side attachment portion 6 of the cap 5 preferably includes a reinforcing embossment 25 around the second pin opening 12 that matches the reinforcing embossment 25 around the first pin opening 12 in the first side attachment member 8 so that the reinforcing embossment 25 and the reinforcing embossment 25 fit together and transmit bearing forces between the cap 5 and the first side attachment member 8. Preferably, the substantially planar attachment portion 9 of the first side attachment member 8 includes a reinforcing flange 23. The connection portion 10 of the first side attachment member 8 preferably includes a reinforcing flange 24.

Preferably, the substantially planar side attachment portion 9 of the first side attachment member 8 additionally comprises fastener openings 55. The connection 1 preferably includes fasteners 57 that pass through the fastener openings 55 in the first substantially planar side attachment portion 9 of the first side attachment member 8 and into the supporting structural member 2. Preferably, the first and second substantially planar side attachment portions 6 and 22 of the cap 5 additionally comprise fastener openings 56. The connection 1 preferably includes fasteners 58 that pass through the fastener openings 56 in the first and second substantially planar side attachment portions 6 and 22 of the cap 5 and into the supported structural member 3.

If the supporting structural member 2 is a masonry wall, the fasteners 57 that pass through the fastener openings 55 in the first substantially planar side attachment portion 9 of the first side attachment member 8 are preferably masonry screw anchors 57. If the supported structural member 3 is made of wood, the fasteners 58 that pass through the fastener openings 56 in the first and second substantially planar side attachment portions 6 and 22 of the cap 5 preferably are self-drilling wood screws 58.

Preferably, the fastening portion 47 and the attachment portion 9 generally occupy substantially perpendicular planes. The greater part of the first and second straps 28 preferably overlap. Preferably, the first and second straps 28 have open ends 50 opposite the connection portion 10 and the open ends 50 are equidistant from the connection portion. The greater part of the first and second straps 28 preferably overlap and the open ends 50 preferably contact each other.

We claim:

1. A connection (1) comprising:

a. an elongate substantially vertical supporting structural member (2), having two sides (51) and a top (52);

b. an elongate generally horizontal supported structural member (3), not parallel to said supporting structural member (2), having two sides (53) and a top (54), and supported by said supporting structural member (2);

c. a first connector (4), having a first side attachment member (8), said first side attachment member having:

i. a connection portion (10), having a substantially planar fastening portion (47) with a border (31), and a reinforcing flange (24) integrally joined to said fastening portion (47) along at least part of said border (31); and ii. an elongate substantially planar attachment portion (9) comprising first and second straps (28), each having an inner side (59) and an outer side (60), integrally connected to said connection portion (10); wherein:

A. said reinforcing flange (24) has a left side (48) and a right side (49);

B. said first strap (28) is integrally connected to said left side (48) of said reinforcing flange (24) and said second strap (28) is integrally connected to said right side (49) of said reinforcing flange (24); and C. said first and second straps (28) at least partially overlap each other, said inner sides (59) interfacing; and iii. said fastening portion (47) is positioned alongside and fastened to one of said two sides (53) of said supported structural member (3); and iv. said attachment portion (9) interfaces with and is fastened to one of said two sides (51) of said supporting structural member (2).

2. The connection (1) of claim 1 wherein:

a. said fastening portion (47) and said attachment portion (9) generally occupy substantially perpendicular planes.

3. The connection (1) of claim 1 wherein:

a. the greater part of said first and second straps (28) overlap.

4. The connection (1) of claim 1 wherein:

a. said first and second straps (28) have open ends (50) opposite said connection portion (10) and said open ends (50) are equidistant from said connection portion.

5. The connection of claim 4 wherein:

a. the greater part of said first and second straps (28) overlap and said open ends (50) contact each other.

6. The connection (1) of claim 1 wherein:

a. said first and second straps (28) have fastener openings (55); and b. said fastening portion (47) has fastener openings (32).

7. The connection (1) of claim 6 wherein:

a. said connection (1) includes fasteners (57) that pass through said fastener openings (55) in said first and second straps (28) and into said supporting structural member (2); and b. said connection (1) includes fasteners (33) that pass through said fastener openings (32) in said fastening portion (47) and into said supported structural member (3).

8. The connection (1) of claim 7 wherein:

said fasteners (57 and 33) have shanks (34).

9. The connection (1) of claim 8 wherein:

said fasteners (57 and 33) have threaded shanks (34).

10. The connection (1) of claim 9 wherein:

said fasteners (57 and 33) are screws (57 and 33).

11. The connection (1) of claim 10 wherein:

a. said screws (57) are wood screws (57) and said supporting structural member (2) is a wood-framed wall (2).

12. The connection (1) of claim 10 wherein:

a. said screws (57) are masonry screws (57) and said supporting structural member (2) is a masonry wall (2).

13. The connection (1) of claim 10 wherein:

a. said screws (57) are metal screws (57) and said supporting structural member (2) is a metal-framed wall (2).

14. The connection (1) of claim 10 wherein:

a. said screws (33) are wood screws (33) and said supported structural member (3) is a wood-framed truss (3).

15. The connection (1) of claim 10 wherein:

a. said supported structural member (3) is a composite truss (3).

16. The connection (1) of claim 10 wherein:

a. said screws (33) are metal screws (33) and said supported structural member (3) is a metal-framed truss (3).

17. The connection (1) of claim 1 further comprising:
a. a second connector (7) having a first side attachment member (8), said first side attachment member having:
i. a connection portion (10), having a substantially planar fastening portion (47) with a border (31), and a reinforcing flange (24) integrally joined to said fastening portion (47) along at least part of said border (31); and
ii. an elongate substantially planar attachment portion (9) comprising first and second straps (28) each having an inner side (59) and an outer side (60), integrally connected to said connection portion (10); wherein:
A. said reinforcing flange (24) has a left side (48) and a right side (49);
B. said first strap (28) is integrally connected to said left side (48) of said reinforcing flange (24) and said second strap (28) is integrally connected to said right side (49) of said reinforcing flange (24); and
C. said first and second straps (28) at least partially overlap each other, said inner sides (59) interfacing; and
b. said fastening portion (47) is positioned alongside and fastened to the other of said two sides (53) of said supported structural member (3) from said first connector (4); and
c. said attachment portion (9) interfaces with and is fastened to one of said two sides (51) of said supporting structural member (2).

18. The connection (1) of claim 1 wherein:
a. said reinforcing flange (24) occupies substantially all of said border (31).

19. The connection (1) of claim 1 wherein:
a. said attachment portion (9) equally bifurcates said connection portion (10) where said attachment portion (9) is integrally connected to said connection portion (10).

20. The connection (1) of claim 19 wherein:
a. said connection portion (10) has a top point (46) on said border (31) that is farthest away from said attachment portion (9); and
b. said connection portion (10) is substantially teardrop-shaped, the narrowest part being where said attachment portion (9) joins said connection portion (10), curving outward to widen on either side of said attachment portion (9) and then curving together to narrow again, coming to a point at said top point (46).

21. The connection (1) of claim 19 wherein:
a. said connection portion (10) has a top point (46) on said border (31) that is farthest away from said attachment portion (9);
b. said connection portion (10) is generally formed as an irregular quadrilateral with four corners (120), three of which are rounded, said connection portion (10) being symmetrical to either side of said attachment portion, said attachment portion (9) joining said connection near the fourth of said four corners (120), said fourth corner (120) tapering to an acute and toward said attachment portion (9); and
c. one of said rounded corners (120) is opposite said fourth corner (120) and said top point (46) is at the midpoint of said rounded corner (120) opposite said fourth corners.

22. The connection (1) of claim 19 wherein:
a. said connection portion (10) has a top point (46) on said border (31) that is farthest away from said attachment portion (9); and
b. said connection portion (10) widens from its narrowest portion, where said attachment portion (9) joins said connection portion (10), said border (31) diverging symmetrically, forming a first straight side (101) and a second straight side (102) at an acute angle to said first straight side (101), then curving out to form a third straight side (103) and a fourth straight side (104) at an obtuse angle to said third straight side (103), then curving in to form a fifth straight side (105) and a sixth straight side (106) that meet at an obtuse angle opposite said attachment portion (9) across said connection portion (10), said obtuse angle being centered on said top point (46).

23. The connection (1) of claim 1 wherein:
a. said connection portion (10) extends symmetrically to either side of said attachment portion (9), narrows and then widens again.

24. The connection (1) of claim 1 wherein:
a. said connection portion (10) widens from its narrowest portion, where said attachment portion (9) joins said connection portion (10), said border (31) diverging symmetrically, forming a first straight side (101) and a second straight side (102) at an acute angle to said first straight side (101), then curving out to form a third straight side (103) and a fourth straight side (104) at an obtuse angle to said third straight side (103), then curving further out to form a fifth straight side (105) and a sixth straight side (106) at an acute angle to said fifth straight side (105), then curving in to form a seventh straight side (107) and an eighth straight side (108) in line with said seventh straight side (107) and substantially orthogonal to said attachment portion (9), then turning in at right angles to form a ninth straight side (109) and a tenth straight side (110) parallel to said ninth straight side (109), then turning in to form an eleventh straight side (111) and a twelfth straight side (112) that meet at an obtuse angle opposite said attachment portion (9) across said connection portion (10).

25. The connection (1) of claim 24 wherein:
a. said reinforcing flange (24) reinforces all of said border (31) except said ninth straight side (109) and said tenth straight side (110).

26. The connection (1) of claim 1 wherein:
a. said reinforcing flange (24) has a first end (35) and a second end (36), said first end (35) and said second end (36) being separated by a first gap (38) along said border (31) of said connection portion (10).

27. The connection (1) of claim 1 wherein:
a. said connector (4) further comprises:
i. a cap (5), connected to said supported structural member (3), comprising a first substantially planar side attachment portion (6) that interfaces with said supported structural member (3);
ii. a first side attachment member (8) comprising a substantially planar attachment portion (9) that interfaces with and is fastened to said supporting structural member (2), and a connection portion (10) that is positioned alongside said first substantially planar side attachment portion (6) of said cap (5); and
iii. a first pin connection (11) that enables rotation between said cap (5) and said first side attachment member (8), and that connects said cap (5) to said first attachment member (8).

28. The connection (1) of claim 27 wherein:
a. said reinforcing flange (24) has a first end (35) and a second end (36), said first end (35) and said second end (36) being separated by a first gap (38) along said border (31) of said connection portion (10).

29. The connection (1) of claim 28 wherein:

a. said connection portion (10) has a top point (46) on said border (31) that is farthest away from said attachment portion (9); and b. said connection portion (10) is substantially teardrop-shaped, the narrowest part being where said attachment portion (9) joins said connection portion (10), curving outward to widen on either side of said attachment portion (9) and then curving together to narrow again, coming to a point at said top point (46).

30. The connection (1) of claim 27 wherein:

a. said first pin connection (11) further comprises a first pin opening (12) in one of said cap (5) and said first side attachment member (8), and a first pin (13) that passes through said first pin opening (12);

b. said first pin (13) comprises a body (14) having a circumference (15), a first end (16), and a second end (17) with a first restraint extension (18) that extends beyond said circumference (15) of said body (14);

c. said first pin opening (12) has a circumference (19); and d. said first restraint extension (18) extends beyond said circumference of said first pin opening (12), preventing said first pin (13) from withdrawing from said first pin opening (12).

31. The connection (1) of claim 30 wherein:

a. said first pin opening (12) is in said cap (5);

b. said first attachment member (8) additionally comprises a second pin opening (12) and said first pin (13) passes through said second pin opening (12);

c. said first pin (13) additionally comprises a second restraint extension (18) that extends beyond said circumference (15) of said body (14);

d. said second pin opening (12) has a circumference (19);

e. said second restraint extension (18) extends beyond said circumference (19) of said second pin opening (12), preventing said first pin (13) from withdrawing from said second pin opening (12).

32. The connection (1) of claim 31 wherein:

a. said first restraint extension (18) is a circumferential flange (18) that extends beyond said circumference (15) of said body (14) and said circumference (19) of said first pin opening (12);

b. said second restraint extension (18) is a circumferential flange (18) that extends beyond said circumference (15) of said body (14) and said circumference (19) of said second pin opening (12).

33. The connection (1) of claim 32 wherein:

a. said cap (5) additionally comprises a substantially planar top attachment portion (21) that interfaces with said supported structural member (3).

34. The connection (1) of claim 33 wherein:

a. said cap (5) additionally comprises a second substantially planar side attachment portion (22) that interfaces with said supported structural member (3).

35. The connection (1) of claim 34 wherein:

a. said connection portion (10) of said first side attachment member (8) additionally comprises a reinforcing embossment (25) around said first pin opening (12) in said first side attachment member (8).

36. The connection (1) of claim 35 wherein:

a. said first substantially planar side attachment portion (6) of said cap (5) additionally comprises a reinforcing embossment (25) around said second pin opening (12) that matches said reinforcing embossment (25) around said first pin opening (12) in said first side attachment member (8) so that said reinforcing embossment (25) and said reinforcing embossment (25) fit together and transmit bearing forces between said cap (5) and said first side attachment member (8).

37. The connection (1) of claim 36 wherein:

a. said substantially planar attachment portion (9) of said first side attachment member (8) additionally comprises a reinforcing flange (23).

38. The connection (1) of claim 37 wherein:

a. said first pin (13) is a rivet.

39. The connection (1) of claim 38 wherein:

a. said substantially planar side attachment portion (9) of said first side attachment member (8) additionally comprises fastener openings (55); and b. said connection (1) additionally comprises fasteners (57) that pass through said fastener openings (55) in said first substantially planar side attachment portion (9) of said first side attachment member (8) and into said supporting structural member (2).

40. The connection (1) of claim 39 wherein:

a. said first and second substantially planar side attachment portions (6) and (22) of said cap (5) additionally comprise fastener openings (56); and b. said connection (1) additionally comprises fasteners (58) that pass through said fastener openings (56) in said first and second substantially planar side attachment portions (6) and (22) of said cap (5) and into said supported structural member (3).

41. The connection (1) of claim 40 wherein:

a. said fasteners (57) that that pass through said fastener openings (55) in said first substantially planar side attachment portion (9) of said first side attachment member (8) are masonry screw anchors (57); and b. said fasteners (58) that pass through said fastener openings (56) in said first and second substantially planar side attachment portions (6) and (22) of said cap (5) are self-drilling wood screws (58).

42. The connection (1) of claim 27 wherein:

a. said fastening portion (47) and said attachment portion ((9)) generally occupy substantially perpendicular planes.

43. The connection (1) of claim 27 wherein:

a. the greater part of said first and second straps (28) overlap.

44. The connection (1) of claim 27 wherein:

a. said first and second straps (28) have open ends (50) opposite said connection portion (10) and said open ends (50) are equidistant from said connection portion.

45. The connection (1) of claim 44 wherein:

a. a. the greater part of said first and second straps (28) overlap and said open ends (50) contact each other.

* * * * *

UNITED STATES PATENT AND TRADEMARK OFFICE

CERTIFICATE OF CORRECTION

PATENT NO. : 7,716,877 B2
APPLICATION NO. : 11/217572
DATED : May 18, 2010
INVENTOR(S) : Jeremy Gilstrap It is certified that error appears in the above-identified patent and that said Letters Patent is hereby corrected as shown below:

In the Claims:

Column 31, line 57, claim 21, referencing "to an acute and toward said attachment portion (9);" should read "to an acute angle toward said attachment portion (9);".

Signed and Sealed this
Tenth Day of September, 2013

Teresa Stanek Rea
*Acting Director of the United States Patent and Trademark Office*